(12) United States Patent
Hyde

(10) Patent No.: US 6,591,201 B1
(45) Date of Patent: Jul. 8, 2003

(54) FLUID ENERGY PULSE TEST SYSTEM

(76) Inventor: Thomas Allen Hyde, 1607 N. H St., Midland, TX (US) 79701-4031

( * ) Notice: Subject to any disclaimer, the term of this patent is extended or adjusted under 35 U.S.C. 154(b) by 113 days.

(21) Appl. No.: 09/963,608

(22) Filed: Sep. 25, 2001

Related U.S. Application Data

(60) Provisional application No. 60/235,924, filed on Sep. 28, 2000.

(51) Int. Cl.$^7$ .................................................. G01F 1/00

(52) U.S. Cl. ........................... 702/45; 702/46; 702/47; 702/50; 702/51; 700/281; 700/282; 700/301

(58) Field of Search .............................. 702/45, 46, 47, 702/50, 51; 700/281, 282, 301; 73/61.56, 53.01, 168

(56) References Cited

U.S. PATENT DOCUMENTS

| | | | |
|---|---|---|---|
| 4,464,931 A | 8/1984 | Hendrick | |
| 4,549,715 A | 10/1985 | Engel | |
| 4,686,658 A | 8/1987 | Davidson | |
| 4,893,494 A | 1/1990 | Hart | |
| 4,903,529 A | 2/1990 | Hodge | |
| 5,107,441 A | 4/1992 | Decker | |
| 5,133,189 A * | 7/1992 | Hurley | 60/646 |
| 5,176,164 A | 1/1993 | Boyle | |
| 5,197,328 A | 3/1993 | Fitzgerald | |
| 5,272,647 A | 12/1993 | Hayes | |
| 5,329,956 A | 7/1994 | Marriott | |
| 5,524,484 A | 6/1996 | Sullivan | |
| 5,616,824 A | 4/1997 | Abdel-Malek | |
| 5,624,409 A * | 4/1997 | Seale | 604/246 |

OTHER PUBLICATIONS

American Petroleum Institute Draft API11V2 Recommended Practice Gas–Lift Valve Performance Testing, Jan. 13, 1993.

(List continued on next page.)

*Primary Examiner*—John Barlow
*Assistant Examiner*—Meagan S. Walling

(57) ABSTRACT

The Fluid Energy Pulse Test System [FEPTS] comprises apparatus and methods, using high-pressure, high-fluid-flow-rate or low-pressure-low-fluid-flow-rate energy pulses in tests to collect data for the evaluation of transient, ramp, steady state, or near steady state dynamic performance characteristics of fluid control devices and fluid systems. Positively increasing and negatively decreasing energy pulses can be generated independently or concurrently during a test. Effects of one or more energy pulses on the dynamic operation of a tested device or system are controlled by the selection of energy pulse variables, including pulse number, pulse type, pulse strength, pulse delay, pulse duration, pulse frequency, and pulse delivery (either an explosive delivery up to at least 243.84 meters per second, or a slow delivery at greater than zero meters per second). Fluid impulse, step, ramp, or frequency input functions, or combinations thereof, perturb the dynamic modes of operation of a fluid control device or fluid system under test. Test data are acquired in an open-, partly-open-, or closed-to-the-atmosphere environment. A test chamber (56) permits rapid insertion and removal of fluid control devices. Complete fluid systems can be tested. Measurement accuracy is met by precisely metered flow rates, short sampling intervals, and calibrated transducers. Graphs of transient, steady state, or near steady state fluid pressure, differential pressure, temperature, and flow rate data are computer-generated in real time. FEPTS tests can be performed by one person. The small, compact, and mobile apparatus can be placed at field sites. FEPTS tests use less than one percent of the energy required by current continuous-flow test technology.

20 Claims, 16 Drawing Sheets

OTHER PUBLICATIONS

University of Tulsa Artificial Lift Projects (TULAP), Appendix C—Tulap MODEL (part of the API11V2 Recommended Practice Gas–Lift Valve Performance Testing—but not so labeled.

Verification of Constant Injection Pressure Test Procedures in Gas–Lift Valve Performance Testing, American Petroleum Institute Washington, D. C., Authored by Thomas A. Hyde, Aug. 24, 1993.

Pulse Pressure to Identify Gas–Lift Valve Specifications, presented at the American Production Engineering Association meeting, Houston, Texas, Oct. 7, 1993, Authored by Thomas A. Hyde.

Flow Conditioning Technology Optimizes Gas Measurement Gallagher, J. E., American Oil and Gas Reporter, Oct., 1995.

* cited by examiner

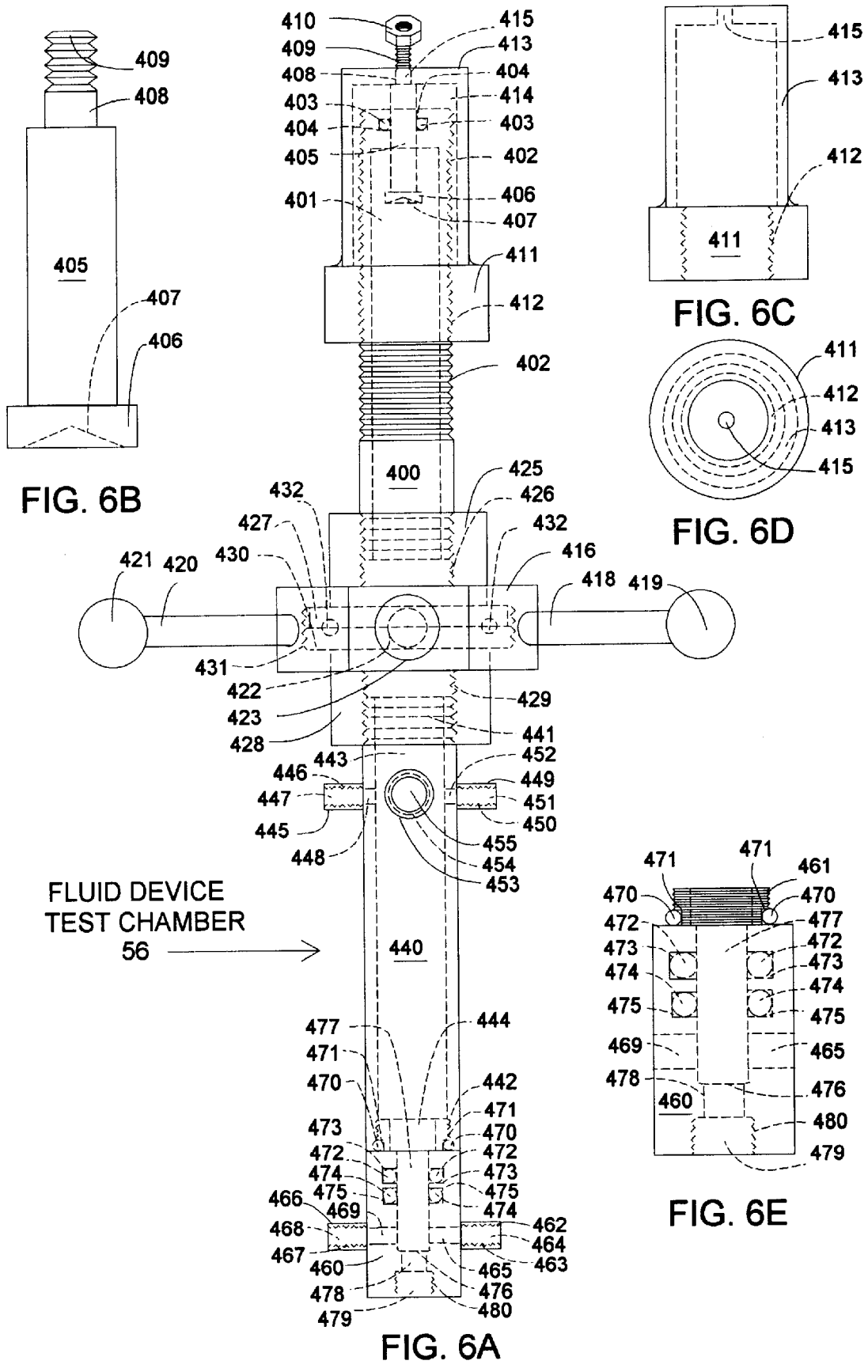

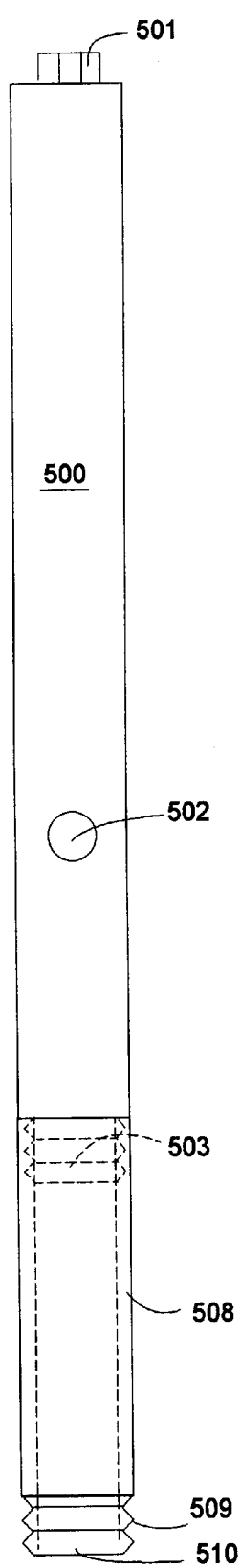
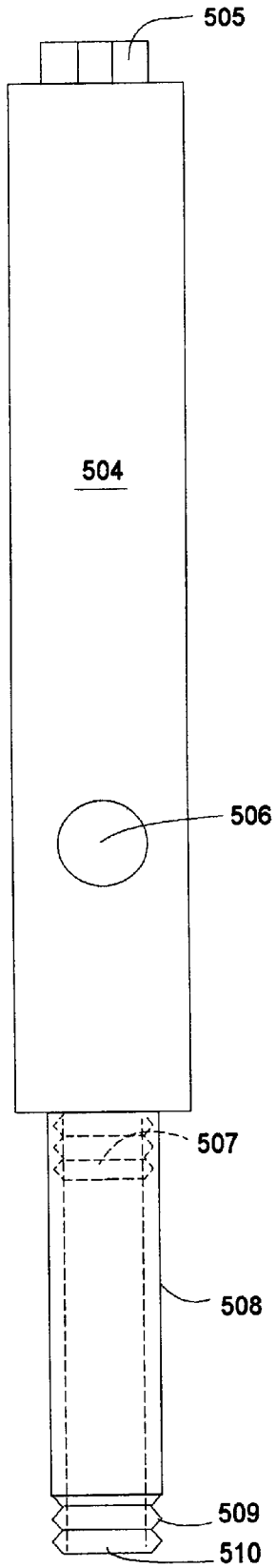
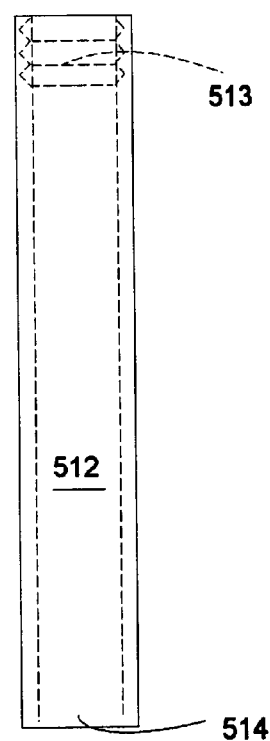
CONVENTIONAL
FIG. 7A
CONVENTIONAL
FIG. 7B
FIG. 7C

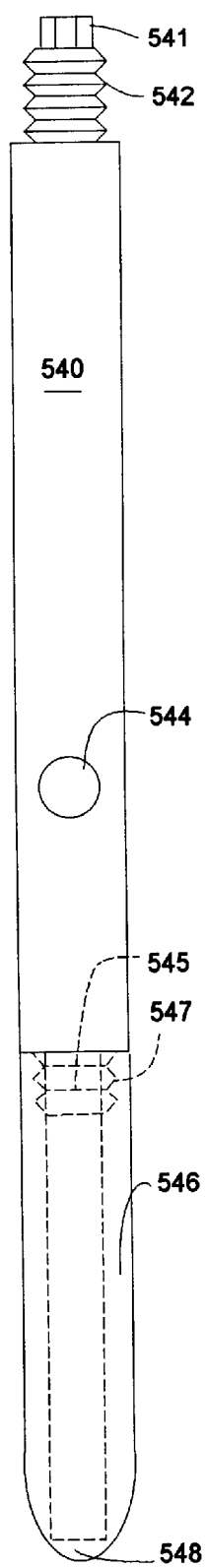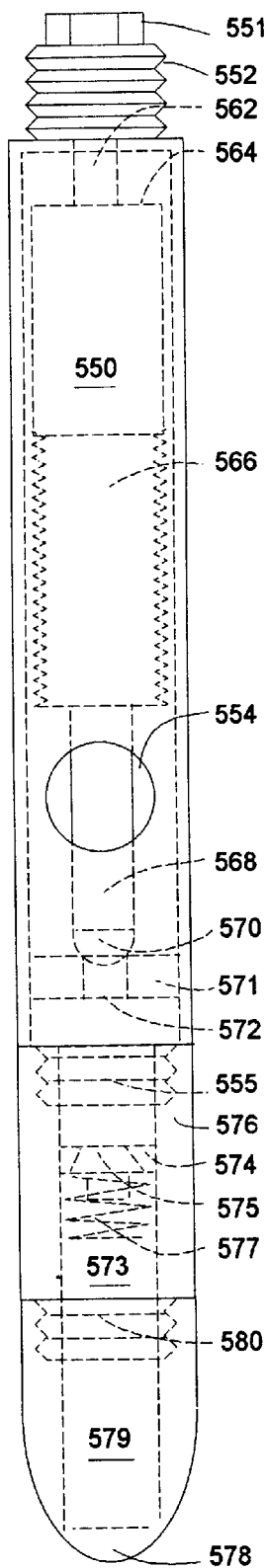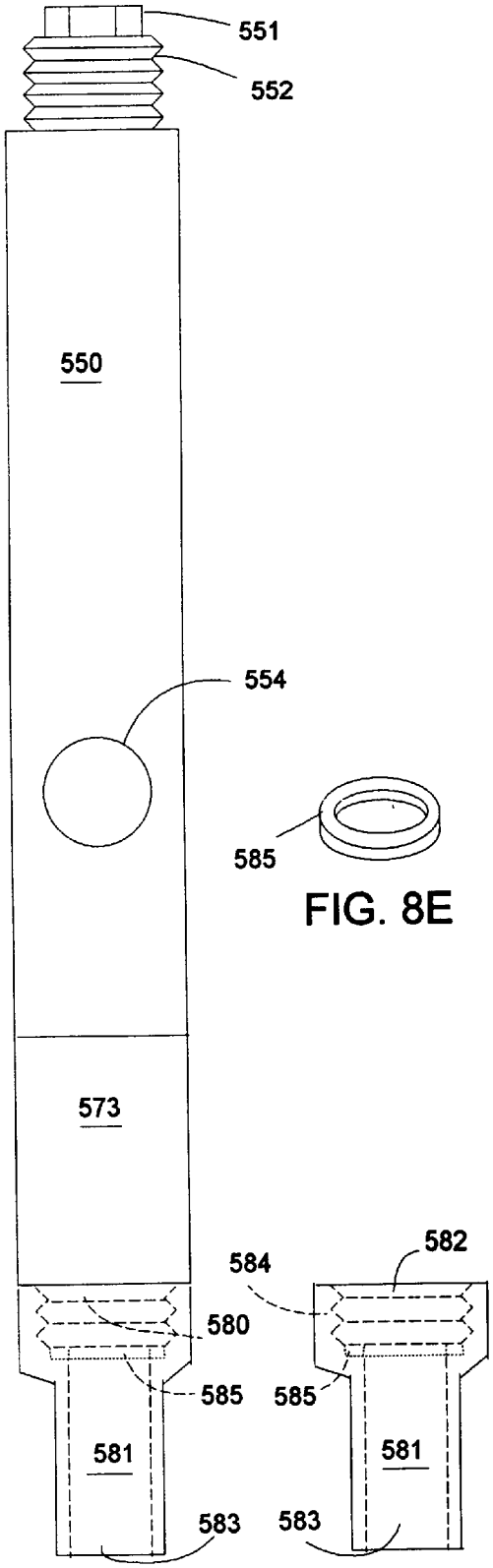
CONVENTIONAL
FIG. 8A
CONVENTIONAL
FIG. 8B
FIG. 8C
FIG. 8D

FLUID ENERGY PULSE TEST SYSTEM

CROSS REFERENCE TO RELATED APPLICATIONS

U.S. Provisional Application No. 60/235,924; Sep. 28, 2000.

REFERENCE TO FEDERALLY SPONSORED RESEARCH

Not applicable

REFERENCE TO A COMPUTER PROGRAM LISTING APPENDIX

A computer program listing appendix is incorporated-by-reference. Programs and data, included on "write-once" Compact Disc-Recordable (CD-R) discs, operate computer equipment that control, collect, interpret, and print Fluid Energy Pulse Test System data. Two identical CD-R discs labeled COPY 1, created Sep. 18, 2001 and COPY 2, created Sep. 18, 2001 each contain machine language code converted to American Standard Code for Information Interchange code. Each disk contains: [Program FEPTS.ASC for data acquisition, May 2, 2000, 157212 bytes], associated [Data FCOLOR.ASC, Sep. 17, 2001, 84 bytes], and associated [Data EPTS.ASC, Sep. 17, 2001, 57 bytes]; and [Program 2CONTROL.ASC for control sequences, Mar. 8, 2001, 153,393 bytes], and associated [Data COLOR.ASC, May 28, 1999, 149 bytes].

FIELD OF INVENTION

The invention disclosed relates to testing fluid control devices, including pressure sensitive gas-lift valves used to produce hydrocarbons from underground formations, as well as to testing other general types of fluid systems, and more specifically, to test equipment and to test methods that use high-pressure, high-fluid-flow-rate energy pulses to identify fluid performance parameters in order to evaluate the dynamic operating properties of such fluid control devices and fluid systems.

BACKGROUND OF THE INVENTION

The high cost and complexity of dynamic testing and of evaluating the performance of electro-mechanical, pneumatic, and hydraulic fluid control devices have lead to a rich body of teachings with objectives to reduce the test cost and to simplify the performance evaluations for these devices. However, the cost of dynamic testing to evaluate high-pressure, high-fluid-flow-rate [HPHFFR], pressure sensitive fluid control devices remains high. High pressures and high fluid flow rates occur at fluid pressure above 3,549 kPa (500 psig) and fluid flow rate greater than 0.05663 cubic meters per second (two cubic feet per second). HPHFFR tests are commonly conducted at 6,996 kPa (1000 psig) and 0.14158 cubic meters per second (five cubic feet per second). In some industrial process control areas, such as the production of hydrocarbons, only a sample of a manufacturer's production run of HPHFFR fluid control devices in service has been tested to determine if all of the devices in that lot can control fluid flow in accordance with the manufacturer's design parameters. It is well known that dynamic tests should be conducted on all fluid control devices in order to diagnose potential problems prior to their use. If dynamic tests of HPHFFR fluid control devices and fluid systems are not undertaken, diagnosis of problems or potential problems cannot be made.

Limited testing of HPHFFR pressure sensitive fluid control devices is done by device users, manufacturers, and rebuilders. This situation is a direct result of the high cost and technical difficulties associated with the current HPHFFR test environment. Generally, manufacturers' tests only determine if a HPHFFR device opens, closes, or leaks. The limited number of dynamic tests and performance evaluations of HPHFFR devices is especially notable in the petroleum industry in which such devices are used in the production of hydrocarbons from underground formations. Producing hydrocarbons depends upon many types of pressure sensitive devices, including tubing retrievable or wire line retrievable injection pressure operated gas-lift valves [IPO-GLVs] and production pressure operated gas-lift valves [PPO-GLVs]; differential pressure valves; pilot valves; single- and double-check valves; orifice valves; subsurface safety valves; and subsea gas-lift kill valves. The dimensions of these pressure sensitive fluid control devices include gas-lift valves of varying lengths with outside diameters of 1.5875 centimeters (five-eighths inches), 2.54 centimeters (one inch), and 3.81 centimeters (one and one/half inches); and a variety of larger valves, including 8.89 centimeter (three and one-half inch) diameter subsurface safety valves.

These types of valves are essential to the petroleum industry. The economics associated with gas lift have demonstrated that gas lift technology is competitive with, and in most instances initial costs are less and operating costs are lower than, other types of lift technologies for various types of wells, including deep wells; sand producing wells; high gas-liquid ratio wells; very low capacity stripper wells; wells with changing depths of lift; wells with unknown depths of lift; multi-zone well completions; and wells with large tubing. Gas-lift technology may be the only technology that can be used for the production of petroleum and gas from off-shore platforms. Applications include lifting petroleum until a well is depleted, "kicking off" wells that later flow naturally, backflowing water injection and disposal wells, and unloading water from gas wells. Continuous and/or intermittent gas-lift system designs may require many gas-lift valves, for example, twelve valves in a single well.

Historically, the principal reason for the lack of testing and evaluation is the high cost and complexity of test facilities and equipment. Conventional test systems focus upon continuous (also called, steady state or average), fluid flow rate measurement technology. This test technology generates steady state flow data, but requires extensive resources to build and to operate HPHFFR test facilities. As a result, testing pressure sensitive fluid control devices with continuous flow test technology is very expensive.

Previous investigators have approached the problems of testing fluid control devices dynamically in a number of ways, several of which are briefly discussed. For example, U.S. Pat. No. 5,616,824 to Abdel-Malek et. al. (1997), teaches a valve diagnostic system for installed electromechanical control valves. The system identifies and compares to file data, a time-signature of valve operation to detect or predict potential valve failure. U.S. Pat. No. 5,524,484 to Sullivan (1996), teaches a diagnostic system for solenoid valves that are installed in line and which are in service. U.S. Pat. No. 5,329,956 to Marriott (1994), teaches a method of time signature analysis for electrically actuated, pneumatically controlled valves. U.S. Pat. No. 5,197,328 to Fitzgerald (1993), teaches a diagnostic method for pneumatically operated control valves. U.S. Pat. No. 5,272,647 to Hayes (1993), teaches a portable device that perturbs a valve actuator and monitors valve stem displacement, actuator pressure, and other valve parameters for steady state flow conditions. U.S. Pat. No. 4,903,529 to Hodge (1990), teaches a method and apparatus to analyze a hydraulic control valve and actuator assembly during plant shut-down periods. U.S. Pat. No. 4,893,494 to Hart (1990), teaches a method to evaluate safety valves removed from an installation by using either pneumatic or hydraulic fluids. U.S. Pat. No. 4,464,931 to Hendrick (1984), addresses steady state dynamic valve testing with an apparatus that checks a valve calibration (closing) pressure, checks valve closing integrity, and checks valve flow rate at a pressure greater than the valve calibration pressure.

The concept of a pressure pulse is derived from unsteady fluid flow and the propagation of large amplitude nonlinear waves, from which shock waves can be generated as a result of the physical attributes of non-steady-state fluid flow. An initially continuous waveform that advances into a uniform, stationary fluid is termed a pressure pulse. Pressure pulses are referenced in U.S. Pat. No. 4,549,715 to Engel (1985), which teaches an apparatus to generate gaseous pressure pulses to rapidly open an exhaust path to create a high volume, low pressure pulse. U.S. Pat. No. 4,686,658 to Davison (1987), teaches an apparatus and method for actuating a valve for imparting pressure pulses in a pressure pulse telemetry system wherein the actuating force is adjusted in response to a measured value of the minimum force necessary to actuate the valve. This provides a self-adjusting actuator to reduce the power needed to actuate the valve, prolong battery life in the associated batteries, and prolong valve and circuit life. And, U.S. Pat. No. 5,176,164 to Boyle (1993), teaches a flow control valve system for a hydrocarbon-producing well using gas-lift technology, in which the orifice size of a down-hole valve is electrically or pressure pulse controlled from the surface. The fluid flow rate through the valve is controlled over a continuous range, keeping the orifice size constant when necessary. Valve orifice size and well conditions are monitored down-hole and transmitted to the surface as feedback signals for valve control.

These references illustrate that testing electrical, hydraulic, and pneumatic control devices dynamically has been considered, and that pulse pressure systems have been used for certain types of process control systems. However, previous work and reference documentation have not addressed the development of energy pulses and transient states of pressure, temperature, and fluid flow rate for testing and evaluating HPHFFR fluid control devices and fluid systems. As a result, no economical equipment and methods are available to perform dynamic tests and evaluations of fluid control devices such as gas-lift valves. This situation exists because prior technology is based upon continuous flow principles which require costly facilities and equipment.

The concept of an energy pulse as defined for the described invention is derived from the kinetic energy in non-steady fluid flow and the propagation of large amplitude nonlinear waves, in which a wave's kinetic energy is a function of fluid density and the square of wave velocity. In testing fluid control devices and fluid systems with energy pulses, test criteria and procedures require consideration of the potential effects of kinetic energy on the tested fluid control device or fluid system.

Testing and characterizing the parameters of fluid control devices include techniques, methods, and equipment derived from mathematical physics, fluid dynamics, gas dynamics, aerodynamics, and thermodynamics. In the classical context, all HPHFFR technology is restricted to following the laws of the thermodynamic equations of state, conservation of energy, conservation of mass, and conservation of momentum. Practical efforts to apply the equations of physics that manifest the physical content of these laws for economical testing protocols have proved to be quite difficult. Problems associated with evaluating fluid control devices using compressible gases are most complex. As a result, experimental methods are coupled with well known empirical equations to provide reasonably accurate data which describe the dynamic properties of fluid control devices. The principal device parameters for which performance measures are desired are upstream pressure, downstream pressure, fluid temperature, and fluid flow through the device.

In practice, fluid pressures are readily determined by conventional pressure transducers and fluid temperatures are measured by conventional temperature transducers that are appropriately protected from fluid abrasion and fluid forces. Fluid flow is more demanding and more difficult to measure, especially for pressure sensitive fluid control devices that are activated by compressible fluids. In practice, in the absence of a calibrated direct measuring flowmeter with appropriately conditioned fluid flow profile, one approach to determining flow through a flow control device is based upon a flow coefficient for a device under test. A flow coefficient is a measure of the ability of the device to permit (or to restrict) flow and this coefficient must be empirically determined for each kind of fluid control device. The coefficient is defined to vary between zero and one. The coefficient is one of the terms in an empirical equation, of which there are many. The coefficient, along with pressure, temperature, specific gravity, and device-geometric dimensions, is used to calculate, at a variety of pressures and device geometries, the steady state fluid flow through the device under evaluation. A calibrated flowmeter transducer to measure continuous flow HPHFFR fluids, especially compressible fluids, can also be used for measurement and in practice various transducers have been used for continuous fluid flow measurements. Mass fluid flow rate calibration is achieved, for example, by using precisely manufactured fluid flowmeter runs and/or fluid flow conditioners to generate a uniform fluid flow profile within a pipe. Thereafter, the fluid is delivered into a calibration vessel and the fluid is weighed over time. Mass fluid flow rate can be converted to volumetric fluid flow rate by standard fluid flow conversion equations.

However, there are a number of problems associated with fluid flow test measurements in steady state HPHFFR systems. First, from an economic standpoint, the cost of continuous flow HPHFFR testing of fluid control devices and fluid systems is high because of large compressors, high-volume storage systems, high maintenance, and, especially, high operating costs. Second, from a technical standpoint, different steady state flow rates must usually be measured to adequately determine the performance of a device under test. This requires multiple tests and increases operating costs. Third, in HPHFFR systems the installation and removal time for a fluid control device to be tested may be long, difficult, and costly. Fourth, the dynamic response of flowmeters may not be sufficiently fast to capture flow variations resulting from energy transient flows. Fifth, an installed flowmeter may generate excessive backpressure upstream of the flowmeter and lower pressure downstream of the flowmeter, depending upon the flowmeter physical properties. The generation of backpressure may be difficult to eliminate or to reconcile for pressure sensitive fluid control devices.

As a result of the many problems associated with testing HPHFFR fluid control devices, especially the problem of high cost, these devices commonly are not tested. Consequently, with a need for information that defines the operation of HPHFFR devices such as gas-lift valves, experimental testing and mathematical formulae, correlated with a series of live-device performance tests are conducted to achieve "benchmark" criteria for a single device to which all similarly manufactured HPHFFR devices are assumed to match. Such benchmark criteria fall far short of practical experience. For example, oil-field production tests have been used to evaluate partially the performance of gas-lift valves. Practice indicates that several gas-lift valves of the same manufacture, which are assumed to meet a benchmark criteria, may not have the same performance characteristics. Thus, engineers who design gas-lift valve lifting programs for on-shore and off-shore hydrocarbon production must include design parameter variations to accommodate up to ±30 percent error in characterizing the performance of a single gas-lift valve. This substantial level of error, documented by extensive tests conducted by the University of Tulsa Artificial Lift Projects (reference API 11V2, "Recommended Practice, Gas-Lift Valve Performance Testing", Jan. 13, 1992) and requiring approximately six hours to complete the characterization of a single gas-lift valve, is generally known in the petroleum industry. This substantial level of error for a single valve characterization can translate to a much larger error, reportedly up to 200 percent, in the design of a valve string with many valves. However, the objective is to get an oil well that is producing under gas lift to flow, even if the gas-lift valve string design is substantially sub-optimal. Yet, it is well known that gas-lift valves operating at optimal design parameters produce more hydrocarbons at lower production cost.

The complexity and cost associated with testing gas-lift valves have generated two industry responses. The first industry response was initiated by the American Petroleum Institute [API] which established a working committee, designated the 11V2 Work Group, within the area of artificial lift technology, to create a standard for testing a benchmark valve of a given manufacture. After fifteen years of effort, the API issued the publication, "Recommended Practice 11V2, Gas Lift Valve Performance Testing, 1st Edition, 1995, partly based upon the draft API 11V2 "Recommend Practice Gas-Lift Valve Performance Testing", Jan. 13, 1992. The API gas-lift valve test procedures are also represented in the specification of U.S. Pat. No. 5,107,441 to Decker (1992), assigned to Otis Merla Corporation. The methods taught in U.S. Pat. No. 5,107,441 are designed to predict flow rate performance characteristics of valves, including gas-lift valves, with a minimum of actual testing. The predicted valve flow rate is based upon the practice of describing the performance of a benchmark valve to which all other valves of the same manufacture are assumed to conform. U.S. Pat. No. 5,107,441 also instructs that determining the flow coefficient for pressure sensitive gas-lift valves is insufficient to accurately predict valve performance. Further, the patent teaches that the correlation of test data to actual flow measurements requires multiple live-valve performance tests at pressures close to expected operating pressures in order to determine if the correlated data are close to the actual data. Thus, these teachings require multiple live-valve tests to be performed on a benchmark valve.

The second industry response is a result of the international petroleum industry's need for dynamic test and performance data for gas-lift valves used in hydrocarbon production. A number of companies, including BP Exploration Operating Company, Chevron Petroleum Technology Center, Edinburgh Petroleum Services, and Shell International E & P joined to form a consortium called the Valve Performance Clearinghouse [VPC]. The VPC performs dynamic testing and performance evaluations for specific benchmark gas-lift valves and provides these data to the petroleum industry. Only six such benchmark valves had been tested as of April 1998.

Historically, the evaluation of a fluid system's performance is characterized by the accuracy of fluid flow rate measurements. Standards of fluid flow rate accuracy such as those provided by the API, the American Gas Association, and the International Standards Organization, include calibration techniques and pipe configurations that are based upon the accuracy of optimal flow profiles, of flow conditioners, and of meter runs, all of which attempt to measure steady state flow rates accurately. Steady state measurement is the dominant approach to evaluating fluid flow in fluid systems.

In fluid dynamics, the law of similarity assumes that flowmeter calibration factors, sometimes called empirical discharge or flow coefficients, are valid only when geometric and dynamic similarity exists between the metering and the calibration conditions, or between metering and empirical data conditions. Under these conditions of fully developed flow, the flow measuring device is assumed to accurately measure the true flow rate. In practical installations, the velocity profile of the fluid flow is distorted by swirl and upstream and downstream pipe fittings and configurations. Various methods are used to eliminate these problems including flow conditioners and "meter runs" which are straight lengths of pipe before and after the flow measuring device to isolate the flowmeter. The desired flow conditions for meter runs are a swirlfree, axis-symmetric, time averaged, velocity profile. These desired conditions further demonstrate that current flow measuring technology is centered upon flow profiles that exist in a thermodynamic steady state condition of flow. This emphasis on steady state and therefore average flow measurement is well known in fluid dynamics.

In a practical industrial environment, there are many situations in which fluid flow rate data are needed but pipe configurations do not permit meter runs. There are also situations in which fluid flow rate information is needed on transient fluid flow rate. Mechanical flowmeters such as turbine and target flowmeters cannot be used to measure high fluid flow rate transients, because the inertia of internal components cannot follow fast transients, and flowmeter targets obstruct flow. Further, practical problems can exist when flow rate is measured by a flowmeter device that generates excessive backpressure. There are obstructionless flowmeters for magnetic fluids and obstructionless ultrasonic and tracer-particle flowmeters for other fluids. These flowmeters may not be practical for general testing because testing with magnetic and tracer-particle fluids is expensive and ultrasonic flowmeters may be too large to be installed in the confined spaces of testing equipment.

The use of a critical flow nozzle [CFN] for fluid flow measurement serves as a solution to these problems. If a CFN throat diameter is sufficiently larger than the largest fluid control orifice of a tested fluid device or fluid system, the CFN is nearly obstructionless with respect measured flow. Expanding fluid entering such a CFN generates low backpressure that can be less than five percent of the testing fluid pressure.

Current efforts to measure and record dynamic test data, and to evaluate HPHFFR fluid devices and fluid systems economically, suffer from many disadvantages.

(a) The accepted industry standards for determining the fluid flow rate through a fluid control device are based upon the physics of steady state flow. In gas flow systems, steady state flow is measured because of presumed difficulties in evaluating transient compressible fluid flow practically. Problems associated with measuring transient compressible flow are exacerbated by high pressure and high flow rate compressible fluids. Thus, transient compressible fluid flow is seldom measured or used in fluid test equipment to test and evaluate fluid control devices or fluid systems.

(b) For gas-based systems, HPHFFR continuous flow systems requires large compressors and large pneumatic storage facilities to maintain a continuous HPHFFR.

(c) Personnel requirements and HPHFFR maintenance increase costs.

(d) HPHFFR compressor and compressible fluid storage facilities require large land areas and/or buildings to accommodate equipment.

(e) HPHFFR testing usually involves "delay time" for compressors to build up stored energy to conduct tests, thereby increasing personnel costs as personnel wait for the equipment to reach operating pressure to generate operating flow conditions.

(f) Current testing facilities use large capacity fluid systems to match, or to approximate, real world operating conditions for the device under test. Personnel safety requires that the design and fabrication of such HPHFFR systems exceed the expected operating conditions of testing. HPHFFR system cost increases appreciably as the size and maximum pressure of a HPHFFR system increases.

(g) The high cost associated with testing HPHFFR devices generates an environment in which manufacturers and rebuilders of these devices do not perform routine dynamic performance tests to determine if a manufactured or rebuilt device can control fluid flow. Furthermore, the tests that are conducted by manufacturers only determine if a flow control device opens, closes, or leaks. These current tests cannot determine if a flow control device's dynamic performance is capable of controlling the fluid flow through the device. The expected performance of the device is based upon design parameters, not upon tests.

(h) Newly manufactured, rebuilt, or used flow control devices such as gas-lift valves, that assist in the recovery of hydrocarbons, and which also assist in the disposal of waste in fluid disposal wells, are not routinely evaluated for performance by manufacturers or by users.

(i) There are only a few facilities in the world that can evaluate the HPHFFR performance of fluid control devices such as gas-lift valves. Two of these facilities are in the United States: Southwest Research Institute, San Antonio, Tex., and the University of Tulsa Artificial Lift Project facility, Tulsa, Okla. The University of Tulsa cannot evaluate gas-lift valves for commercial purposes. The cost to rent facilities at Southwest Research Institute exceeds $12,000 to test a single valve that may cost $750 or less. Additional fees are required for correlating the test data. High costs cause only one benchmark valves to be tested. Thus, users of new or rebuilt gas-lift valves do not know if their valves are defective.

(j) Currently, only benchmark HPHFFR devices such as gas-lift valves are evaluated to determine their performance characteristics. All valves of the same design, both newly manufactured and rebuilt, are assumed to perform to the same standards as the benchmark valve. Yet, it is well known in the petroleum industry that all gas-lift valves of the same design and construction do not have the same performance characteristics because of conditions, such as, different manufacturing tolerances, different environmental conditions, damage to internal components, age, and new, used, or remanufactured condition.

(k) Knowledge of the reasons for the failure of a producing hydrocarbon well is critical to improving hydrocarbon production. Yet, when a well that uses gas-lift valves undergoes a workover to bring the well back on-line after a failure, no existing economic technology is available to determine if the problem occurred because of the hydrocarbon producing formation or because of a failed or improperly operating gas-lift valve. When gas-lift valves are retrieved from a well, they are returned to a manufacture for rebuilding, or in some cases, discarded. They are not evaluated for failure. They are not returned to the well for production. Performance tests are not conducted on the removed gas-lift valves to determine if one or more of them failed or materially contributed in some other way to the failure of the well.

SUMMARY OF THE INVENTION

In accordance with the principles of the disclosed invention herein designated Fluid Energy Pulse Test System [FEPTS], there are provided:

(a) an apparatus, to conducts dynamic testing of fluid control devices or fluid systems using HPHFFR or low-pressure, low-fluid-flow-rate energy pulses;

(b) a first method, to test fluid control devices or fluid systems to generate dynamic test data from an open- or a partly-open-to-the-atmosphere system;

(c) a second method, to test fluid control devices or fluid systems to generate dynamic test data from a closed-to-the-atmosphere system;

(d) a third method, to evaluate open-, or partly-open-to-the-atmosphere system dynamic test data to determine dynamic performance characteristics of tested fluid control devices or fluid systems;

(e) a fourth method, to evaluate closed-to-the-atmosphere system dynamic test data to determine dynamic performance characteristics of tested fluid control devices or fluid systems; and, (f) a fifth method, to evaluate power and energy use of tested fluid control devices or fluid systems.

My FEPTS uses HPHFFR energy pulses that are a fraction, one-half of one-percent or less, of the amount of energy required for current steady state testing of fluid control devices and fluid systems. Using HPHFFR energy pulses, the FEPTS generates a range of economical test procedures and results that permit evaluation of open-, partly-open-, or closed-to-the-atmosphere test data, that characterize the performance and dynamic properties of fluid control devices and fluid systems.

The apparatus comprises a plurality of fluid storage tanks separated into one or more main reservoir tanks, one or more upstream reservoir tanks, and one or more downstream reservoir tanks; a system to fill the main reservoir storage tanks with fluid; a system to transfer fluid from the main reservoir tanks to upstream reservoir tanks and to downstream reservoir tanks; a secondary receiving fluid system that may be a test chamber containing or not containing a fluid control device, or another fluid system; a plurality of fast acting solenoid and electro-pneumatic control valves to deliver high pressure, high fluid flow rate controlled energy pulses to the secondary receiving fluid system; a plurality of fast acting solenoid and electro-pneumatic control valves to exhaust high pressure fluid from the secondary receiving fluid system; fluid path configurations that permit opening or closing of the fluid flow to the atmosphere; a plurality of fluid metering valves, also described as fluid flow set valves, with fine fluid control capability to assist in controlling energy pulses that deliver energy to the secondary receiving fluid system; a plurality of transducers to measure fluid temperature, main reservoir fluid pressure, upstream reservoir fluid pressure, downstream reservoir fluid pressure, upstream and downstream (of tested device or system) fluid pressure, differential fluid pressure, and fluid flow rate; electrical signal conditioning equipment; analog to digital conversion equipment; a plurality of power supplies so that electrical power supplied to transducers is separate and distinct from electrical power supplied to control and metering valves; remote control transmitters and receivers; one or more computers to receive test data and to control the parameters and the timing of energy pulses for testing; a monitor and printer to display and print test data and test results; and, if more than one computer is used, a switch to shift from one computer to the other while computer programs are running.

The methods are:

A first method to test a fluid control device dynamically in order to acquire open- or partly-open-to-the-atmosphere test data comprises the following steps: selecting a fluid exhaust path that is open- or partly-open-to-the-atmosphere; establishing secondary receiving fluid system upstream and downstream initial pressure conditions; generating one or more energy pulses having controlled pulse strength, pulse duration, pulse frequency, and pulse delay; sending one or more controlled energy pulses to the secondary receiving fluid system; and recording data.

A second method to test a fluid control device dynamically in order to acquire closed-to-the-atmosphere test data comprises the following steps: selecting a fluid exhaust path that is closed-to-the-atmosphere; establishing secondary receiving fluid system upstream and downstream initial pressure conditions; generating one or more energy pulses having controlled pulse strength, pulse duration, pulse frequency, and pulse delay; sending one or more controlled energy pulses to the secondary receiving fluid system; generating one or more exhaust energy pulses having controlled pulse strength, pulse duration, pulse frequency, and pulse delay; sending one or more controlled exhaust energy pulses to the atmosphere from the upstream and/or downstream secondary receiving system; and recording data.

A third method to evaluate open- or partly-open-to-the-atmosphere system dynamic test data to determine dynamic performance characteristics of a tested fluid control device comprises the following steps: rendering dynamic test pressures, temperatures, and flow rate data as a function of time; parametrically rendering upstream reservoir pressure, upstream and downstream pressure (of the tested device or system), and/or temperature as a function of fluid flow rate; determining if time-dependent dynamic test data and the parametric rendering of these data meet an acceptable degree of open-system dynamic performance, as determined from design specifications or historical records; and, when required, using the acquired data to design, or to evaluate the design of, a field-operating system that uses the tested device.

A fourth method to evaluate closed-system dynamic test data to determine dynamic performance characteristics of a tested fluid control device comprises steps: rendering closed system dynamic test pressures, temperatures, and flow rate data as a function of time; parametrically rendering upstream and downstream pressure (of the tested device or system) and/or temperature as a function of fluid flow rate; and determining if time-dependent closed system dynamic test data and the parametric rendering of these data meet an acceptable degree of closed-system dynamic performance, as determined from design specifications or historical records.

A fifth method to evaluate power and energy use of a tested fluid control device comprises steps: determining power supplied to and power delivered by a fluid control device as the multiplicative result of a pressure and a fluid flow rate; rendering power supplied and power delivered as a function of time; determining energy supplied to and energy used by a fluid control device by the integration with respect to time of power; and determining if these data meet an acceptable degree of performance, as determined from design specifications or historical records.

Accordingly, objects and advantages of the FEPTS are:

[1] to reduce the amount of energy, capital, maintenance, personnel, and other costs of acquiring test data and of evaluating a fluid control device or fluid system dynamic performance characteristics under varying operating conditions;

[2] to provide an apparatus that uses transient HPHFFR energy pulses to generate temperature, pressure, and fluid flow rate dynamic test data for fluid control devices and fluid systems;

[3] to provide an apparatus that incrementally controls high-energy pulses from zero energy to maximum energy delivery, so that a fluid control device or fluid system can be tested without damaging the device or system;

[4] to provide an apparatus that eliminates the long delay time required for large compressors and large gas-storage systems to build sufficient energy to conduct dynamic tests of fluid control devices and fluid systems;

[5] to provide an apparatus that permits a fluid control device test chamber, or a fluid system, to be connected to the apparatus in order to test dynamic performance characteristics;

[6] to provide an apparatus that is relatively light in weight, compact, and small in comparison to existing steady state dynamic test equipment;

[7] to provide an apparatus that uses a small compressor and small fluid storage tanks;

[8] to provide an apparatus that can receive stored energy from multiple energy sources, including fluid storage tanks or bottles, compressors, and, if safety measures are met, from natural gas wells and pipelines;

[9] to provide an apparatus that can be operated by one person;

[10] to provide an apparatus that generates, from a HPHFFR or a low-pressure, low-fluid flow rate energy source, energy pulses with controlled pulse strength, pulse duration, pulse frequency, and pulse delay;

[11] to provide an apparatus that exhausts, from a pressurized fluid control device or system, energy pulses with controlled pulse strength, pulse duration, pulse frequency, and pulse delay;

[12] to provide an apparatus that controls energy pulse strength by a metering valve and a pulse valve in series communication, in which the metering valve has fine control of fluid flow that is achieved by either a continuous or stepping electric motor drive and reduction gears, and in which the pulse valve has bang-bang control achieved by solenoidal or electro-pneumatic control (bang-bang defines on-or-off condition only);

[13] to provide an apparatus that is controlled by one or more computers, which initiate a test sequence, pressurize components, control metering valves, control pulse valves, exhaust fluid, sequence the time of fill, pulse, and exhaust valves, collect transducer data, render test data into graphs, compute and graphically render power and energy use, stop a test sequence, and provide memory for pre-specified tests in order to reproduce identical test sequences, store test data, store historical records, and generate reproducible results from dynamic tests of fluid control devices and fluid systems;

[14] to provide an apparatus for testing HPHFFR devices and systems that promotes an environment in which manufacturers, re-builders, and users of fluid control devices can conduct routine dynamic tests of the devices to ensure quality control and acceptable device performance;

[15] to provide an apparatus for testing economically each and every new, used, or rebuilt fluid control device, including gas-lift valves employed to produce hydrocarbon products, after manufacture, at sale, after shipping, before entering a well, upon retrieval from a well, before rebuilding, and after rebuilding;

[16] to provide an apparatus and methods that define the dynamic performance characteristics of a fluid control device or fluid system by tables and graphs, which information can follow a device or system throughout its useful life;

[17] to provide an apparatus with a HPHFFR test chamber that permits individual fluid control devices of various type and manufacture to be installed in and removed from a test chamber in seconds;

[18] to provide an apparatus and methods which can increase the number of facilities throughout the world that are capable of testing and evaluating the dynamic performance characteristics of fluid control devices and fluid systems, because the apparatus and methods can significantly reduce their cost and complexity;

[19] to provide an apparatus and methods that produce an alternative to the current equipment and methods of characterizing the performance of flow control devices, such as gas-lift valves, through expensive "benchmark" tests of a single device, which all other devices of the same manufacture are then assumed to match;

[20] to provide an apparatus and methods to assist in determining the cause of shut-down of a producing hydrocarbon well, when hydrocarbon production is lifted by gas-lift valves that may have failed or become defective;

[21] to provide an apparatus that can generate controlled backpressure on fluid control devices and fluid systems, so that testing and evaluating such devices and systems under various backpressure conditions can be achieved;

[22] to provide an apparatus for HPHFFR systems that can maintain, for a reasonably short dynamic testing period, pressure within a test chamber or a fluid system, which pressure is within pressure boundaries, by generating a positive (high pressure) energy pulse to achieve fluid flow into the chamber or system, and, simultaneously, generating a negative (exhaustive) energy pulse to a lower pressure or to the atmosphere, which removes fluid from the chamber or system;

[23] to provide a method to evaluate open- or partly-open-to-the-atmosphere dynamic test data for a fluid control device or fluid system by rendering the temperature, pressure, differential pressure, and fluid flow rate data as a function of time, and by rendering the pressure and/or temperature data parametrically as a function of flow rate, in order to identify, evaluate, and diagnostically check basic dynamic performance parameters of the device or system;

[24] to provide impulse-type, short duration energy pulses, generally less than one-half second duration, which generate impulse-type response test data;

[25] to provide energy pulses, with durations longer than one second, that generate step, ramp, and/or steady state or near steady state response characteristics, wherein an operator chooses pulse parameters to generate impulse, step, ramp, and/or steady state or near steady state response characteristics, which response characteristics are a function of the flow capacity of the fluid control device or fluid system under test;

[26] to provide a method to generate a frequency response for a fluid control device or fluid system from a multiplicity of energy pulses with identical periods and decreasing amplitude, in order to identify, evaluate, and diagnostically check dynamic performance parameters, such as, opening pressure when fluid flow starts, closing pressure when fluid flow stops, and fluid flow rate of the device or system under test;

[27] to provide a method to use slowly increasing pressure and/or slowly decreasing pressure impressed upon or released from a fluid control device or fluid system in order to evaluate dynamic performance parameters when the system is closed-to-the-atmosphere; and, [28] to provide a method to evaluate power and energy associated with the dynamic operation of a fluid control device or fluid system, when such power and energy are derived from test data generated by impulse, step, ramp, and/or frequency input functions.

Further objects and advantages are to provide an apparatus and methods for testing and evaluating fluid control devices and fluid systems that generate graphical data in real time; that operate in a fully automatic computer mode, a semi-automatic part-computer and part-manual mode, or a manual-only mode; that overcome shortcomings of steady state testing problems by employing impulse, step, ramp, and frequency response testing, that complete tests within seconds and evaluations within minutes; that start and stop by remote control; and that initiate a new approach for measuring the dynamic properties of fluid control devices and fluid systems. Further objects and advantages will become apparent from consideration of the following descriptions and drawings.

BRIEF DESCRIPTION OF THE DRAWINGS

The FEPTS, its combinations and connections of components, its principles of operation, and the methods to test and evaluate fluid control devices and systems, will be more fully understood by the description given below with reference to the detailed description of the preferred embodiment and accompanying drawings, in which like reference numerals identify like elements in different figures, and in which related figures and elements have the same number but different alphabetic suffixes.

FIG. 6A shows a test chamber used to test fluid control devices, which test chamber includes fluid connectors and mechanical components, and upper and lower sections that are joined by a hammer union with radial arms to separate and/or remove, reattach and/or secure, the upper and lower sections of the test chamber.

FIG. 6B shows a forcing member that is inserted and secured into the top screw cap of the test chamber, which forcing member provides a pressure seal for the upper portion of the test chamber and secures the tested device seated in the test chamber.

FIG. 6C shows a side view of the top screw cap of the test chamber that screws the forcing member down and generates a force that securely seats a fluid control device within the test chamber.

FIG. 6D shows a bottom view of the top screw cap of the test chamber shown in FIG. 6C.

FIG. 6E shows a side view of a test chamber bottom insert into which an installed fluid device is seated, using a 2.54 centimeter (one inch) diameter annular spacer and which spacer is sealed by "O" rings for high pressure integrity.

FIG. 7A shows a side view of a 2.54 centimeter (one inch) TR-GLV with a 2.54 centimeter (one inch) conventional TR-GLV check valve housing screwed onto the bottom threads of the TR-GLV.

FIG. 7B shows a side view of a 3.81 centimeter (one and one-half inch) conventional TR-GLV with a 2.54 centimeter (one inch) conventional TR-GLV check valve housing screwed onto the bottom threads of the TR-GLV.

FIG. 7C shows a side view of my 2.54 centimeter (one inch) diverse length spacer, that seats a fluid control device in the test chamber, shown in FIG. 6A.

FIG. 8A shows a 2.54 centimeter (one inch) conventional WR-GLV with a 2.54 centimeter (one inch) conventional WR-GLV check valve housing screwed onto the bottom threads of the WR-GLV.

FIG. 8B shows a 3.81 centimeter (one and one-half inch) conventional WR-GLV and a 3.81 centimeter conventional WR-GLV check valve with elemental interior parts.

FIG. 8C shows the WR-GLV of FIG. 8B with my spacer of FIG. 8D screwed onto the bottom threads of the WR-GLV.

FIG. 8D shows my spacer in which the upper portion has a diameter of 3.81 centimeters (one and one-half inches) and the lower portion has a diameter of 2.54 centimeters (one inch).

FIG. 8E shows a pressure ring seal for my spacer, shown in FIG. 8D.

DETAILED DESCRIPTION OF THE DRAWINGS OF THE INVENTION

The FEPTS methods and apparatus permit widely varying equipment configurations and various testing procedures in the conduct of HPHFFR tests on HPHFFR fluid control devices and systems. Neither the mechanical, electrical, and pneumatic components; nor the test procedures and computer operations; nor the graphical renderings of test data, as described herein, should be construed as limiting the presentation of test data or the manner in which such data are acquired.

The detailed description of the drawings of the invention is intended to cover alternatives, modifications, and equivalents, as may be included within the spirit and scope of the FEPTS methods and apparatus, as defined by the appended claims.

The FEPTS methods and apparatus are described with respect to a preferred embodiment. This description should be construed, not as limiting the scope of my FEPTS, but as providing illustration of a presently preferred embodiment. For example, a first computer, designated data graph computer 54, establishes test parameters, receives test data, and generates test results for evaluation. A second computer, designated valve control computer 170, controls valve on/off timing conditions and set valve percent-open conditions. The use of two computers guarantees separation of data acquisition and valve control. A lower level of separation can be achieved by the use of a single computer with sufficient processing power and speed.

Figure 1:
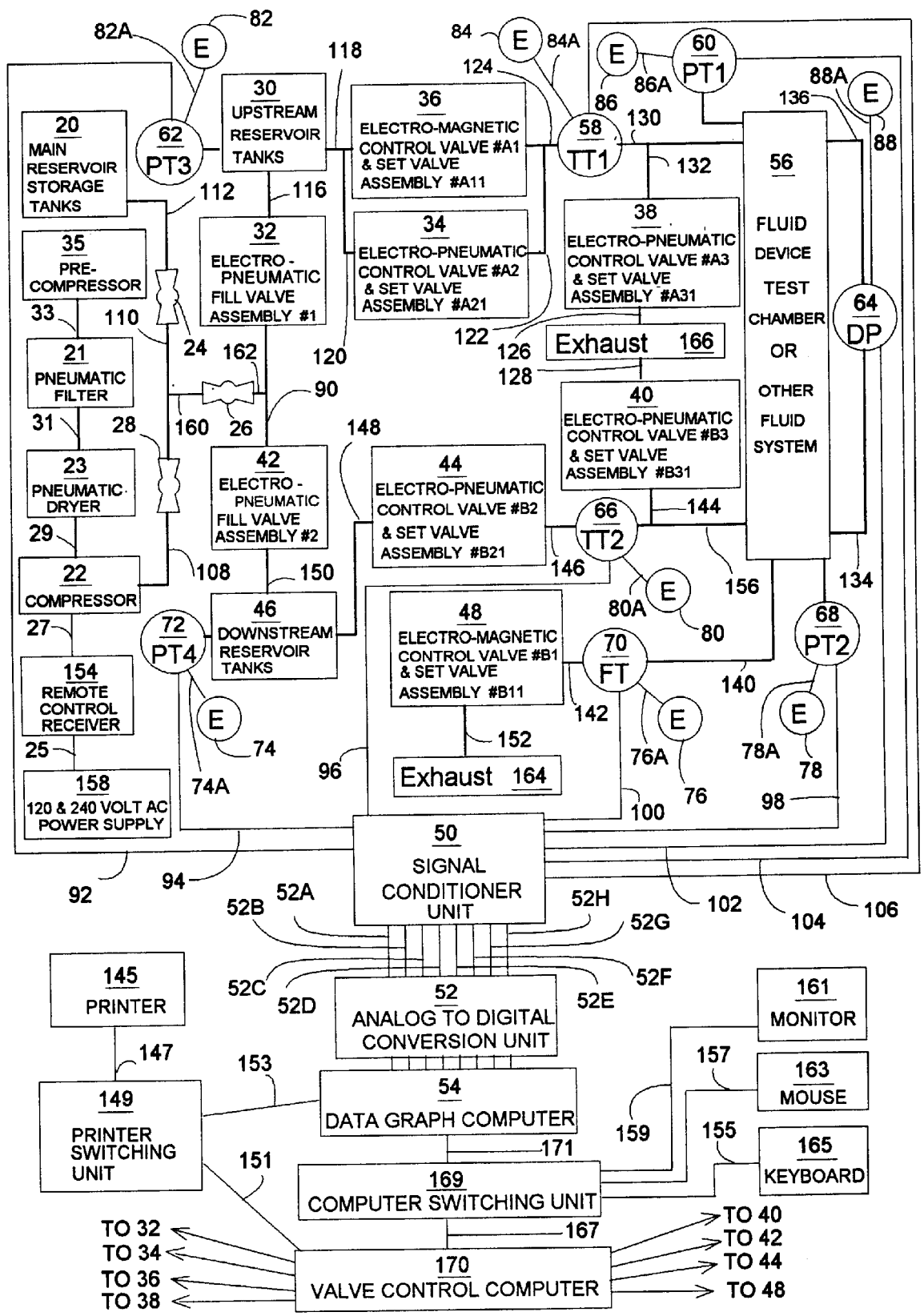
FIG. 1 shows an over-all schematic block diagram of the FEPTS apparatus, generally illustrating a compressor system; fluid reservoir tanks; a fluid device test chamber or fluid system; metering and control valves; fluid and electrical connections; pressure, temperature, and flow rate transducers; and, a computer system to automate tests of fluid control devices and systems.
Figure 2A:
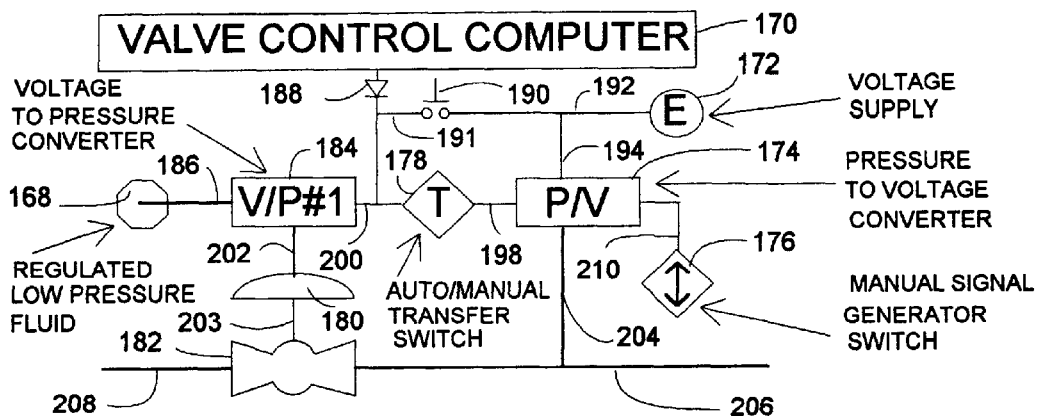
FIG. 2A shows a schematic diagram of an electro-pneumatic fill valve assembly that fills the FEPTS apparatus fluid reservoirs.
Figure 2B:
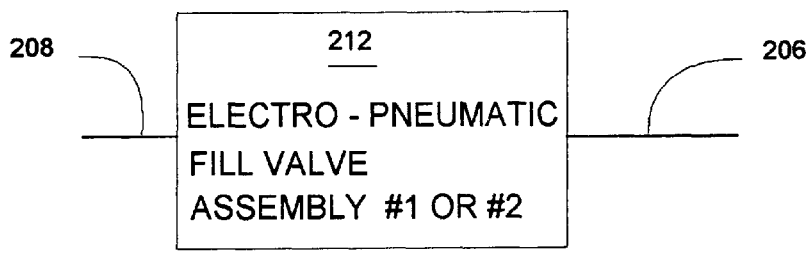
FIG. 2B shows a single block representation of the electro-pneumatic fill valve assembly shown in FIG. 2A.
Figure 11A:
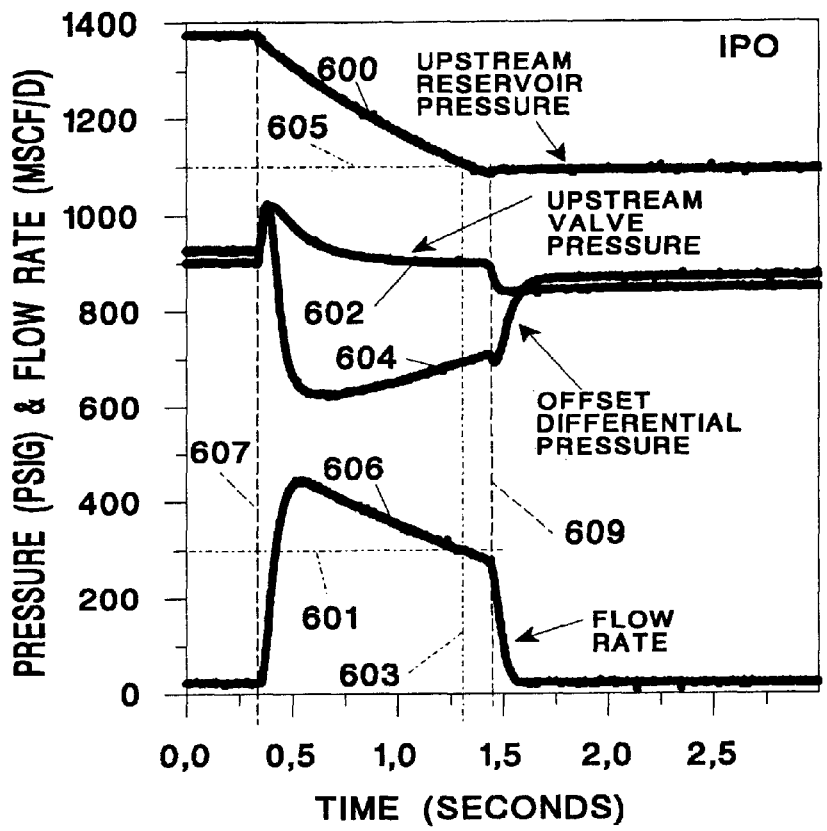
FIG. 11A shows a time-dependent graph of upstream reservoir pressure, upstream valve pressure, differential pressure, and fluid flow rate test data, that are generated from a single, one-second energy pulse applied to an IPO-GLV installed in the test chamber with the downstream exhaust pipe open-to-the-atmosphere.
Figure 12:
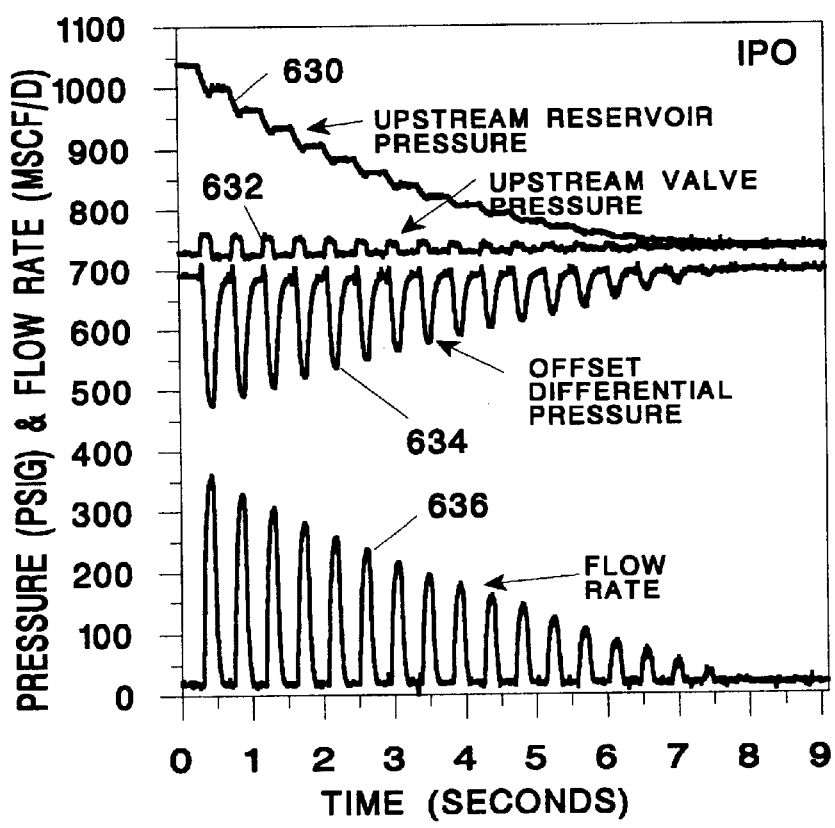
FIG. 12 shows a representative graph of data from a frequency response test of an IPO-GLV.
Figure 13A:
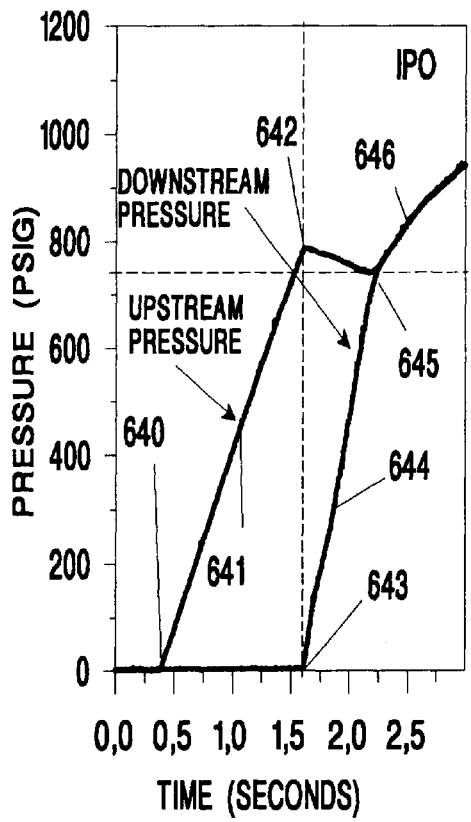
FIG. 13A shows a representative graph of data from a test of an IPO-GLV in a closed-to-the-atmosphere system, in which the pressure in the test chamber is slowly increased until the IPO-GLV dynamics characteristics of opening are observed.
Figure 14A:
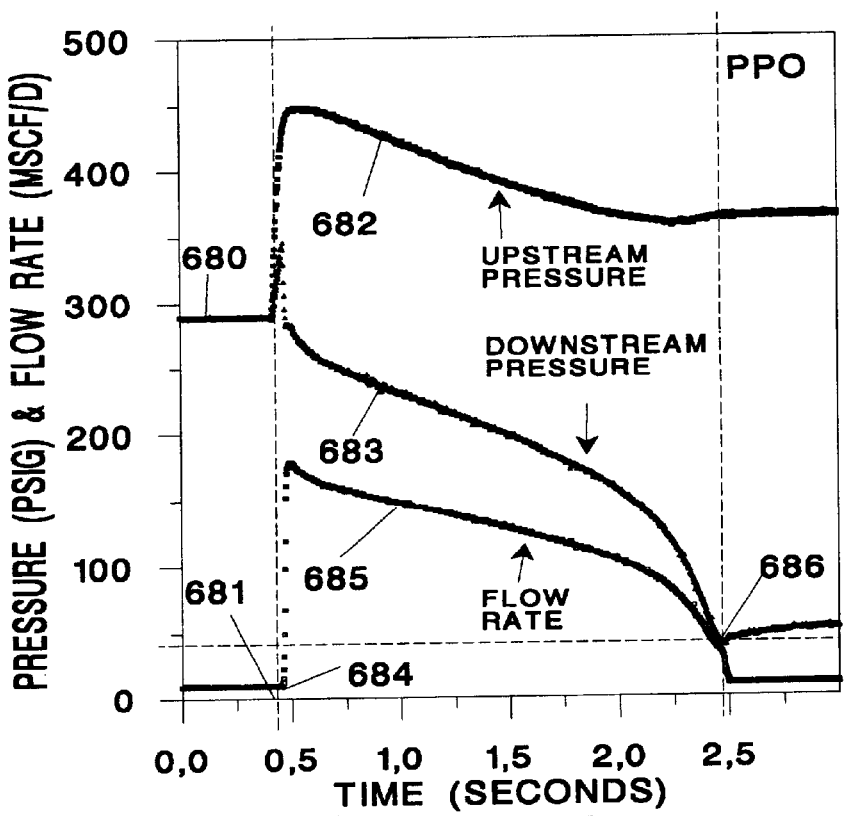
FIG. 14A shows a representative, time-dependent graph of data from a test of a PPO-GLV, in which upstream pressure, downstream pressure, and fluid flow rate data are generated by a two-second energy pulse and a two-second downstream exhaust pulse applied simultaneously to cause fluid flow through the PPO-GLV.
Figure 15:
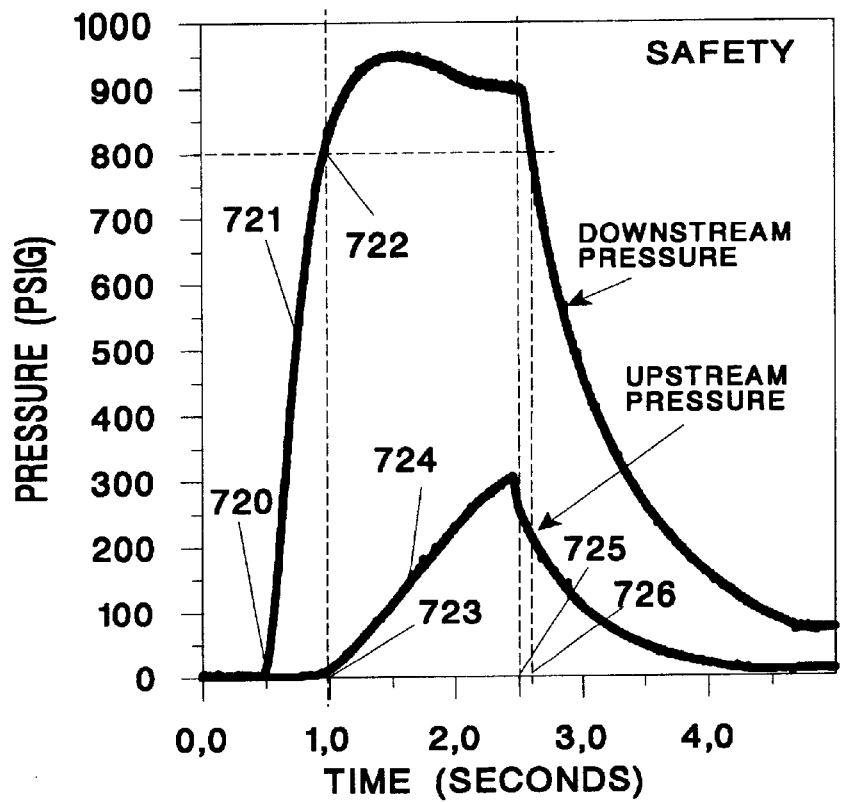
FIG. 15 shows a representative graph of data from a test of a safety valve installed in the FEPTS test chamber with a diverse length spacer shown in FIG. 7C.

FEPTS mechanical, electrical, and pneumatic components are described in FIGS. 1, 2A and 2B; 3A and 3B; 4A and 4B; 5A and 5B; 6A, B, C, D, E, F, and G; 7A, B, and C; and, 8A, B, C, D, and E. Test procedures and computer operations are described in FIG. 9 and FIG. 10. Graphical renderings of test data for typical conventional fluid control devices are shown in FIGS. 11A, B, and C; FIG. 12; FIGS. 13A, B, C, and D; FIGS. 14A, B, C, and D; FIG. 15; and FIG. 16. An isometric perspective view of the FEPTS apparatus is shown in FIG. 17.

Accordingly, the FEPTS apparatus is described schematically in FIG. 1, which shows main reservoir storage tanks 20 charged with compressed fluid from compressor 22 through compressor outlet pipe 108, compressor ball valve 28, compressor and main reservoir tank valve pipe connections 110, main reservoir ball valve 24, and pipe into main reservoir storage tanks 112. A 120-volt AC power supply and a 240-volt AC power supply 158 provide electric power. Power cords 25 for 240-volt AC and 120-volt AC power connect 240-volt AC power to compressor 22 and 120-volt AC power to a compressor remote control receiver 154. Receiver 154 turns compressor 22 on or off through electrical power connection 27 by a remote control transmitter 316 (not shown in FIG. 1; shown in FIG. 5A). Fluid is supplied to compressor 22 through compressor inlet pipe 29 by a pre-compressor 35 through a pneumatic filter 21, a filter inlet pipe 33, a pneumatic dryer 23, and a dryer inlet pipe 31. Fluid compressed in main reservoir storage tanks 20 is connected to upstream reservoir tanks 30 and downstream reservoir tanks 46 through electro-pneumatic bang-bang fill valve assembly #1 32 and electro-pneumatic bang-bang fill valve assembly #2 42. A generic electro-pneumatic bang-bang fill valve assembly 32 or 42 is shown in FIG. 2A and FIG. 2B.

In FIG. 1, a manual main fill ball valve 26, and pipes 90, 116, 150, 160, and 162 connect the main reservoir tanks to the electro-pneumatic bang-bang fill valve assemblies 32 and 42. Manual ball valves 24, 28, and 26 are backup valves to ensure the safety and integrity of compressor 22 and main storage tanks 20 when the FEPTS apparatus is shut down for long periods of time. Referring briefly to FIG. 2B, the illustrated generic electro-pneumatic bang-bang fill valve assembly 212 includes generic inlet pipe 208 and generic outlet pipe 206.

FIGS. 2A and 2B represent either electro-pneumatic fill valve assembly #1 32 or fill valve assembly #2 42, shown in FIG. 1. Regulated low pressure process fluid 168 is used to activate low pressure pneumatic actuator 180 which is connected by mechanical linkage 203 to high pressure ball valve 182. Fluid 168 opens and closes valve 182 to permit high pressure fluid flow from main storage tanks 20 into upstream or downstream reservoir storage tanks 30 or 46, through inlet pipe 208 and through outlet pipe 206. In FIG. 2A, fluid 168 is connected to voltage-to-pressure converter V/P#1 184 (also, voltage-to-pressure switch) through low pressure pipe 186. When converter 184 is activated, low pressure fluid enters low pressure pneumatic actuator 180 through pipe 202. Actuator 180 is coupled to valve 182 by linkage 203.

In FIG. 2A, three methods of filling are illustrated, all of which open and close valve 182 to permit high pressure fluid at inlet pipe 208 to enter upstream or downstream reservoir tanks 30 or 46 through outlet pipe 206. Filling is achieved, one, when manual override switch 190 connects voltage from voltage source 172 by electrical leads 191 and 192 to activate regulated low pressure process fluid 168 by converter 184 with auto/manual transfer switch T 178, connected to converter 184 by electrical leads 200 in either auto or manual positions, because switch 190 applies voltage to converter 184; or, two, when valve control computer 170 sends a voltage signal through computer protection diode #1 188 to operate converter 184 to open or close valve 182; or, three, when on-off pressure-to-voltage set-point pressure converter 174 (also, pressure-to-voltage switch) connected to voltage supply 172 by electrical leads 192 and 194, to auto/manual transfer switch 178 by electrical leads 198, to manual signal generator P/V switch 176 by electrical leads 210, and to high pressure by pipe 204, is automatically activated by a pre-selected setpoint pressure.

Fill pressure can be maintained at a specified set point by adjusting switch 176. Switch 178 determines if fill pressure will be maintained at a specific set point while using fluid stored in upper or lower reservoir tanks 30 or 46.

Referring again to FIG. 1, upstream reservoir tanks 30 are connected to fluid device test chamber or other complete fluid system 56 by pipes 118, 120, 122, 124, and 130, through electro-magnetic control valve #A1 and set valve assembly #A11 36 and bypass electro-pneumatic control valve #A2 and set valve assembly #A21 34. Upstream piping is also connected to exhaust to the atmosphere 166 by pipes 132 and 126 through electro-pneumatic control valve #A3 and set valve assembly #A31 38. Assemblies 36 and 34 provide precise control of fluid energy pressure pulses to test chamber 56. Assembly 38 provides precise control of fluid exhaust to the atmosphere from upstream test chamber 56 and its adjoining piping system.

Figure 3A:
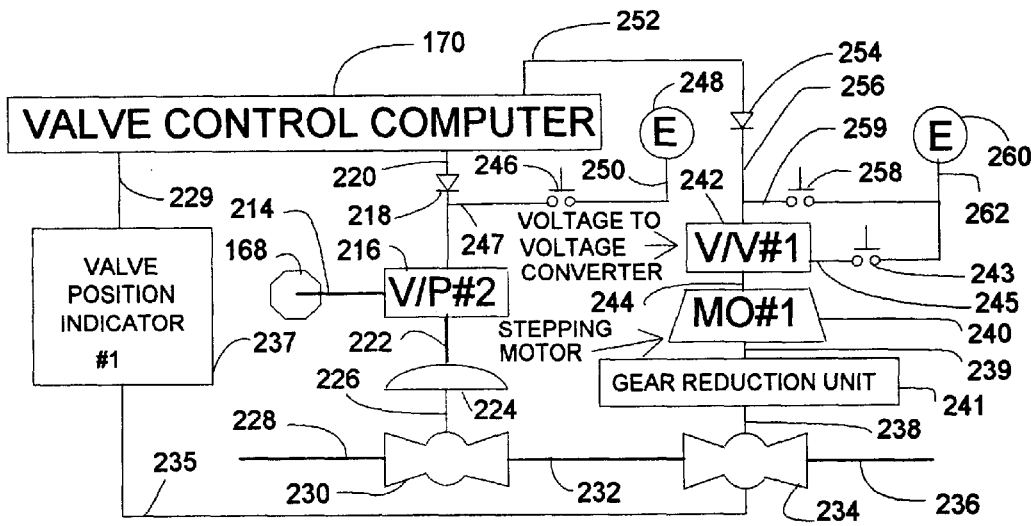
FIG. 3A shows a schematic diagram of an electro-pneumatic control valve and set valve assembly that controls fluid energy used in tests of fluid control devices and systems.
Figure 3B:
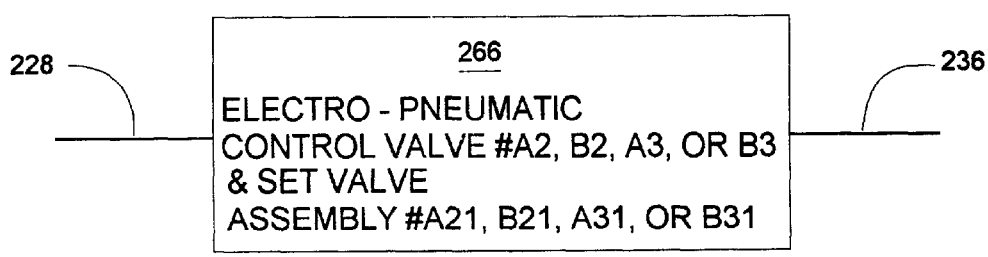
FIG. 3B shows a single block representation of the electro-pneumatic control valve and set valve assembly shown in FIG. 3A.
Figure 4A:
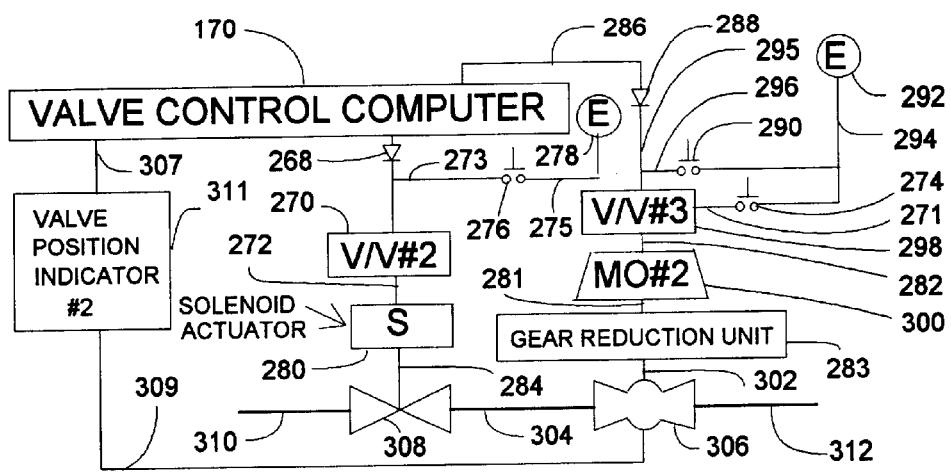
FIG. 4A shows a schematic diagram of an electro-magnetic control valve and set valve assembly that controls fluid energy used in tests of fluid control devices and systems.
Figure 4B:
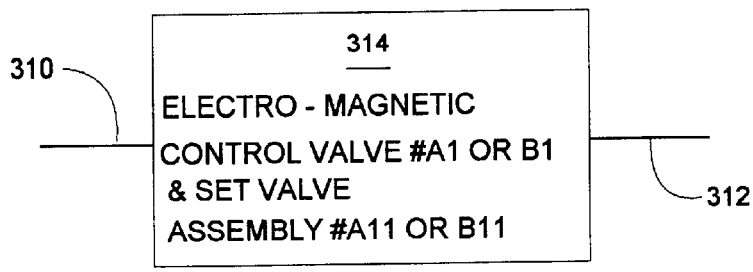
FIG. 4B shows a single block representation of the electro-magnetic control valve and set valve assembly shown in FIG. 4A.

Test chamber or fluid system 56 is connected to downstream reservoir tanks 46 by pipes 156, 146, and 148, through an electro-pneumatic control valve #B2 and set valve assembly #B21 44. Test chamber or fluid system 56 is also connected to exhaust to the atmosphere 166 by pipes 128, 144, and 156, through electro-pneumatic control valve #B3 and set valve assembly #B31 40. Test chamber or complete fluid system 56 is further connected to exhaust 164 through pipes 140, 142, and 152 through electro-magnetic control valve #B1 and set valve assembly #B11 48. Control and set valve assemblies 40 and 48 permit precise control of, and alternative paths for, exhaust of fluid to the atmosphere at exhausts 166 or 164, respectively. Control and set valve assembly 44 permits precise control of backpressure on test chamber or fluid system 56. A generic electro-pneumatic bang-bang control valve and set valve assembly 34, 38, 40, or 44 is shown in FIGS. 3A and 3B. A generic electro-magnetic bang-bang control valve and set valve assembly 36 or 48 is shown in FIGS. 4A and 4B.

In FIG. 1, upstream pressure transducer PT1 60, downstream pressure transducer PT2 68, upstream reservoir pressure transducer PT3 62, downstream reservoir pressure transducer PT4 72, and differential fluid pressure transducer DP 64 are in fluid communication with process fluid. These transducers are connected into the FEPTS apparatus by pipes and threaded pressure taps. These transducers are also connected by wiring to a signal conditioner unit 50 by signal transducer leads 104, 98, 92, 94, and 102, respectively. Differential fluid pressure transducer 64 is in fluid communication with process fluid and is connected by pipes 134 and 136 across a fluid control device within chamber 56, or across a fluid system substituted for chamber 56. Transducers 60, 68, 62, 72, and 64 are connected to electrical power supplies 86, 78, 82, 74, and 88 by leads 86A, 78A, 82A, 74A, and 88A.

In FIG. 1, fluid temperature transducers TT1 58 and TT2 66 are contained within pipes 124 and 146 to measure upstream and downstream fluid temperature during static or flowing fluid conditions. Transducers 58 and 66 are connected to signal conditioning unit 50 by electrical leads 106 and 96, respectively. Transducers 58 and 66 are also connected to power supplies 84 and 80 by leads 84A and 80A.

Fluid flow rate transducer FT 70 is connected in line with pipes 140 and 142 to measure fluid flow exhausted to atmosphere 164. Alternative embodiments (not shown) connect transducer 70 in line with pipes 156 and 146 to measure fluid flow into downstream reservoir tanks 46 or in line with pipes 124 and 130 to measure fluid flow into chamber or system 56. Clearly, a plurality of fluid flow rate transducers could be installed in the FEPTS apparatus at these upstream and downstream locations. In practice, only one transducer 70 is required for fluid flow measurement when the apparatus is configured for single-input-single-output fluid flow. If an embodiment of the apparatus requires multiple input or multiple output fluid flows, additional fluid flow transducers are placed at appropriate inlet and outlet pipes. In the preferred embodiment, transducer 70 is connected to signal conditioning unit 50 by electrical lead 100. Transducer 70 is also connected to power supply 76 by lead 76A.

In the preferred embodiment of the FEPTS apparatus, two computers monitor test data and control apparatus valves, respectively. The computers are designated data graph computer 54 and valve control computer 170. These computers are operator-controlled by a conventional computer switching unit 169 that permits each computer 54 and 170 to perform its operations independently and concurrently. One keyboard 165, one mouse 163, and one monitor 161 are used in the operation of the computers.

Signal conditioner unit 50 amplifies or attenuates transducer signals, which signals are conveyed to computer 54 by analog to digital conversion unit 52 through a plurality of signal leads 52A, 52B, 52C, 52D, 52E, 52F, 52G, and 52H.

Data graph computer 54 is connected to computer switching unit 169 by cable 171 and to printer switching unit 149 by cable 153. Valve control computer 170 is connected to unit 169 by cable 167 and to unit 149 by cable 151. Keyboard 165 is connected to unit 169 by cable 155, mouse 163 by cable 157, and monitor 161 by cable 159. The printer 145 is connected to unit 149 by cable 147.

Valve control computer 170 is connected to control valve actuators in assemblies 32, 34, 36, 38, 40, 42, 44, and 48, as shown in FIG. 2A, FIG. 3A, and FIG. 4A.

FIG. 2A and FIG. 2B are described within the description of FIG. 1 above.

FIG. 3A and FIG. 3B show a generic electro-pneumatic control valve and set valve assembly, 34, 38, 40, or 44, shown in FIG. 1. In FIG. 3B, the illustrated generic electro-pneumatic control valve and set valve assembly 266 includes generic inlet pipe 228 and generic outlet pipe 236.

In FIG. 3A, two methods of precise control of high energy fluid pressure pulses are illustrated. One method is by computer motor-positioning of a set ball valve 234. A second method is by manual motor-positioning of valve 234. Activating an assembly 266 requires setting valve 234 to a specific open setting and using ball valve 230 as a bang-bang actuator to allow passage of fluid through the assembly. Pipe 232 connects valve 230 to valve 234. Set valve position indicator #1 237 provides an electrical signal through lead 229 to indicate valve position to a computer 170 and to a conventional digital display (not shown). Indicator 237 is linked by lead 235 to valve 234, so that a change in valve stem position is translated from a mechanical position into an electrical signal. This valve position signal is displayed on a computer monitor and a conventional digital display (not shown).

In FIG. 3A, the electro-pneumatic control and set valve assembly has two manual override switches 258 and 246 to permit manual positioning of set valve 234 and control valve 230. Set valve positioning stepping motor MO#1 240 has a manual switch 243 to permit increasing or decreasing of valve opening position. Valve 230 is operated in bang-bang mode so that it is either open or closed. Control of delivered fluid energy is achieved by incremental changes in valve 234 stem position and the bang-bang operation of valve 230. Valves 230 and 234 can also be controlled by computer 170.

In FIG. 3A, computer control of valve 230 is achieved by connecting voltage-to-pressure converter V/P#2 216 to computer 170 via computer protection diode #2 218. Low pressure process fluid 168 is connected by pipe 214 to converter 216. When converter 216 is activated, low pressure fluid is sent through pipe 222 to pneumatic actuator 224, that is connected by mechanical linkage 226 to valve 230. When converter 216 is activated, valve 230 changes by a bang from fully closed to fully open. When converter 216 is deactivated, valve 230 changes by a bang from fully open to fully closed. Pneumatic actuator 224 is a conventional double-acting fluid cylinder.

In FIG. 3A, computer control of valve 234 is achieved by sending a +5 volt, direct-current voltage signal (not shown) via leads 252 and 256 through protection diode #3 254 to voltage-to-voltage converter V/V#1 242. Converter 242 supplies electrical power for rotation and direction of rotation through lead 244 to motor MO#1 240. Motor 240 is mechanically linked by linkage 239 to gear reduction unit 241 that is mechanically attached by link 238 to a conventional valve stem (not shown).

In FIG. 3A, manual control of valve 230 is achieved by manual override switch 246 connected to power supply E 248 by lead 250 and thereafter to converter 216 by lead 247. Closing switch 246 activates pneumatic actuator 224, causing valve 230 to open fully. Opening switch 246 deactivates pneumatic actuator 224, causing valve 230 to close fully. Opening and closing valve 230 generates bang-bang fluid control.

In FIG. 3A, manual control of valve 234 requires selecting a rotation direction for motor MO#1 240 with switch 243 and closing switch 258. Switch 243 is shown as a two-position switch. Switch 243 may also be a three-position switch (not shown) to accommodate left rotation, right rotation, and neutral (no rotation). Leads 262 connect switches 258 and 243 to power supply E 260. Switches 258 and 243 are connected to converter 242 by leads 259 and 245, respectively.

FIG. 4A and FIG. 4B show a generic electro-magnetic control valve and set valve assembly 36 or 48, shown in FIG. 1. In FIG. 4B, the illustrated generic electro-magnetic control valve and set valve assembly 314 includes generic inlet pipe 310 and generic outlet pipe 312.

In FIG. 4A, two methods of precise bang-bang control of high energy fluid pressure pulses are illustrated. In one method, electro-magnetic set valve 306 is motor-positioned by computer. In method two, valve 306 is motor-positioned manually. Activating assembly 314 requires setting valve 306 to a specific open setting and using solenoid pulse valve 308 as a bang-bang actuator to allow passage of fluid through the assembly. Valve 308 is connected to valve 306 by pipe 304. Valve position indicator #2 311 provides an electrical signal through lead 307 indicating valve position to computer 170 and to a conventional digital display (not shown). Indicator 311 is connected to valve 306 by lead 309 so that a change in valve stem position is translated from a mechanical position into an electrical signal. This valve position signal is displayed on a computer monitor and a conventional digital display (not shown).

In FIG. 4A, two manual override switches 290 and 276 permit manual positioning of set valve 306 and control valve 308, respectively. Valve positioning stepping motor MO#2 300 has a manual switch 274 to increase and decrease valve 306 opening position. Manual switch 290 controls on-or-off electrical power to voltage-to-voltage converter V/V#3 298. Valve 308 is operated in either open or closed bang-bang mode. Control of delivered fluid energy is achieved by incremental changes in valve 306 stem position and by the bang-bang operation of valve 308. Valves 306 and 308 can also be controlled by computer 170.

In FIG. 4A, computer control of valve 308 is achieved by connecting voltage-to-voltage converter V/V#2 270 to computer 170 through protection diode #4 268. When converter 270 is activated by computer 170, a power-amplified voltage is sent by lead 272 to activate solenoid acuator S 280. Solenoid valve stem 284 is moved to change the on-or-off state of valve 308. Valve 308 is activated as a bang-bang valve.

In FIG. 4A, computer control of valve 306 is achieved sending a +5 volt direct-current voltage signal (not shown) via leads 286 and 295 through protection diod #5 288 to converter 298. Converter 298 supplies power and direction of motion through lead 282 to motor MO#2 300. Motor 300 is attached by mechanical linkage 281 to gear reduction unit 283, which is attached by mechanical linkage 302 to a conventional valve stem (not shown) of valve 306.

In FIG. 4A, manual control of valve 308 is achieved by override switch 276 connected to power supply E 278 by lead 275 and thereafter to 270 by lead 273. Closing switch 276 activates solenoid 280, causing valve 308 to open fully. Opening switch 276 deactivates solenoid 280, causing valve 308 to close fully. Opening and closing valve 308 generates bang-bang fluid control.

In FIG. 4A, manual control of valve 306 requires selection a rotation direction for motor MO#2 300 with 274 and closing switch 290. Switch 274 is as a two-position switch. Switch 274 may also be a three-position switch (not shown) to accommodate left rotation, right rotation, and neutral (no rotation). Leads 294 connect switches 290 and 274 to power supply E 292. Switches 290 and 274 are connected to converter 298 by leads 296 and 271, respectively.

Figure 5A:
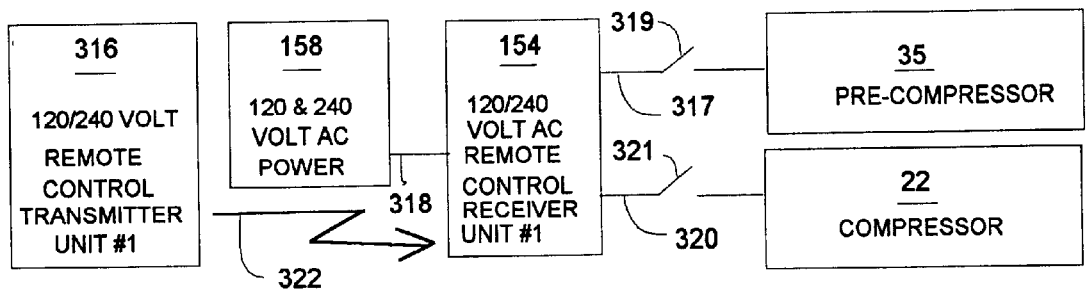
FIG. 5A shows a schematic block diagram of a remote control system to start and stop a compressor that fills FEPTS apparatus reservoir tanks with fluid.
Figure 5B:
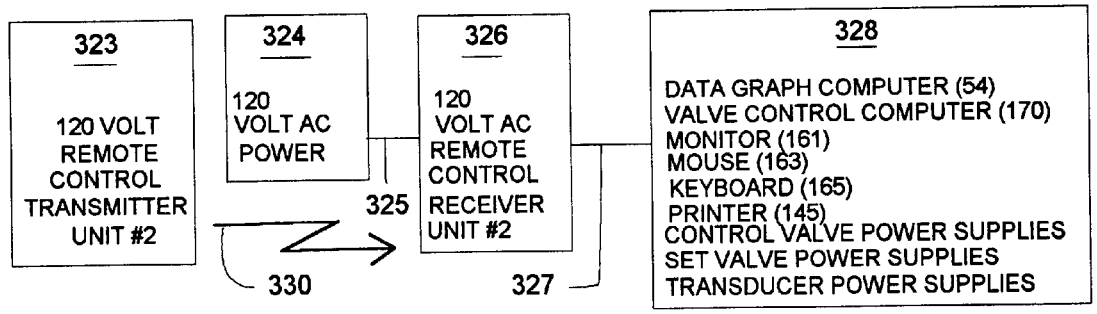
FIG. 5B shows a schematic block diagram of a remote control system that supplies power to the electrical and electronic components in the FEPTS apparatus.

FIG. 5A and FIG. 5B show schematic diagrams of remote control of electric power to operate the FEPTS apparatus. Remote control is used to insure equipment start up is performed in precisely the same sequence and to enhance personnel safety. Moreover, with remote control, the apparatus can be located, if necessary, in a conventional explosion-proof environment, while computers and other monitoring equipment are located at a distance outside of the explosion of the explosion-proof environment.

Safety of personnel is a primary consideration with HPH-FFR equipment. Safety issues are especially relevant for an operator of the FEPTS apparatus. Energy pulses with strengths of 6,996 to 13,890.8 kPa (1,000 to 2,000 psig) and above are generated. Pressure derivatives in the range of 699,605 kPa (100,00 psig) per second occur. Pesonnel safety is especially important when high pressure systems are opened and closed on a regular basis. To ensure that personnel operating the apparatus can focus upon the high pressure operations, without the requirement to remember, for example, start-up and shut-down sequences, wireless remote control by single button action is used for start-up and shut-down operations.

In FIG. 5A, remote control is shown schematically for compressor start-up and shut-down. In FIG. 5A, battery-operated remote control transmitter #1 316 transmits a remote control signal 322 to remote control receiver #1 154 (in FIG. 1). Receiver 154 is connected to 120-volt and 240-volt AC power supply 158 (in FIG. 1) by power supply leads 318. Receiver 154 is further connected to compressor 22 by power lead 320 through remote control manual override switch 321. Receiver 154 is also connected to pre-compressor 35 by 120-volt AC power supply lead 317 through remote control switch 319. Switches 319 and 321 are activated simultaneously by signal 322. When signal 322 is received by receiver 154, receiver circuitry either opens or closes switches 321 and 319. The opening or closing action depends upon the prior state of switches 321 and 319. When switches 319 and 321 are closed, compressor 22 and pre-compressor 35 will start running. If compressor 22 and pre-compressor 35 are already running, single-button wireless remote control will shut them down. Override switches 321 and 319 provide emergency shut-down of compressor 22 and pre-compressor 35.

In FIG. 5B, remote control is shown schematically for start-up and shut-down sequences of the FEPTS measurement, instrumentation, and fluid energy pulse control equipment. Battery-operated remote control transmitter #2 323 transmits a signal 330 to remote control receiver #2 326. Receiver 326 is connected to 120-volt AC power supply 324 by power lead 325 and to computers, printer, monitor, and power supplies (shown implicitly in block 328) by power leads 327. When signal 330 is received by receiver 326, receiver circuitry connects or disconnects 120-volt AC power to measurement, instrumentation and control equipment 328, depending upon the previous state of the equipment. During the start-up sequence, power to computer 170 is delayed for a period of seconds after the start-up of computer 54 so that both computers can be connected electronically to the same monitor 161, mouse 163, and keyboard 165.

Figure 6F:
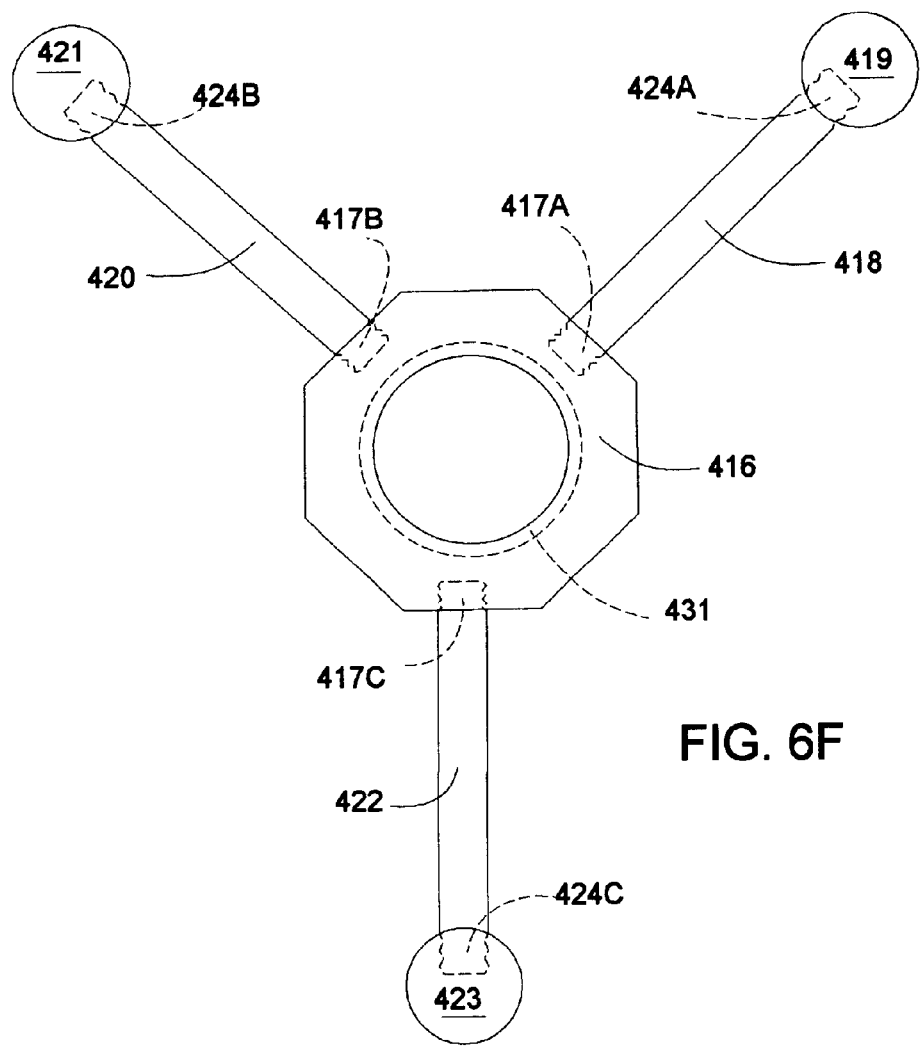
FIG. 6F shows a top view of the top portion of a hammer union with radial arms used to remove the upper half of the test chamber, shown in FIG. 6A.

FIG. 6A and related figures, FIG. 6B, FIG. 6C, FIG. 6D, FIG. 6E, FIG. 6F, and FIG. 6G, show details of-a fluid device test chamber for testing a gas-lift valve [GLV]. FIG. 6A is an example of the type of fluid device test chamber or other complete fluid system 56 and is not limiting of chambers or systems 56.

FIG. 6A shows a GLV test chamber 56, comprising the following parts: an upper chamber body 400 with void 401; with external threads 402; with an upper closed end with drilled hole to allow axial movement of forcing member 405 that holds a GLV in place; and with high pressure "O" ring 403 and "O" ring recess 404 that form a high pressure seal between forcing member 405 and upper chamber body 400;

- a forcing member 405 with flange 406 and recess bevel 407, with shaft 408 and threads 409, and with a nut 410 to secure forcing member 405 into screw cap body 413;
- a top screw cap 411 with threads 412, body 413 with interior void 414, and a hole 415 to secure forcing member shaft 408;
- a hammer union with a modified upper union nut 416 with first, second, and third radial arms 418, 420, and 422, and first, second, and third radial arm knobs 419, 421, and 423, respectively (see FIG. 6F); with an upper hammer union sleeve 425 with internal threads 426 and upper union plate 427; with a lower hammer union sleeve 428 with internal threads 429 and threaded plate 430 with plate threads 431; and with a union "O" ring 432;
- a lower chamber body 440 with upper external threads 441 and lower internal threads 442, internal void 443 and offset void 444; with a first pressure tap with body 445, internal threads 446, void 447, and a hole 448 through the lower chamber wall; with a second pressure tap with body 449, internal threads 450, void 451, and a hole 452 through the lower chamber wall; and with an upper high pressure fluid port 453 with internal threads 454 and porthole 455; and,
- a bottom insert 460 with a third pressure tap with body 462, internal threads 463, void 464, and a hole 465 through the bottom insert wall; with a fourth pressure tap with body 466, internal threads 467, void 468, and a hole 469 through the bottom insert wall; with a high pressure "O" ring 470 and external "O" ring recess 471 for lower chamber pressure seal; with first and second "O" rings 472 and 474 and internal "O" ring recesses 473 and 475 for GLV pressure seal; with a seating ridge 476; and with upper fluid path 477, center fluid path 478, and lower fluid port 479 with internal threads 480.

The inside diameter of both upper chamber body 400 and lower chamber body 440 is at least 5.08 centimeters (2.0 inches), and may be much larger, in order to permit fluid flow around an installed fluid control device.

FIG. 6B shows forcing member 405, of test chamber 56 (FIG. 6A), which includes a lower flange 406 with recess bevel 407 and an upper threaded shaft 408 with retaining threads 409. Threaded shaft 408 is secured into top screw cap body 413 at hole 415 by threads 409 and nut 410 (as shown in FIG. 6A). Forcing member 405 holds a GLV in place within test chamber 56 when top screw cap 411 is screwed onto upper test chamber body 400 (all in FIG. 6A).

FIG. 6C shows top screw cap 411 with threads 412 that permit cap 411 to be screwed onto upper chamber body 400 of test chamber 56 (FIG. 6A). A top screw cap body 413 is welded to cap 411. The inside diameter of cap body 413 is larger than the diameter of threads 412 to permit upper chamber body 400 to slide freely into cap body 413. A hole 415, drilled through the top of cap body 413, permits forcing member 405 (FIG. 6B) to be inserted and secured into screw cap 411.

FIG. 6D shows a bottom view of top screw cap 411, illustrating the diameters of threads 412, cap body 413, and hole 415 (all in FIG. 6A and FIG. 6C).

FIG. 6E shows a bottom insert 460 that is screwed into lower chamber body 440 of test chamber 56 (FIG. 6A) to seat GLVs within the test chamber. Upper external threads 461 of bottom insert 460 attach at lower internal threads 442 of lower chamber body 440. Bottom insert 460 comprises bottom insert "O" ring 470, "O" ring recess 471, first and second GLV "O" rings 472 and 474, first and second GLV "O" ring recesses 473 and 475, third and fourth pressure tap holes 465 and 469, seating ridge 476, upper fluid path 477, center fluid path 478, lower fluid port 479, and lower port internal threads 480. When bottom insert 460 is screwed into lower chamber body 440, external pressure integrity is achieved with body 440 by "O" ring 470. Internal pressure integrity for fluid passing through a GLV within test chamber 56 is achieved by "O" rings 472 and 474. Pressure taps 462 and 466 permit pressure transducer and differential pressure transducer connections to be made downstream of a GLV within test chamber 56.

FIG. 6F shows a top view of upper union nut 416 that is part of the hammer union of test chamber 56 (FIG. 6A). Upper union nut 416 is modified so that first, second, and third radial arms 418, 420, and 422 can be screwed into the union nut at threaded holes 417A, 417B, and 417C, respectively. Radial arms 418, 420, and 422 screw into knobs 419, 421, and 423, respectively, at threaded holes 424A, 424B, and 424C, respectively. Upper union nut internal threads 431 are also shown. The radial arms with knobs are used to rotate the union nut by hand in order to clamp hammer union "O" ring 432 between upper and lower hammer union sleeves 425 and 428 of test chamber 56. Upper union nut 416, radial arms 418, 420, and 422, knobs 419, 421, and 423, upper test chamber body 400, forcing member 405, and top screw cap 411 form a single unit. This unit can be separated quickly from lower test chamber body 440 by using the radial arms to unscrew the union nut, in order to insert a GLV through the lower chamber body into bottom insert 460 of test chamber 56 (all in FIG. 6A). After a GLV has been inserted, this unit can be reattached quickly to lower chamber body 440 by using the radial arms to rescrew union nut 416. When upper union nut 416 has been tightened, test chamber 56 has been secured for high pressure testing of the GLV. Gas-lift valves have been installed and/or removed within a period of thirty seconds. Pressures of 13,890.8 kPa (2,000 psig) have been applied to a newly installed GLV within five seconds after installation.

Figure 6G:
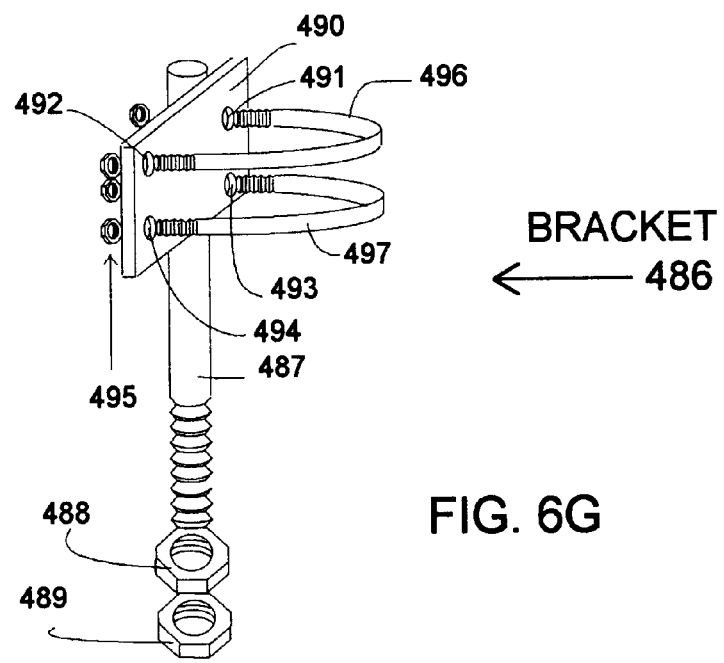
FIG. 6G shows a mounting bracket for the test chamber, shown in FIG. 6A, which mounting bracket is secured to the FEPTS frame and attached to the test chamber below the hammer union joint that separates the test chamber into an upper section and a lower section.

FIG. 6G shows bracket 486 for test chamber 56 (FIG. 6A). Bracket 486 has a threaded shaft 487 with locking nuts 488 and 489 to secure the bracket to the frame of the FEPTS apparatus. Bracket backplate 490 is welded to shaft 487. Backplate holes 491, 492, 493, and 494 permit upper and lower clamps 496 and 497 to be secured by clamp nuts 495. Clamps 496 and 497 securely hold lower chamber body 440 to backplate 490, so that upper chamber body 400, forcing member 405, and top screw cap 411 can be removed as a unit by unscrewing the test chamber hammer union, while the lower chamber body 440 remains attached to the FEPTS apparatus frame.

FIG. 7A shows a 2.54 centimeter (one inch) diameter conventional tubing retrievable gas-lift valve [TR-GLV] 500 with a 2.54 centimeter (one inch) conventional check valve housing 508 screwed onto the base of the TR-GLV at threads 503. Housing 508 is shown with lower threads 509 and outlet port 510. Top threaded bolt 501 can be removed in order to set TR-GLV 500 opening pressure. When TR-GLV 500 is installed in test chamber 56, top screw cap 411 is screwed onto upper test chamber body 400, and hammer union nut 416 is tightened. Further tightening of cap 411 causes forcing member 405 to generate an axial force on bolt 501 to hold the TR-GLV in place in test chamber 56 (see FIG. 6A). A high-pressure seal between housing 508 and bottom insert 460 is created by contact of housing 508 with "O" rings 472 and 474, when housing 508 rests on seating ridge 476 (see FIG. 6A). Fluid enters TR-GLV 500 at valve inlet port 502 and leaves at housing outlet port 510. Valve inlet port 502 is upstream, and housing outlet port 510 is downstream, of a conventional TR-GLV 500 valve stem and valve seat (not shown).

FIG. 7B shows a 3.81 centimeter (one and one-half inch) diameter conventional tubing retrievable gas-lift valve [TR-GLV] 504 with a 2.54 centimeter (one inch) conventional check valve housing 508 screwed onto the base of the TR-GLV at threads 507. Housing 508 is shown with lower threads 509 and outlet port 510. Top threaded bolt 505 can be removed in order to set TR-GLV 504 opening pressure. When TR-GLV 504 is installed in test chamber 56, top screw cap 411 is screwed onto upper test chamber body 400, and hammer union nut 416 is tightened. Further tightening of cap 411 causes forcing member 405 to generate an axial force on bolt 505 to hold the TR-GLV in place in test chamber 56 (see FIG. 6A). A high-pressure seal between housing 508 and bottom insert 460 is created by contact of housing 508 with "O" rings 472 and 474, when housing 508 rests on seating ridge 476 (see FIG. 6A). Fluid enters TR-GLV 504 at valve inlet port 506 and leaves at housing outlet port 510. Valve inlet port 506 is upstream, and housing outlet port 510 is downstream, of a conventional TR-GLV 504 valve stem and valve seat (not shown).

FIG. 7C shows my 2.54 centimeter (one inch) diameter diverse length spacer 512, with internal threads 513 and port 514, that can be attached to a TR-GLV 500 (FIG. 7A), a TR-GLV 504 (FIG. 7B), and other types of fluid control devices. Threads 513 of spacer 512 are the same dimension as TR-GLV threads 503 and 507. Common TR-GLV manufacturing standards specify the same dimensions for threads 503 and 507.

When my spacer 512 is attached to a fluid control device, a pressure-tight seal is made at spacer threads 513, so that all pressurized fluid entering and/or exiting the device will flow through spacer port 514. With spacer 512 attached to a device, the device can be seated at seating ridge 476 in bottom insert 460 of test chamber 56, so that a high pressure seal against "O" rings 472 and 474 is created by spacer 512 (see FIG. 6A). For example, if a 3.81 centimeter diameter TR-GLV 504 is to be installed in test chamber 56 with a complete 3.81 centimeter check valve assembly attached to its base (not shown), then a 2.54 centimeter diameter housing 508 or spacer 512 is attached to the lower threads of the 3.81 centimeter check valve assembly. A 2.54 centimeter check-valve housing meets the dimensional requirements of bottom insert 460 and performs the same function as spacer 512 of creating a high pressure seal against "O" rings 472 and 474. A complete check-valve assembly prohibits backflow of fluid through the TR-GLV.

If a 2.54 centimeter TR-GLV 500 is to be installed in test chamber 56 with a complete check valve assembly (not shown), then a 2.54 centimeter check-valve assembly is attached at threads 503. The 2.54 centimeter diameter of the check valve assembly meets the dimensional requirements of bottom insert 460 of test chamber 56.

If a small 1.5875 centimeter (⅝ inch) diameter gas-lift valve is to be tested, spacer 512 is used with conventional pipe fittings (not shown) to insert the gas-lift valve into test chamber 56 and to create a high pressure seal against "O" rings 472 and 474 (see FIG. 6A).

FIG. 8A shows a 2.54 centimeter (one inch) diameter conventional wireline retrievable gas-lift valve [WR-GLV] 540 with threaded bolt 541, latch threads 542, inlet port 544, and lower threads 545; and with conventional check valve housing 546 with internal threads 547 and outlet port 548. Housing 546 attaches to the WR-GLV at threads 545. WR-GLV 540 can be installed in test chamber 56 with or without a complete check valve assembly (not shown). In either case, a high pressure seal between housing 546 and bottom insert 460 is created by contact of housing 546 with "O" rings 472 and 474 (see FIG. 6A).

FIG. 8B shows a 3.81 centimeter (one and one-half inch) diameter conventional WR-GLV 550, with external components, including threaded bolt 551, latch threads 552, inlet port 554, and lower threads 555; and with internal components, including nitrogen chamber 564, nitrogen chamber fill access port 562, bellows 566, valve stem 568, internal valve 570, valve seat 571, and valve seat orifice 572. FIG. 8B also shows WR-GLV 550 with a 3.81 centimeter (one and one-half inch) diameter conventional check valve assembly 573 attached at WR-GLV threads 555. Check valve assembly 573 includes check valve 575, valve seat 574, and valve spring 577; housing 576 with lower threads 580, and cap 579, with outlet port 578, attached at threads 580.

FIG. 8C shows 3.81 centimeter (one and one-half inch) diameter WR-GLV 550 of FIG. 8B with cap 579 removed and my diverse length spacer 581 screwed onto check valve assembly 573 at threads 580. Pressure seal ring 585, placed in spacer 581, creates a pressure-tight seal between the spacer and the check valve 573, so that all fluid that enters valve inlet port 554 will leave at spacer outlet port 583. When WR-GLV 550 is installed in test chamber 56, the lower section of spacer 581 forms a high pressure seal with "O" rings 472 and 474 (FIG. 6A). WR-GLV 550 can be tested with the check valve assembly 573 removed. In this case, the internal components of check valve assembly 573 can also be removed and my spacer 581 attached to check valve housing 576 at treads 580. The combined housing 576 and spacer 581 can then be attached to WR-GLV 550 at threads 555. Alternatively, check valve assembly 573 can be removed and my spacer 581 attached directly to WR-GLV 550 at threads 555 (configuration not shown).

FIG. 8D shows my diverse length spacer 581 with inlet port 582 and outlet port 583; with pressure seal ring 585; and with internal threads 584 that match lower threads 555 of WR-GLV 550, or lower threads 580 of housing 576 of check valve assembly 573 that is attached to WR-GLV 550. The diameter of the upper section of spacer 581 is 3.81 centimeters (one and one-half inches) to match the dimensions of WR-GLV 550. The diameter of the lower section of spacer 581 is 2.54 centimeters (one inch), so that the spacer will form a high pressure seal with "O" rings 472 and 474 of bottom insert 460 when WR-GLV 550 is inserted into test chamber 56 (FIG. 6A).

FIG. 8E shows a perspective view of pressure seal ring 585 that creates a high pressure seal between my spacer 581 and housing 576 at threads 580 of check valve assembly 573, when the spacer and housing are attached to WR-GLV 550 at lower threads 555. When check valve assembly 573 is removed, spacer 581 can be attached to WR-GLV 550 at threads 555 (configuration not shown). In this case, pressure seal ring 585 creates a high pressure seal between spacer 581 and WR-GLV 550 at threads 555. Pressure seal ring 585 assures that all pressurized fluid entering valve inlet port 554 will exit at spacer outlet port 583 (see FIGS. 8B, 8C, and 8D).

My diverse length spacers 512 (FIG. 7C) and 581 (FIG. 8D), used with fluid control devices in a test chamber, permit a variety of gas-lift valves to be tested, including 1.5875 centimeter (⅝ inch) TR-GLVs, 2.54 centimeter (one inch) TR-GLVs and WR-GLVs, and 3.81 centimeter (one and one-half inch) TR-GLVs and WR-GLVs, with or without a check valve assembly attached; as well as a variety of other valves of varying sizes, such as, differential pressure valves; single- and double-check valves; pilot valves; orifice valves; subsurface safety valves; and subsea gas-lift kill valves.

Figure 9:
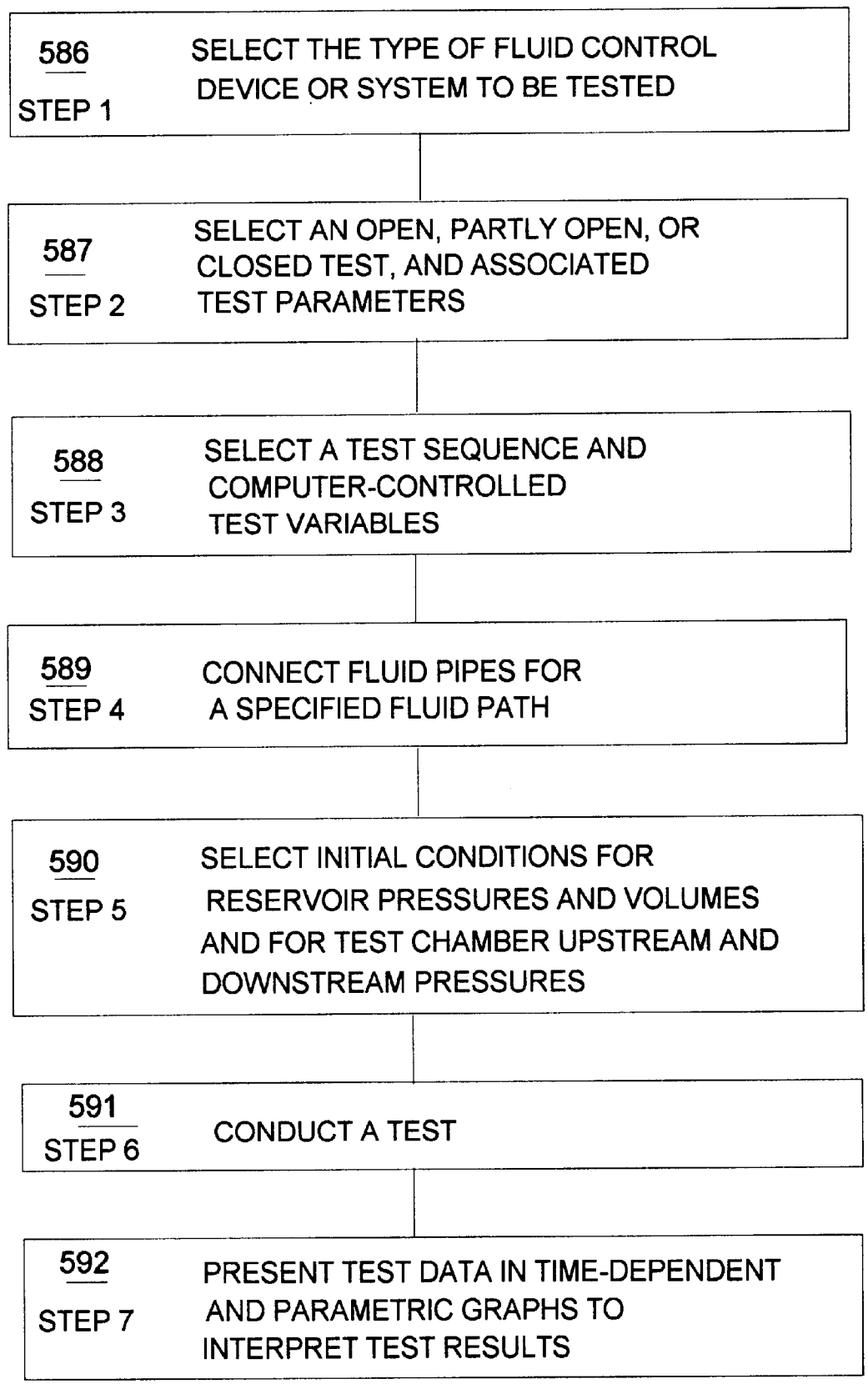
FIG. 9 shows a block diagram of steps taken by an operator of the FEPTS to conduct and to evaluate a dynamic test on a fluid control device or fluid system.

FIG. 9 shows a block diagram of a procedure, with several steps, for conducting tests to evaluate the dynamic performance of a fluid control device or fluid system. [Step 1] Selecting the fluid control device or fluid system to be tested 586 is the first step in the test process. If a test is conducted on a fluid control device, such as an IPO-GLV, test chamber 56, shown in FIG. 6A, is used. Test chambers of this type may be designed differently for different kinds of fluid control devices.

Referring to FIG. 1, if a test is conducted on a fluid system, the fluid system is attached to the FEPTS apparatus at pipe 130 which is connected to control and set valve assemblies 34, 36, and 38. Pipes 140 and 156 and their associated control and set valve assemblies 40, 44, and 48 that control backpressure and fluid flow to an exhaust are attached to the fluid system at its outlet pipes. Upstream and downstream pressure, differential pressure, temperature, and fluid flow rate transducers 60, 64, 68, 70, 66, and 58 are connected to the fluid system. These transducers provide data on the fluid system input and output dynamic performance characteristics. [Step 2] Selecting an open-, a partly-open-, or a closed-to-the-atmosphere test 587, and the associated test parameters, is the second step of the test process.

If fluid flow has a direct path to the atmosphere, the test is an open-to-the-atmosphere test. The term "open" is modified to "partly open" depending upon the port openings of the set-valve assemblies that restrict fluid flow to the atmosphere. The "openness" of a test is described by the percentage of open (zero percent to 100 percent) of each valve-port in each set valve. This percentage of openness of is displayed by digital readouts (not shown) and by computer 170 on monitor 161 (FIG. 1). When the percent open-to-the-atmosphere is greater than zero percent and less than 100 percent, a test is described as a "partly open" test. The term "closed" identifies the test condition in which all fluid used in a test is contained within the FEPTS apparatus.

Fluid control device or fluid system input and output pressures, temperatures, and flow rates are affected by how the apparatus pipes are connected to the atmosphere and by the valve-port openings of the set valve assemblies that restrict flow. The exhaust connections for a device or system may include an exhaust fluid receiver, such as downstream reservoir tanks 46 (FIG. 1), to collect all fluid used in a test. If an exhaust receiver is used, the test is a closed test. Closed tests can be conducted without installing an exhaust receiver by closing all apparatus control valves to the atmosphere. In this case, the pipes within the apparatus become a receiving reservoir for test fluid.

Tests can be designed to include backpressure. When backpressure is required, downstream reservoir tanks 46 are used as a backpressure fluid reservoir.

Example one. To test a type of gas-lift valve called an injection pressure operated [IPO] gas-lift valve, the IPO-GLV is opened by upstream pressure generated by a high-pressure upstream fluid energy pulse. The strength of this pulse is controlled by a set valve that limits the pulse energy applied to the IPO-GLV internal components. Limiting the pulse energy ensures that the internal components will not be distorted or damaged by applying a pulse containing too much energy.

In a closed test, fluid that passes through the IPO-GLV may be contained in a downstream reservoir or in the apparatus pipes. In an open test and in a partly open test, fluid is exhausted to the atmosphere. If backpressure is used to evaluate the performance of an IPO-GLV, downstream reservoir tanks 46 supply this backpressure. In a closed test, all upstream fluid passing through the IPO-GLV will be contained in the downstream reservoir tanks and the apparatus pipes. In a test with initial conditions that include downstream backpressure greater than upstream pressure on the IPO-GLV, and upstream pressure less than the valve's opening pressure, when fluid energy is applied upstream of the IPO-GLV, the upstream pressure increases to the valve's opening pressure. Subsequently, in the absence of a check valve, the IPO-GLV opens and fluid flows backward through the valve. Upstream and downstream pressures then equalize at a pressure greater than the IPO-GLV opening pressure.

Example two. To test a type of gas-lift valve called a production pressure operated [PPO] gas-lift valve, a PPO-GLV installed in test chamber 56 is opened by downstream backpressure, followed by fluid flow from upstream to downstream through the PPO-GLV. Upstream pressure greater than downstream opening pressure generates fluid flow. In a closed test, all fluid passing through the PPO-GLV will be collected in the downstream pipes and reservoir tanks. However, in an open test and in a partly open test, fluid must be exhausted to the atmosphere. Therefore, if the PPO-GLV is closed at the start of open and partly open tests, backpressure on the valve is increased until it opens. At the instant the valve aperture is opened by downstream backpressure, a high pressure energy pulse, of pressure greater than the downstream opening pressure, must be generated to cause flow through the PPO-GLV. The downstream reservoir tanks that provide backpressure to open, or to keep open, the PPO-GLV must be closed by a first control valve, and, simultaneously, a second control valve must be opened or partly opened to the atmosphere to permit the exhaust of the test fluid.

[Step 3] Selecting a pre-existing test sequence or designing a new test sequence 588 is the third step in the test process. A file for a pre-existing test sequence is in computer 170. This file will contain information about the timing sequence for each control valve and the open condition for each set-valve. Designing a new test sequence requires selecting the timing sequence for each control valve and selecting the open condition for each set valve. In either case, test variables are specified, including test sampling time, test duration, number of energy pulses, data event, test data to capture, and storage file of captured test data. A data event is defined as a particular characteristic of a data path, for example, a path that reaches a relative maximum value or a relative minimum value; or a path that breaks away from, or returns to, a given level of pressure or fluid flow.

The test sequence and test variables define the type of input function used in a given test. Pulse, step, ramp, and frequency functions are created by setting appropriate set-valve opening conditions and control-valve timing conditions. These input functions can have positive or negative features. Positive features are described by increasing pressure relationships. An energy pulse that increases from a lower pressure to a higher pressure for a finite time and then returns to its lower pressure is a positive pulse function. Similarly, a ramp function that increases from a lower pressure to a higher pressure under a steady positive pressure gradient is a positive ramp function. Positive step functions and positive frequency functions are similarly described. Negative features are described by decreasing pressure relationships. An energy pulse that decreases from a higher pressure to a lower pressure for a finite time and then returns to its higher pressure, or, in some cases of exhaust, that remains at a lower pressure, is designated a negative pulse function. Similar descriptions hold for negative ramp functions, negative step function, and negative frequency functions.

[Step 4] Connecting fluid pipes 589 is the fourth step in the test process. A given fluid path requires pipes to be connected in an open-, partly-open-, or closed-to-the-atmosphere configuration. A given pipe configuration allows upstream or downstream reservoir tanks to be filled with, partly filled with, or emptied of fluid at the start of, during, or at the end of a test. Similarly, a given pipe configuration determines how fluids are exhausted and how backpressure is applied to a tested device.

[Step 5] Selecting initial conditions 590 is the fifth step in the test process. Initial conditions include upstream and downstream test chamber pressures, upstream and downstream reservoir tank pressures, and reservoir volumes. For example, a given test may include charging test chamber 56, with a fluid control device installed, to an initial upstream pressure different from an initial downstream pressure.

Setting the pressure and volume of upstream and downstream reservoir tanks 30 and 46 requires selecting the fluid storage volume of the tanks and then charging the tanks to an initial pressure from main fluid reservoir storage tanks 20 (see FIG. 1).

In the preferred embodiment of the FEPTS apparatus, one of two volumes can be selected as the initial volume for each of the upstream and downstream reservoirs. The reservoir volumes are either a maximum volume of 0.011328 cubic meters (0.4 cubic feet), or a minimum volume of 0.03776 cubic centimeters (0.1333 cubic feet). Alternative embodiments of the FEPTS apparatus may have larger or smaller reservoir volumes, depending upon the size of the reservoir tanks.

When a reservoir volume is charged to any specific pressure and the stored fluid is discharged to generate an input function, reservoir pressure may decrease slowly or rapidly, depending upon the type of input function generated and the reservoir volume. When the reservoir volume is a minimum, less fluid is available for testing at the equivalent pressure of a maximum reservoir volume. At minimum volumes, reservoir pressure associated with fluid flow may decrease rapidly and fluid flow may also decrease rapidly. In the preferred embodiment, the maximum reservoir volume is three times the minimum reservoir volume. The maximum volume can be increased by adding reservoir tanks.

An evaluation of use of reservoir fluid by the FEPTS apparatus demonstrates that very large reservoir volumes, which reduce the change in pressure during fluid discharge, are not required, because steady state conditions can be achieved in fractions of a second. Further, large reservoir volumes require longer periods to charge and cost more to operate. Thus, small volumes of less than 0.02832 cubic meters (one cubic foot) are sufficient when using FEPTS fluid energy pulse technology. Small volumes require less energy to charge to a given pressure and take less time to complete the fluid charge than large volumes charged to the same pressure. The initial cost of small reservoir volumes is less and these reservoirs are less expensive to operate than large reservoir volumes. Large reservoir volumes are used in conventional steady state fluid test equipment. It is for this reason that there are few conventional systems available for testing and those that are available are seldom used for routine testing. The cost is prohibitive, especially for testing gas-lift valves.

[Step 6] Conducting a test 591 is the sixth step in the test process. A test is initiated by computer 170. After computer 170 starts a test, the sequence of opening and closing control valves follows the time-line of test variables specified in Step 3 588. After computer 170 starts a test, control shifts automatically to computer 54 for data acquisition. During a test, the FEPTS operator can shift manually between computers 54 and 170 by using the shift bar-switch 803 (FIG. 17), without disturbing valve control or data acquisition. During a test, computer 170 displays, on monitor 161, the on or off state of the control valves. Computer 54 displays, on monitor 161, the data paths of captured pressure, temperature, and fluid flow rate. In the preferred embodiment, the FEPTS operator shifts between computer presentations. Alternative embodiments may use two separate computer monitors or a single split-screen computer monitor. A shift bar-switch 803 used with a single monitor 161 to display computer test information is preferred, because the video display of each computer program covers the entire monitor screen and using one monitor is more cost effective than using two monitors.

[Step 7] Interpreting test data 592 is the seventh step in the test process. Interpretation may require additional tests to characterize fully a fluid control device or fluid system. New test conditions and equipment set-up may be dictated by the prior tests and by the practical application of the fluid control device or fluid system under test. For example, in Step 2 587, the first example describes an IPO-GLV test and the second example describes a PPO-GLV test. These tests illustrate how the field use of a fluid control device may dictate how a test should be conducted.

After data are acquired from a test, the data are represented by graphs to show features of the dynamic performance of the device or system. The following two graph formats are used to present data.

The first graph format presents acquired test data as a function of time. In these graphs, one or more data streams describing upstream pressure, downstream pressure, differential pressure, fluid flow rate, and temperature are shown (FIG. 11A). This type of graph is suitable for either open-, partly-open-, or closed-to-the-atmosphere test data.

Figure 11B:
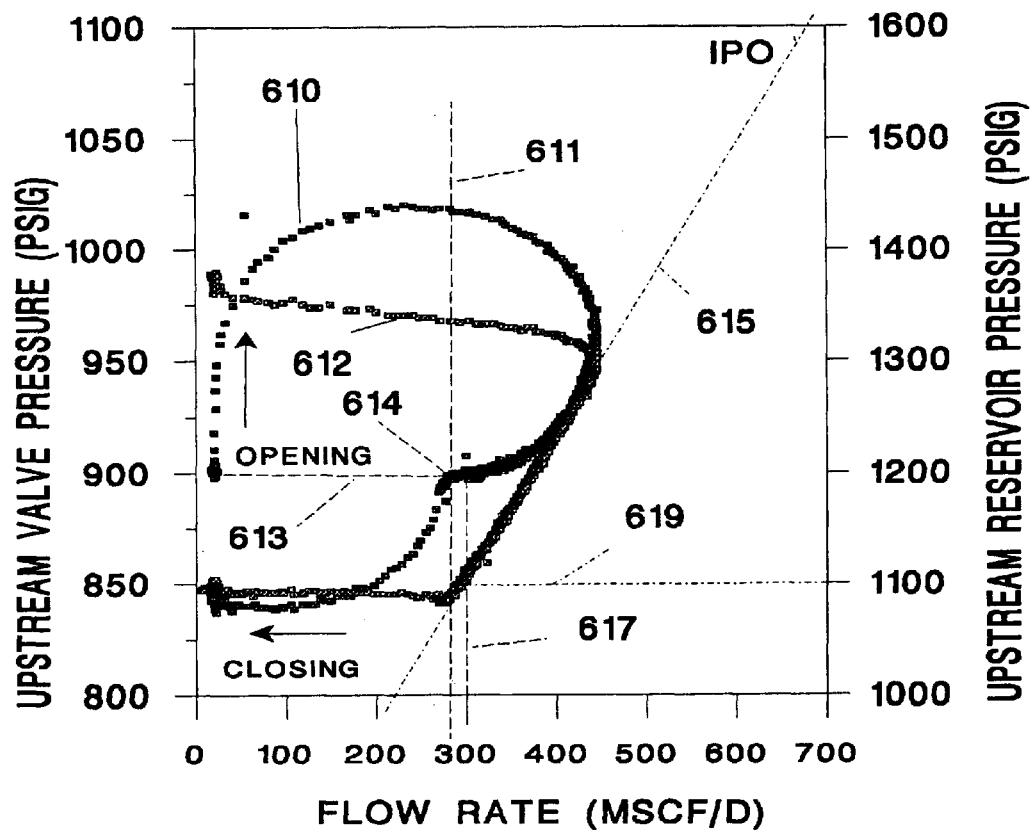
FIG. 11B shows a parametric graph (with time implicit at each datum) of upstream reservoir pressure and upstream valve pressure as a function of flow rate, using test data previously shown in FIG. 11A.

The second graph format presents test data in a parametric format, in which pressures or temperatures are shown as a function of flow rate, with time implicit at each datum. A preferred parametric format shows upstream fluid device pressure and upstream reservoir pressure as a function of flow rate through the device (FIG. 11B). This parametric representation for gas-lift valve test data, and its corresponding time-dependent representation, show fluid flow for various upstream reservoir pressures. These data illustrate how a gas-lift valve performs for various upstream pressures and various upstream reservoir pressures. This information has economic importance in the production of hydrocarbons by gas-lift. In field installations, production costs for gas-lift operations are dependent upon gas-injection compressor operations. In practice, because of the high cost of compressing gas, these compressors run at the lowest economical operating pressure.

When pulse energy is used for an input function, steady state open-valve pressure conditions are achieved within a fraction of a second. In field operations, and in manufacturing and rebuilding, individual gas-lift valves have not been uniformly tested because the conventional equipment required to test these valves uses steady state fluid measuring technology which is costly, large, and uneconomical to operate. Because energy pulses use small amounts of energy delivered by a small, mobile apparatus, testing with energy pulses is economical for evaluating every gas-lift valve.

Computations performed on test data include: fluid flow rate computed from absolute pressure, fluid temperature, and calibrated parameters for specific conventional critical flow nozzle [CFN] flowmeters (FIGS. 11A and 14A); fluid power computed by the multiplication of fluid pressure and fluid flow rate at each datum (FIG. 11C); and fluid energy computed by the integration of fluid power over time. Data generated from these computation are rendered on the same time scale as actual test data and are described as computed test data.

Figure 10:
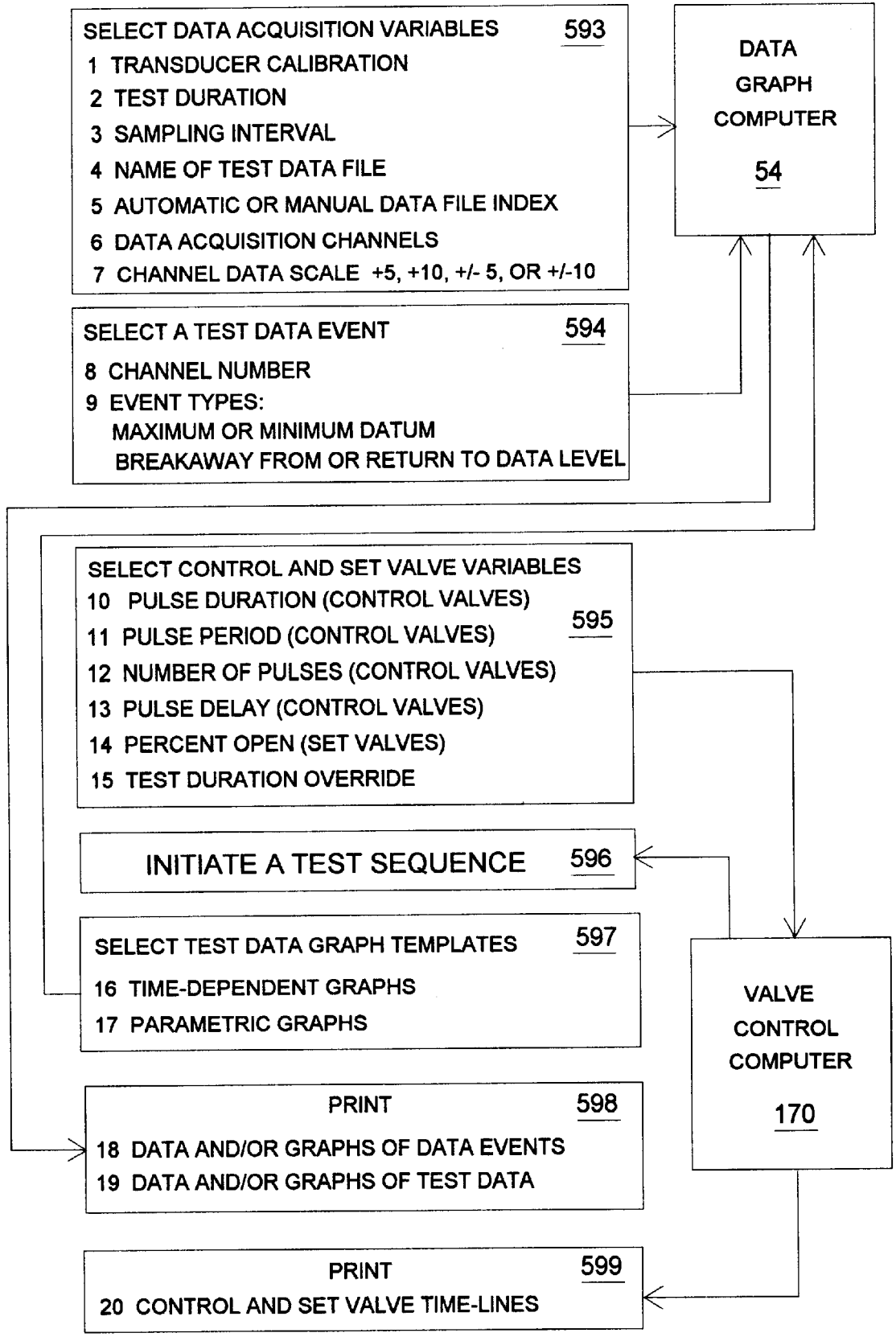
FIG. 10 shows a block diagram of computer operations that automate a test of a fluid control device or fluid system.

FIG. 10 shows a block diagram of computer operations associated with FEPTS test procedures described in FIG. 9. Operation of data graph computer 54 requires selecting data acquisition variables 593; selecting a test data event 594; selecting test data graph templates 597; and printing test data graphs 598. Operation of valve control computer 170 requires selecting control and set valve variables 595; initiating a test sequence 596; and printing control and set valve time-lines 599.

In the preferred embodiment, after all test variables are selected, computer 170 initiates a test. Immediately following test initiation, control of data acquisition is transferred to computer 54, which acquires data from transducers and presents these data on computer monitor 161. Simultaneously, computer 170 controls the openings, closings, and settings of apparatus control and set valves. After a test is completed, selected data are printed from computer 54 or computer 170. The use of two computers to perform various testing activities is not limiting. All computer operations undertaken by computer 54 and computer 170 can be undertaken by a single computer, provided that the single computer has sufficient speed and memory capabilities, and that the single computer permits multiple programs to run concurrently.

The use of one computer to control tests and another computer to acquire data has a number of advantages over the use of a single computer.

One, no special internal computer components are required, because each computer communicates with the FEPTS apparatus through its printer port.

Two, data acquisition and valve control are strongly separated to ensure the isolation of strong currents, and the associated strong electro-magnetic fields, required to operate electro-magnetic valves.

Three, if either computer fails, it can be replaced by an equivalent conventional computer by transferring the testing programs to the replacement computer.

These advantages result in economic benefits, because the FEPTS apparatus can be controlled with relatively slow conventional computers. For example, computer 170 operates adequately with a 33 megahertz clock. In computer 54, data acquisition of transient pressure, temperature, and flow rate is accurate at sampling times in the range of one to two milliseconds. These sampling times are adequately achieved for all sampling channels by a conventional computer with a 200 megahertz clock. Thus, the FEPTS apparatus can be operated reliably with inexpensive computers. Programs and data for operating computers 54 and 170 are listed in the COMPUTER PROGRAM LISTING APPENDIX.

A test includes turning the equipment on by remote control, charging reservoirs, and configuring upstream and downstream pipes. Data acquisition variables are entered into computer 54. As shown in Block 593, these variables include:

[1] fluid pressure, fluid temperature, and fluid flow rate transducer calibration criteria;

[2] test duration, for example, three seconds (if necessary for an expanded data presentation, computer 170 can override a test duration specified in computer 54);

[3] a sampling interval for data acquisition, for example, 0.002 seconds;

[4] a file name for test data, for example, TEST.001;

[5] yes or no for automatically indexing data files (if yes, the next test will store data in file TEST.002);

[6] data acquisition channels to record data during the test (selection ranges from one to eight channels and is generally eight channels); and, [7] the scale for data acquisition for each data channel (a data scale may be +5, +10, +/−5, or +/−10 volts).

Block 594 shows criteria for selecting a data event. Data events represent a particular attribute of a data path that reaches a relative maximum or minimum value, or a breakaway from, or a return to, a given data level. If a data event is selected, then

[8] a channel number is selected to identify the expected data event; and,

[9] a type of data event is specified from a computer-generated list of possible data events. The computer program will seek to identify the specified event on the selected channel during a test. If a specified event is found, a range of captured data and a graph of these data in the neighborhood of the event are automatically printed by computer 54.

Prior to entering control valve and set valve variables, computer control is transferred manually from computer 54 to computer 170 by using shift-bar switch 803.

As shown in Block 595, control and set valve variables are entered into computer 170. These variables include:

[10] the pulse duration (for each of eight control valves);

[11] the pulse period (for each of eight control valves);

[12] the number of pulses to be used in a test (from one to twenty-five pulses for each control valve);

[13] the pulse delay (for each of eight control valves);

[14] the percent-open condition (for each of eight set valves); and,

[15] the test duration override (if needed).

After variables [1] through [15] have been entered into the computers; and after initial conditions for upstream and downstream test chamber pressures, and for upstream and downstream reservoir pressures, have been set, computer 170 initiates a test. After the test has been initiated, control is automatically transferred from computer 170 to computer 54, which acquires the test data.

As shown in Block 597, presentation of test data is controlled by computer 54. Printed data template options include:

[16] data in time-dependent format, with from one to eight data paths of pressures, temperatures, computed flow rate, and power; and,

[17] data in parametric format, in which time is not explicitly shown.

As shown in Block 598, the data selected for presentation by computer 54 are printed. These data include:

[18] data and/or graphs of selected data events (if any); and,

[19] data and/or graphs of test data.

As shown in Block 599, the data selected for presentation by computer 170 are printed. These data include:

[20] control and set valve on-and-off times and time-line states during a test.

Graphs of data from tests performed on fluid control devices and fluid system according to the procedures outlined in FIG. 9 and FIG. 10 are presented in FIGS. 11A through FIG. 16. Neither the types of devices nor the graphs of test data are limiting. Other types of devices can be tested, and other representations of test data can be generated, by the FEPTS. The graphs herein represent test data for injection pressure operated GLVs, a production pressure operated GLV, a pressure relief safety valve, and an orifice valve. Each device was placed in test chamber 56. Each test required taking the following steps: setting up pipes and valves; setting initial conditions for pressures and flow rates; selecting valve control timing variables; selecting data acquisition and data storage variables; and evaluating test results. Key test criteria for each test include:

(a) type of fluid control device or fluid system;

(b) open-, partly-open-, and/or closed-to-the-atmosphere test conditions;

(c) upstream and downstream reservoir tank volumes;

(d) initial upstream and downstream reservoir tank pressures;

(e) initial upstream and downstream device or system pressures;

(f) initial fluid flow rate;

(g) equipment pipe configuration;

(h) type of fluid input function (pulse, step, ramp, or frequency);

(i) timing of control valves used to start and stop fluid flow;

(j) size of aperture of set valves used to control fluid energy;

(k) test duration;

(l) data events (if any);

(m) time-dependent and/or parametric presentation of captured data; and, (n) computed data paths (if any).

Criteria (h) through (n) are used to evaluate a tested device in at least two ways: one, to determine the dynamic performance for a device when it is used for fluid flow control; and, two, to determine if a tested device satisfies, or fails to satisfy, manufacturer's specifications.

Meeting manufacturer's performance criteria is critical when a fluid control device such as a gas-lift valve is used for the movement of a commodity fluid such as petroleum. However, in practice, because of the high cost of testing these devices with steady state testing technology, most of the devices, whether new or rebuilt, are not tested before they are used in petroleum production.

Designing a fluid system for operating conditions in the field requires accurate information about the amount of fluid flow through control devices at specific pressures. In the absence of accurate pressure-flow data, the requirements for a field-operated fluid system are often over-designed. Over-designing a system includes generating excessive upstream and downstream operating pressures by large stationary field-compressors. Over-designing the fluid system may ensure that the system will work; but it may also ensure that compressor operating costs are increased and that petroleum production is decreased. Because accurate flow rate data for fluid control devices, such as gas-lift valves, can be determined by tests with FEPTS apparatus and methods, the over-design of fluid systems for petroleum production becomes unnecessary, and, concomitantly, reduces the cost of field operations and the lost revenue from petroleum production.

It is known in the petroleum industry that if the design of a string of gas-lift valves to lift hydrocarbons is optimized, or nearly optimized, hydrocarbon production can be increased substantially. For example, a 300% improvement in gas-lift petroleum production was reported from a single well, when prototype electrically-controlled-from-the-surface research gas-lift valves were used to optimize production [private communication: Otis Merla Company, Halliburton Inc., Houston, Tex., 1993].

Key test criteria (h), (i), and (j), permit a variety of tests to be conducted. For example, in the preferred embodiment of the FEPTS apparatus, there are six control valves in assemblies 34, 36, 38, 40, 44, and 48, and two fill valves in assemblies 32 and 42, that can be opened or closed at any instant. The open- or closed-state of these eight valves permits 256 binary combinations. During a test, each of these eight valves may be opened or closed for any fraction of time sufficient to activate the valve. The minimum activation time for each of the eight control valves is 0.010 seconds.

The preferred embodiment includes the following six control and two fill valves:

[1] one bang-bang control valve for high-speed fluid flow from the upstream reservoir into the test chamber or fluid system;

[2] one bang-bang control valve for high-speed fluid flow from the downstream reservoir into the test chamber or fluid system;

[3] one upstream bypass bang-bang control valve for low-speed fluid flow from the upstream reservoir into the test chamber or fluid system;

[4] one downstream bypass bang-bang control valve for low-speed fluid flow from the downstream reservoir into the test chamber or fluid system;

[5] one bang-bang control valve for fluid exhaust from the upstream test chamber volume;

[6] one bang-bang control valve for fluid exhaust from the downstream test chamber volume;

[7] one bang-bang fill valve to pressurize the upstream reservoir tank and, if necessary, to recharge the tank automatically during a test; and,

[8] one bang-bang fill valve to pressurize the downstream reservoir tank and, if necessary, to recharge the tank automatically during a test.

The number of automated control and fill valves in the FEPTS apparatus gives adequate flexibility for the testing of complex fluid devices and systems under rigorous and intricate fluid flow conditions.

The preferred embodiment of the FEPTS apparatus includes six set valves that can be positioned at a valve aperture from 0.0 percent open to 100.0 percent open. The initial percentage of openness of these set valves can be changed during a test.

The preferred embodiment includes the following six set valves:

[1] one set valve to limit high-speed fluid flow from the upstream reservoir into the test chamber or fluid system;

[2] one set valve to limit high-speed fluid flow from the downstream reservoir into the test chamber or fluid system;

[3] one upstream bypass set valve to limit low-speed fluid flow from the upstream reservoir into the test chamber or fluid system;

[4] one downstream bypass set valve to limit low-speed fluid flow from the upstream reservoir into the test chamber or fluid system;

[5] one set valve to limit fluid exhaust from the upstream test chamber volume; and,

[6] one set valve to limit fluid exhaust from the downstream test chamber volume.

One use of the set valves is to ensure that fluid energy pulses are delivered during a test in such a way that internal components of a fluid control device or fluid system are not damaged. A small percent openness of the aperture of a set valve that is coupled to a control valve provides a low-strength energy pulse (that is, a pulse that contains a relatively low level of fluid energy). The level of fluid energy delivered for a given percentage of openness will depend upon the structure of the set valve.

In the preferred embodiment, each set valves is a type of ball valve. Energy pulse tests are conducted with the set valve aperture starting at 25-percent open and, if necessary, increasing the aperture in steps of one-, five-, or ten-percent to 100-percent open. A set valve aperture of less than 25-percent open that is used with a pulse-type input function usually will not provide sufficient pulse energy to the tested device. At this low percentage of openness, the small aperture of the ball valve will not permit sufficient flow of fluid to conduct a test. If a set ball valve is not opened sufficiently to deliver an energy pulse at a desired maximum pressure, pulse energy remains undelivered in the upstream reservoir because the fluid cannot flow through the set valve within the pulse time specified.

The bypass control and set valve assemblies permit superposition of input functions, such as, a multilevel input frequency function plus a slowly increasing ramp function, or a pulse function plus a slowly increasing ramp function. The set valves and control valves are coupled as control and set valve assemblies for the express purpose of controlling the energy supplied to, or delivered from, a test chamber or fluid system.

To conduct a safe HPHFFR test, the threshold level of fluid energy that is required to perturb a fluid control device or fluid system under test must be determined. This perturbation threshold may not be known before a test is conducted. FEPTS test methods ensure that the perturbation threshold can be found safely by conducting a series of tests at low energy levels. These energy levels are determined by a set valve aperture for the applied input function. Tests with the FEPTS apparatus can be started with set valve apertures in the neighborhood of zero-percent open to generate a very low strength energy pulse.

The key test criteria (h), (i), and (j), provide flexibility to generate a wide variety of test input functions, to control the explosive energy contained in input functions, and to simulate field operating conditions for fluid control devices and systems, without the need for a large stored-energy test system. It is significant that steady state and near steady state pressure conditions with variable flow rates for pressure sensitive fluid control devices, such as gas-lift valves, are achieved in less than one second in FEPTS tests. It is also significant that steady state, near steady state, and transient fluid dynamic measurements can be made with one test apparatus, while using a minimum amount of energy and a minimum amount of time.

The FEPTS apparatus is small and can be transported from one location to another. Current steady-state testing facilities require very large fluid storage capacities and fluid compressors. The small size and mobility of the FEPTS apparatus result directly from my design of the FEPTS to exploit the physical properties of short duration energy pulses. In the FEPTS apparatus, control and set valve assemblies 34, 36, 38, 40, 44, and 48 allow the manipulation of energy pulses at very high pressures and high rates of fluid flow during a test.

FIG. 11A shows data for a test of a typical injection pressure operated GLV [IPO-GLV] used in petroleum production. The IPO-GLV opens by upstream pressure on the IPO-GLV bellows when this pressure overcomes the threshold force generated by the IPO-GLV's pressurized bellows which keeps the IPO-GLV internal valve closed on its valve seat (see FIG. 8B). The IPO-GLV begins to open when movement of the bellows pulls the IPO-GLV internal valve away from the IPO-GLV valve seat. The IPO-GLV closes when upstream pressure on the bellows is reduced below the opening pressure threshold.

The key test criteria are: (a) IPO-GLV; (b) upstream closed-to-the-atmosphere and downstream open-to-the-atmosphere test; (c) maximum volume 0.011328 cubic meters (0.4 cubic feet); (d) upstream reservoir pressure 9,616 kPa (1380 psig) and downstream reservoir pressure not applicable; (e) upstream IPO-GLV pressure 6272 kPa (895 psig) and downstream IPO-GLV pressure 101.3 kPa (0.0 psig); (f) initial fluid flow rate 0.0 cubic meters per second (0.0 cubic feet per second); (g) upstream pipes closed-to-the-atmosphere and downstream pipes open-to-the-atmosphere;

(h) single energy pulse input function; (i) pulse delay 0.35 seconds from start of test and pulse duration 1.1 seconds; (j) upstream IPO-GLV set valve at 40 percent open; (k) test duration 3.0 seconds; (l) no data events; (m) time-dependent data presentation; and, (n) computed CFN flow rate.

In FIG. 11A, differential pressure 604 is offset from upstream pressure for clarity of presentation. Flow rate 606, in millions of standard cubic feet per day (MSCF/D), is determined from absolute pressure and therefore offset from zero by atmospheric pressure of 101.3 kPa (14.7 pisa) at the lowest flow rates. An energy pulse is delivered to an IPO-GLV installed in test chamber 56 at pulse start time-line 607 and terminated at pulse end time-line 609. The initial upstream IPO-GLV pressure shown on path 602 is set below the IPO-GLV opening pressure. Flow rate is shown by path 606.

The data paths in FIG. 11A show general performance characteristics of a typical pressure sensitive IPO-GLV, as described in paragraphs [1] through [9] below.

[1] The assumption that GLVs open instantaneously that is held by many petroleum engineers when designing a string of GLVs to produce petroleum from a well is clearly false. IPO-GLVs do not open instantaneously. The pressure to open an IPO-GLV must be greater than the pressure required to keep the IPO-GLV open.

This additional opening pressure is needed to overcome internal static friction forces that include bellows tension and surface tension between the internal valve and valve seat in the IPO-GLV. This feature is shown in upstream pressure path 602 and differential pressure path 604. In path 602, the upstream pressure reaches a maximum 7,134 kPa (1020 psig) at time 0.45 seconds and then decays on path 602 to a steady state opening pressure of 6,306 kPa (900 psig) before closing at time 1.45 seconds. In path 604, the differential pressure between upstream pressure and downstream IPO-GLV pressure also reaches a maximum at time 0.45 seconds. In path 604, the increasing differential pressure from its minimum value is a function of the downstream open-to-the-atmosphere piping configuration from the IPO-GLV test chamber.

[2] IPO-GLVs do not close instantaneously, as shown by the decay of upstream pressure path 602, starting at time 1.45 seconds when the pulse is terminated, to a closing pressure of 5,961 kPa (850 psig) at 1.5 seconds. This closing feature is also shown by the relative minimum of path 604 at time 1.5 seconds. When the pulse is terminated at 1.45 seconds, downstream IPO-GLV exhaust pressure decreases more rapidly than the decrease in upstream IPO-GLV pressure.

[3] Upstream reservoir pressure path 600 shows the 0.4 cubic foot volume upstream reservoir tank initial pressure condition of 9,616 kPa (1380 psig). When the input pulse is initiated at time 0.35 seconds, the rate of upstream reservoir pressure decay is determined by the time constants associated with the FEPTS apparatus and the IPO-GLV. These time constants are directly related to the upstream reservoir apertures, pipes, and volume; input and exhaust set valves apertures; test chamber upstream and downstream pipes, and, the IPO-GLV in the test chamber.

[4] The upstream reservoir time constant is the slowest (that is, longest) time constant associated with the FEPTS apparatus. It is determined by a large reservoir volume and a relatively small aperture of the input function generating set valve. This slow reservoir time constant is desirable in order to generate a nearly linear decrease in upstream reservoir pressure during a test.

[5] In engineering practice, the measurement accuracy of time dependent variables is enhanced when the time constant of a driving function is faster (that is, shorter) by a factor or ten or more than the slowest (that is, longest or dominant) time constant of the system under investigation. The dominant time constant of a typical IPO-GLV is a function of the mechanical and pneumatic properties of the bellows, including bellows volume, bellows pressure charge, and bellows surface area for incoming fluid contact. This dominant IPO-GLV time constant is illustrated in FIG. 11A by the decay from a peak opening pressure at time 0.45 seconds on path 602 to a steady state opening pressure at approximate time 1.0 seconds, which represents five time constants of duration 0.55 seconds. Therefore, the IPO-GLV opening pressure time constant is 0.110 seconds. In the FEPTS apparatus, tests have shown that the shortest rise time constant of a generated pulse can be controlled in a range of 0.005 seconds to 0.010 seconds, which satisfies the standard engineering measurement criterion. The shortest rise time constant of an energy pulse applied by the apparatus is between 11 and 22 times faster than the dominant time constant of a typical IPO-GLV.

[6] The flow rate through the IPO-GLV is shown in FIG. 11 A by path 606. The maximum flow rate is 450 MSCF/D when the IPO-GLV is driven quickly to an open state with upstream pressure higher than the pressure required to keep the IPO-GLV open. Flow rate through the valve decreases at a constant rate from approximately 1.0 seconds to IPO-GLV closure at 1.45 seconds. Just prior to IPO-GLV closure at 5,961 kPa (850 psig), the fluid flow rate is 275 MSCF/D. Lower flow rates would be shown by a longer duration energy pulse, for example, a pulse of two second duration. The linear portion of fluid flow rate path 606 can be extrapolated to zero flow rate. Zero flow rate occurs when upstream reservoir pressure reaches IPO-GLV closing pressure of 5,961 kPa (850 psig) that occurs at a time of about 3.0 seconds.

[7] The upstream fluid pressure path 602 and fluid flow rate path 606 permit accurate determination of upstream reservoir pressure needs to achieve a particular flow rate through the IPO-GLV. The flow rate through, the opening pressure of, and the closing pressure of the IPO-GLV are important variables that are used in the design of a GLV string for unloading wells and for lifting petroleum products from underground formations. The FEPTS data shown in FIG. 11A demonstrate that GLV test data can be used for gas-lift lifting designs.

[8] A method for designing IPO-GLV operating conditions by using FEPTS test data is illustrated in FIG. 11A by choosing a desired flow rate on path 606, drawing a pressure intersecting design line 603 vertically through the graph to intersect upstream reservoir pressure path 600 and upstream IPO-GLV pressure path 602. The pressure corresponding to the intersection point on path 600 provides the upstream reservoir pressure (generated by a field compressor) that is required to operate the IPO-GLV at an open pressure corresponding to the intersection point on path 602 for the chosen flow rate. For example, a flow rate of 300 MSCF/D on flow rate path 606 is selected and is shown by time flow rate design line 601, which intersects path 606. Design line 603 is drawn vertically to intersect path 600 and path 602. The upstream reservoir pressure required to deliver 300 MSCF/D through the IPO-GLV is 7,686 kPa (1100 psig), as shown by upstream reservoir pressure design line 605. For this example, an upstream IPO-GLV operating pressure of 6,303 kPa (900 psig) is shown by the intersection of line 603 and path 602.

[9] It is generally known that fluid flow through a valve assembly, when the internal valve is fully open, is different from fluid flow through the same valve assembly when the internal valve begins to move away from (that is, to open) or move toward (that is, to close) its internal valve seat. The opening and closing properties of fluid flow through a valve and the pressure generating this fluid flow can be evaluated from time-dependent paths 600, 602, 604, and 606, by expanding the time axis to include greater detail of the pressure-flow data.

However, this information is more easily evaluated from a parametric representation of the pressure and flow rate data. A parametric presentation of the test data in FIG. 11A is shown in FIG. 11B.

In FIG. 11B, upstream pressure and upstream reservoir pressure are shown as a function of flow rate. Time is explicitly removed from the graph but remains implicit in each path at each datum in FIG. 11B. Path 610 is upstream IPO-GLV pressure as a function of flow rate 606 in FIG. 11A and path 612 is upstream reservoir pressure as a function of flow rate 606 in FIG. 11A. Steady flow rate line 611 and steady opening pressure line 613 intersect at stable opening pressure point 614 when the applied energy pulse stops and the IPO-GLV begins to close. The final closing pressure is 5,961 kPa (850 psig). A stable state of full-open is shown by the leveling of path 610 and the density of its data as the path approaches point 614. This state of full-open at point 614 is defined by an upstream GLV pressure of 6,306 kPa (900 psig) and an upstream reservoir pressure of 7,548 kPa (1080 psig) obtained from the intersection of path 612 and lines 611 and 613.

The parametric presentation of data in FIG. 11B also shows transient flow rates that occur while the IPO-GLV internal valve is moving away from its valve seat (that is, is opening) and moving toward its valve seat (that is, is closing). The curvature of upstream pressure path 610 with respect to flow rate before reaching point 614 shows the IPO-GLV opening rapidly with a corresponding high rate of increase of flow rate. In a similar way, the curvature of upstream pressure path 610 with respect to flow rate after leaving point 614 shows the IPO-GLV closing with a corresponding high rate of decrease of flow rate. Parallel tangents (not shown) to points on path 610 during the initial stage of opening and the initial stage of closing can show that increasing and decreasing rates of change of pressure with respect to a change of flow rate are equal for different flow rates. This result can be interpreted as a smoothly operating internal bellows during IPO-GLV opening and closing transients. Stated differently, there are no apparent internal binding constraints and no apparent excessive internal friction acting on the bellows.

In FIG. 11B, IPO-GLV design parameters are illustrated by the ramp flow rate design line 615 that is tangent to, or co-linear with, the upstream reservoir pressure path 612. The nearly linear, with respect to flow rate, upstream reservoir pressure path 612 permits selecting a flow rate greater than 100 MSCF/D and less than 450 MSCF/D, and reading the upstream reservoir pressure needed to generate the selected flow rate. For example, parametric flow rate design line 617 at 300 MSCF/D intersects line 615 at upstream reservoir pressure of 7,686 kPa (1100 psig) shown by parametric upstream reservoir pressure intersecting design line 619. This reservoir pressure is needed to deliver 300 MSCF/D at an upstream pressure of 6,306 kPa (900 psig). The opening and closing transient IPO-GLV upstream pressures and associated flow rates determine a range of stable flow rates. Flow rates less than 100 MSCF/D for the IPO-GLV tested are within the opening and closing threshold flow rates and, while technically feasible, are not usually chosen because of the potential instability of transient opening and closing internal valve operations. If a flow rate less than 100 MSCF/D is needed, a different GLV with a smaller orifice would be a better choice for gas-lift operations.

Figure 11C:
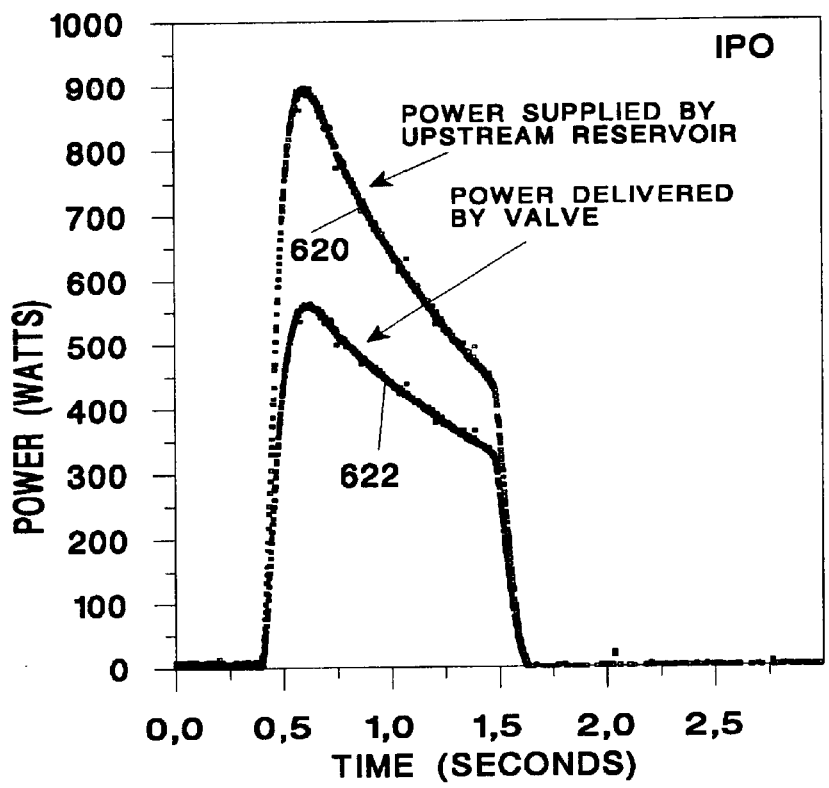
FIG. 11C shows a representative graph for power supplied to an IPO-GLV by the upstream reservoir, and power delivered by the IPO-GLV, with the downstream exhaust pipe open-to-the-atmosphere, as calculated from test data shown in FIG. 11A.

FIG. 11C shows the path of power supplied 620 to an IPO-GLV by the upstream reservoir, and the path of power delivered 622 by the IPO-GLV; these paths are associated with test data shown in FIG. 11A. Power paths 620 and 622 are computed from test pressure and flow rate data. Instantaneous power supplied is computed for path 620 by multiplying upstream reservoir pressure and flow rate, and instantaneous power delivered is computed for path 622 by multiplying upstream IPO-GLV pressure and flow rate. The energy supplied and delivered is found by integrating the power curves over the duration of the delivered energy pulse. The power consumed and energy lost during a test are illustrated by the difference in the power magnitudes of path 620 and path 622, and the difference in areas under these paths, respectively. The power consumed and energy lost are functions of pipe volumes and mechanical operations of the apparatus, and of the mechanical operation of the device under test. In FIG. 11C, energy supplied by the upstream reservoir is 0.7849 btu (822 watt-seconds), and energy delivered by the IPO-GLV is 0.511918 btu (533 watt-seconds). Energy lost in the apparatus and in the IPO-GLV is 0.2730 btu (288 watt-seconds). These power and energy responses provide a combined illustration of flow rate and pressure data for a tested device. They show a consolidation of a tested device's dynamic performance.

FIG. 12 shows data for an IPO-GLV that has been tested using a series of short duration, declining strength, periodic energy pulses. The key test criteria are: (a) IPO-GLV; (b) upstream closed-to-the-atmosphere and downstream open-to-the-atmosphere test; (c) maximum volume 0.011328 cubic meters (0.4 cubic feet); (d) upstream reservoir pressure 7,272 kPa (1040 psig) and downstream reservoir pressure not applicable; (e) upstream IPO-GLV pressure 5,169 kPa (735 psig) and downstream IPO-GLV pressure 101.3 kPa (0.0 psig); (f) initial fluid flow rate 0.0 cubic meters per second (0.0 cubic feet per second); (g) upstream pipes closed-to-the-atmosphere and downstream pipes open-to-the-atmosphere; (h) multiple energy pulse input function; (i) first pulse delay 0.35 seconds from start of test, pulse duration 0.2 seconds, and pulse period 0.4 seconds; j) upstream IPO-GLV set valve at 35 percent open; (k) test duration 9.0 seconds; (l) no data events; (m) time-dependent data presentation; and, (n) computed CFN flow rate.

Multiple pulse upstream reservoir pressure path 630 shows a step-type decrease in reservoir pressure for each pulse generated. Multiple pulse upstream IPO-GLV pressure path 632 shows small changes in pressure as the valve opens and closes from each applied energy pulse. Multiple pulse differential pressure path 634 is offset from upstream pressure path 632 for clarity. Multiple pulse fluid flow rate path 636 follows each applied energy pulse, decreasing in magnitude as a result of decreasing upstream reservoir pressure path 630. The threshold opening pressure is shown as 5,169 kPa (735 psig) in path 632. Closing pressure is shown as the flow rate stops and upstream reservoir pressure decreases to 5,100 kPa (725 psig). Precise opening and closing pressures are obtained from numerical data (not shown) used to create the paths in FIG. 12, or from single pulse tests, as previously shown in FIG. 11A and FIG. 11B. Tests of the type described in FIG. 12 show flow rate as a function of upstream reservoir pressure and of the threshold level of fluid flow through the device. In addition, a frequency function test also shows the dynamic performance of a device under rapidly changing conditions. This test simulates the field criteria of multiple openings and closings of an IPO-GLV. This test is a type of burn-in evaluation of an IPO-GLV or of another kind of fluid control device or fluid system. The FEPTS permits the control of the strength and duration of HPHFFR energy pulses so that the delivered energy does not damage the internal components of the device being tested.

FIG. 13A shows results of a closed-to-the-atmosphere test of another IPO-GLV. The key test criteria are: (a) IPO-GLV; (b) closed-to-the-atmosphere test; (c) maximum volume 0.011328 cubic meters (0.4 cubic feet); (d) upstream reservoir pressure 8,375 kPa (1200 psig) and downstream reservoir pressure not applicable; (e) initial upstream and downstream IPO-GLV pressures 101.3 kPa (0.0 psig); (f) initial fluid flow rate 0.0 cubic meters per second (0.0 cubic feet per second); (g) upstream and downstream pipes closed-to-the-atmosphere; (h) slowly increasing ramp function of upstream delivered energy; (i) ramp function delay 0.35 seconds from start of test; (j) upstream IPO-GLV set valve at 23 percent open; (k) test duration 3.0 seconds; (l) relative minimum data event; (m) time-dependent data presentation; and, (n) no computed data traces.

A slowly increasing ramp of high pressure energy is delivered to an IPO-GLV at start time of increasing upstream pressure 640. This ramp function of energy is self-extinguishing after the IPO-GLV opens to permit fluid flow. After opening, downstream pressure increases and equilibrates with upstream pressure. At equilibrium, fluid flow through the IPO-GLV ceases.

Upstream pressure change is shown by path 641, which reaches a relative maximum pressure 642 of 5,548 kPa (790 psig). The IPO-GLV opens to permit fluid flow at start time of increasing downstream pressure 643 on path of increasing downstream pressure 644. The decrease in upstream pressure from relative maximum pressure 642 to relative minimum IPO-GLV opening pressure 645 is the result of fluid flow into the closed-to-the-atmosphere pipes downstream from the IPO-GLV. A fully open IPO-GLV condition does not occur instantaneously. The fully open condition is achieved at the relative minimum pressure 645 of 5,169 kPa (735 psig). After the IPO-GLV is fully open at pressure 645, upstream and downstream pressures equilibrate and then follow path 646.

During the test of an IPO-GLV, as shown in FIG. 13A, the FEPTS data acquisition computer program seeks a relative minimum opening pressure 645 by looking at successive moving data-stream windows of 20 samples (not shown). In these successive windows, a search is made within the 20 sample windows for monotonically decreasing sampled data which are followed by monotonically increasing sampled data. When the window is found, data covering 40 samples are printed along with a line graph of the data event (not shown).

The opening pressure found from the closed-to-the-atmosphere test data, shown in FIG. 13A, is the same as the conventionally defined test-rack-open [TRO] pressure.

Figure 13B:
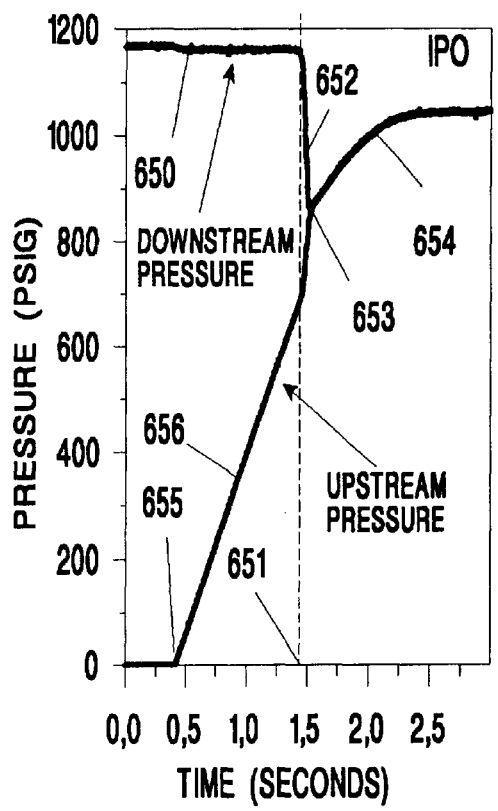
FIG. 13B shows a representative graph of data from a test of an IPO-GLV in a closed-to-the-atmosphere system, in which initial downstream pressure exceeds the IPO-GLV opening pressure.

FIG. 13B shows data for a typical opening pressure when an IPO-GLV has an initial backpressure greater than the pressure required to open the valve. The IPO-GLV opening pressure found is less than the opening pressure determined from FIG. 13A or from conventional TRO procedures. Placing a high backpressure on the valve is possible because of the different ways that the FEPTS apparatus can be configured.

In FIG. 13B, the key test criteria are: (a) IPO-GLV; (b) closed-to-the-atmosphere test; (c) maximum volume 0.011328 cubic meters (0.4 cubic feet); (d) upstream reservoir pressure 8,375 kPa (1200 psig) and downstream reservoir pressure not applicable and; (e) initial upstream IPO-GLV pressure 101.3 kPa (0.0 psig) and downstream IPO-GLV pressure 8,169 kPa (1170 psig); (f) initial fluid flow rate 0.0 cubic meters per second (0.0 cubic feet per second); (g) upstream and downstream pipes closed-to-the-atmosphere; (h) slowly increasing ramp function of upstream delivered energy; (i) ramp function delay 0.35 seconds from start of test; (j) upstream set valve at 23 percent open; (k) test duration 3.0 seconds; (l) relative minimum data event; (m) time-dependent data presentation; and, (n) no computed data traces.

In FIG. 13B, at the start of the test, initial downstream pressure 650 is 8,169 kPa (1170 psig). At start time of increase of upstream pressure 655, upstream pressure begins to increase at a liner rate along upstream pressure path 656. At start time of decrease of downstream pressure 651, the IPO-GLV opens quickly and downstream fluid back-flows through the valve, as expressed by the path of downstream pressure 652. Subsequently, upstream and downstream pressures equilibrate at point 653 and then follow a path of equilibrated pressures 654. There is a change of slope in the path of upstream pressure 656 that corresponds to the start of decrease of downstream pressure indicated at start time 651 when the IPO-GLV opens. This change of slope shows an IPO-GLV opening pressure of 4,859 kPa (690 psig). This lower opening pressure is the result of additional force exerted on the IPO-GLV internal valve by the downstream pressure.

This type of test provides information about how a typical IPO-GLV responds when backpressure on the IPO-GLV is present. Backpressure can be generated by different operating conditions, such as the failure of an IPO-GLV internal check valve.

Figure 13C:
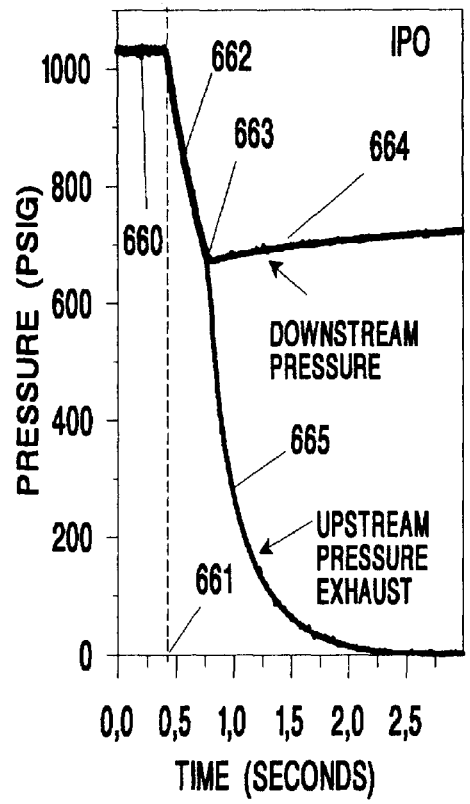
FIG. 13C shows a representative graph of data from a test of an IPO-GLV in a closed-to-the-atmosphere and pressurized test chamber, in which the upstream pressure is exhausted slowly to the atmosphere until the IPO-GLV closes.
Figure 13D:
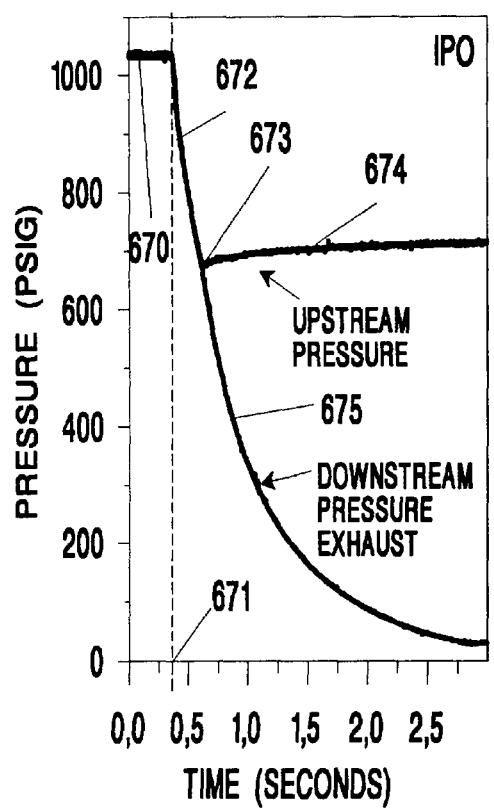
FIG. 13D shows a representative graph of data from a test of an IPO-GLV in a closed-to-the-atmosphere and pressurized test chamber, in which downstream pressure is exhausted slowly to the atmosphere until the IPO-GLV closes.

FIG. 13C and FIG. 13D show data for partly open tests to identify the closing pressure of an IPO-GLV. FIG. 13C shows data for fluid exhausted from upstream. FIG. 13D shows data for fluid exhausted from downstream. One result from these tests is the observation that the closing pressure of a pressure sensitive device may depend upon how a test fluid is exhausted. The accuracy in determining an IPO-GLV closing pressure is dependent upon the rate of change of exhaust pressure. Accurate closing pressures have been obtained by exhausting pressure at a rate of 10,444 kPa/sec. (1500 psig/sec.) or lower. Depending upon the design of the device under test, the slower the exhaust rate, the greater the accuracy of the closing pressure found. This result simulates a field condition when an IPO-GLV fluid system is shut down. It also helps to evaluate the dynamic operating properties of internal fluid device components, such as the bellows and internal valve parts of an IPO-GLV.

In FIG. 13C, the key test criteria are: (a) IPO-GLV; (b) initial upstream and downstream closed-to-the-atmosphere followed by upstream partly-open-to-the-atmosphere test; (c) maximum volume 0.011328 cubic meters (0.4 cubic feet); (d) upstream and downstream reservoir pressures not applicable; (e) initial upstream and downstream IPO-GLV pressure 7,272 kPa (1040 psig); (f) initial fluid flow rate 0.0 cubic meters per second (0.0 cubic feet per second); (g) upstream pipes closed-to -partly-open-to-the-atmosphere and downstream pipes closed-to the-atmosphere; (h) slowly decreasing ramp function of upstream energy exhausted to the atmosphere; (i) ramp function delay 0.35 seconds from start of test; (j) upstream set valve at 22 percent open; (k) test duration 3.0 seconds; (l) no data events; (m) time-dependent data presentation, and, (n) no computed data traces.

At the start of the test, upstream and downstream pressures are in equilibrium at 7,272 kPa (1040 psig) 660 and the IPO-GLV is fully open. At the start time of upstream exhaust 661, a decreasing ramp exhaust function of the upstream fluid is generated. At start time 661 the test configuration is altered from a fully closed to a partly open-to-the-atmosphere configuration. Upstream fluid is slowly exhausted to the atmosphere. After initiating the upstream exhaust, upstream and downstream exhaust pressures remain in equilibrium and follow path 662 until reaching the IPO-GLV closing pressure 663. After the IPO-GLV closes, downstream pressure follows path 664. The closing pressure 663 of the IPO-GLV for upstream exhaust control is 4721 kPa (670 psig). Upstream pressure declines to 101.3 kPa (0.0 psig) along upstream exhaust pressure path 665.

In FIG. 13D, the key test criteria are: (a) IPO-GLV; (b) initial upstream and downstream closed-to-the atmosphere followed by downstream closed- to partly-open-to-the-atmosphere test; (c) maximum volume 0.011328 cubic meters (0.4 cubic feet); (d) upstream and downstream reservoir pressure not applicable; (e) initial upstream and downstream IPO-GLV pressure 7,272 kPa (1040 psig); (f) initial fluid flow rate 0.0 cubic meters per second (0.0 cubic feet per second); (g) upstream pipes closed-to-the-atmosphere and downstream pipes closed- to partly-open-to-the atmosphere; (h) slowly decreasing ramp function of downstream energy exhausted to the atmosphere; (i) ramp function delay 0.35 seconds from start of test; (j) downstream set valve at 22 percent open; (k) test duration 3.0 seconds; (l) no data events; (m) time-dependent data presentation; and, (n) no computed data traces.

At the start of the test, upstream and downstream pressures are in equilibrium at 7,272 kPa (1040 psig) 670 and the IPO-GLV is fully open. At the start time of downstream exhaust 671, a decreasing ramp exhaust function of the downstream fluid is generated. At start time 671 the test configuration is altered from a fully closed- to a partly-open-to-the-atmosphere configuration. Downstream fluid is slowly exhausted to the atmosphere. After initiating the downstream exhaust, upstream and downstream exhaust pressures remain in equilibrium and follow path 672 until reaching the IPO-GLV closing pressure 673. After the IPO-GLV closes, upstream pressure follows path 674. The closing pressure 673 of the IPO-GLV for downstream exhaust control is 4,721 kPa (670 psig). Downstream pressure declines to 101.3 kPa (0.0 psig) along downstream exhaust path 675.

The closing pressure shown in FIG. 13C and in FIG. 13D is 4,721 kPa (670 psig). When testing for closing pressure of a particular device, the internal device geometry can affect the closing pressure result. Consequently, multiple tests with different exhausts pressure rates may be needed to evaluate the closing pressure. For example, when pressure is slowly exhausted to the atmosphere from downstream, normal flow of fluid occurs through an IPO-GLV valve orifice until the valve closes. However, when upstream fluid is exhausted to the atmosphere, reverse fluid flow occurs through an IPO-GLV valve orifice until the valve closes. A rapid reverse fluid flow, with its associated higher pressure and higher force on the internal valve of an IPO-GLV, may cause the IPO-GLV to close at a lower pressure.

FIGS. 11A, B, and C; FIG. 12; and FIGS. 13A, B, C, and D, provide a template for the dynamic performance of an IPO-GLV device. The graphical data are representative of the kinds of data that can be generated by FEPTS test methods. Such templates of performance are used to evaluate device manufacturing tolerances and device operation over extended periods of time. With respect to IPO-GLVs, FEPTS test data can prevent failed IPO-GLVs and IPO-GLVs with failing components from being installed in producing oil wells. In addition, if a well under gas-lift has stopped producing, FEPTS test data can show if an IPO-GLV contributed to the well failure. Currently, there are no other test methods for accomplishing this kind of failure analysis economically.

FIGS. 14A, B, C, and D, show dynamic performance characteristics of a typical production pressure operated GLV [PPO-GLV] installed in test chamber 56. PPO-GLVs are also called fluid valves, a term that defines a valve geometry in which an internal reverse flow check valve prevents fluid from moving upstream through the PPO-GLV. PPO-GLVs are designed with an internal valve spring, a bellows, or combined spring-bellows to hold the PPO-GLV internal valve on its valve seat. The internal reverse flow check valve and the need to open a PPO-GLV with downstream pressure require controlling the rate of increase of downstream pressure to open, and to keep open, the PPO-GLV. When the downstream pressure is greater than a threshold pressure that keeps the PPO-GLV internal valve closed on its valve seat, the PPO-GLV opens. When the downstream rate of increase of fluid flow is greater than a threshold downstream rate of increase of fluid flow, which is observable and controllable by the downstream rate of pressure increase, the PPO-GLV internal valve opens and quickly closes because the internal reverse flow check valve is activated and closes.

The data in FIGS. 14A, B, D, and D show that the FEPTS can test devices at low pressures as well as at high pressures. These data are generated by a test of a PPO-GLV preset to a TRO pressure of 1032 kPa (135 psig).

FIG. 14A shows results of a PPO-GLV test that starts from an upstream and a downstream closed-to-the-atmosphere test condition. An increasing upstream energy pulse and a decreasing downstream energy exhaust pulse are introduced simultaneously. When these energy pulses are introduced, the upstream pipes remains closed-to-the-atmosphere, but the downstream pipes changes automatically to partly-open-to-the-atmosphere. Fluid flow is exhausted to the atmosphere downstream.

Prior to the test, downstream pressure is shunted past the PPO-GLV internal valve orifice in order to generate pressure on the internal spring and bellows and, thus, to put the PPO-GLV in a fully open condition. The PPO-GLV must be fully open at the start of the test so that the flow rate through this valve can be determined. The PPO-GLV remains open as long as the force generated by downstream pressure is greater than the spring-bellows threshold force that keeps the PPO-GLV internal valve closed on its valve seat. The PPO-GLV closes when downstream pressure is reduced below the opening pressure threshold. The downstream pressure is a function of the upstream-to-downstream fluid flow through the PPO-GLV.

In FIG. 14A, key test criteria are: (a) PPO-GLV; (b) initial upstream and downstream closed-to-the-atmosphere, followed by upstream closed-to-the-atmosphere and downstream open-to-the-atmosphere test; (c) maximum volume 0.011328 cubic meters (0.4 cubic feet); (d) upstream reservoir pressure 9,616 kPa (1380 psig) and downstream reservoir pressure 6,996 kPa (1000 psig); (e) upstream and downstream PPO-GLV pressure 2,101 kPa (290 psig); (f) initial fluid flow rate 0.0 cubic meters per second (0.0 cubic feet per second); (g) upstream pipes closed-to-theatmosphere and downstream pipes closed- to open-to-the-atmosphere; (h) single upstream energy pulse input function and single downstream energy exhaust pulse function; (i) each pulse delay 0.35 seconds from start of test and each pulse duration 2.0 seconds; (j) upstream set valve at 40 percent open and downstream set valve at 100 percent open; (k) test duration 3.0 seconds; (l) no data events; (m) time-dependent data presentation; and, (n) computed CFN flow rate.

In FIG. 14A, initial upstream and downstream pressures 680 are 2,101 kPa (290 psig). The PPO-GLV is fully open. At start time of upstream energy pulse and downstream exhaust pulse 681, upstream pressure on path 682 increases and downstream pressure on path 683 increases momentarily and then decreases, as fluid exhausts to the atmosphere. At start time of measured fluid flow 684, which occurs immediately after start time 681, fluid flows through the PPO-GLV from upstream to downstream and exhausts to the atmosphere along downstream pressure path 683. A linear decrease in upstream pressure on path 682 generates a corresponding linear decrease in flow rate on path 685, until downstream pressure on path 683 begins to decrease more rapidly than upstream pressure on path 682. As downstream pressure decreases further, the PPO-GLV throttles down until it closes at closing pressure 686. At a closing pressure of 412 kPa (45 psig), the downstream pressure is not sufficient to keep the PPO-GLV open. Fluid flow rate path 685 is calculated from absolute pressure that is associated with a critical flow nozzle (CFN) flowmeter. As a result of the use of absolute pressure, path 685 is offset from zero when fluid flow is less than critical flow through the CFN.

In FIG. 14A, the data paths show general performance characteristics of a typical pressure sensitive PPO-GLV, as described in paragraphs [1] through [3] below.

[1] Testing a PPO-GLV device using an upstream increasing energy pulse and, simultaneously, a downstream decreasing energy pulse permits the device to pass fluid according to design parameters. The PPO-GLV remains open as a result of the downstream pressure generated by the flowing fluid from upstream to downstream until the downstream pressure generated by this flowing fluid falls below the closing pressure threshold, at which time the PPO-GLV closes.

[2] Over a linear range of flow rates, a fluid flow rate through the valve can be identified by choosing an upstream pressure and noting the corresponding flow rate. As the rate of decrease of fluid flow increases in the neighborhood of the closing pressure, the fluid flow capacity of the PPO-GLV is diminished. A steep negative flow rate gradient and a corresponding high sensitivity to downstream pressure in the neighborhood of the closing pressure causes a deterioration of fluid flow rate stability.

[3] The spread between opening and closing pressures is determined by the difference between an opening pressure of 1032 kPa (135 psig) and a closing pressure of 412 kPa (45 psig). The spread for the PPO-GLV tested is 621 kPa (90 psig).

Figure 14B:
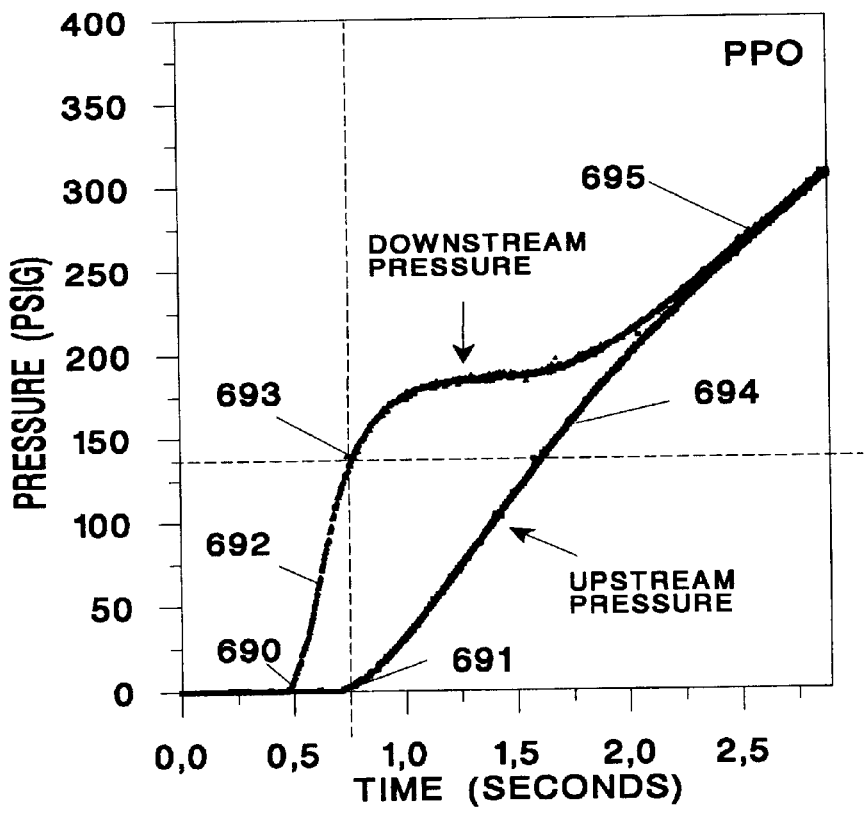
FIG. 14B shows a representative graph of data from a closed-to-the-atmosphere test of a PPO-GLV, with zero initial conditions, in which the PPO-GLV is opened by downstream pressure without activating the internal check valve of the PPO-GLV.

FIG. 14B shows data for a PPO-GLV opening pressure test. Key test criteria are: (a) PPO-GLV; (b) closed-to-the-atmosphere test; (c) maximum volume 0.011328 cubic meters (0.4 cubic feet); (d) upstream reservoir pressure not applicable and downstream reservoir pressure 7,341 kPa (1050 psig); (e) initial upstream and downstream PPO-GLV pressure 101.3 kPa (0.0 psig); (f) initial fluid flow rate 0.0 cubic meters per second (0.0 cubic feet per second); (g) upstream and downstream pipes closed-to-the-atmosphere; (h) slowly increasing ramp function of downstream energy; (i) ramp function delay 0.48 seconds from start of test; (j) downstream set valve at 22 percent open; (k) test duration 3.0 seconds; (l) no data events; (m) time-dependent data presentation; and, (n) no computed data traces.

FIG. 14B shows upstream pressure path 692 and downstream pressure path 694 that determine the downstream PPO-GLV opening pressure 693 of 1032 kPa (135 psig). This is equivalent to the conventional TRO pressure. At the start time of downstream pressure ramp 690, downstream pressure on path 692 increases until the PPO-GLV opens at the start time of upstream pressure increase 691 and upstream pressure begins to increase on path 694. Downstream pressure on path 692 and upstream pressure on path 694 continue to increase at different rates until equilibrium is achieved. At equilibrium, pressure paths 692 and 694 merge into pressure equilibrium path 695.

Figure 14C:
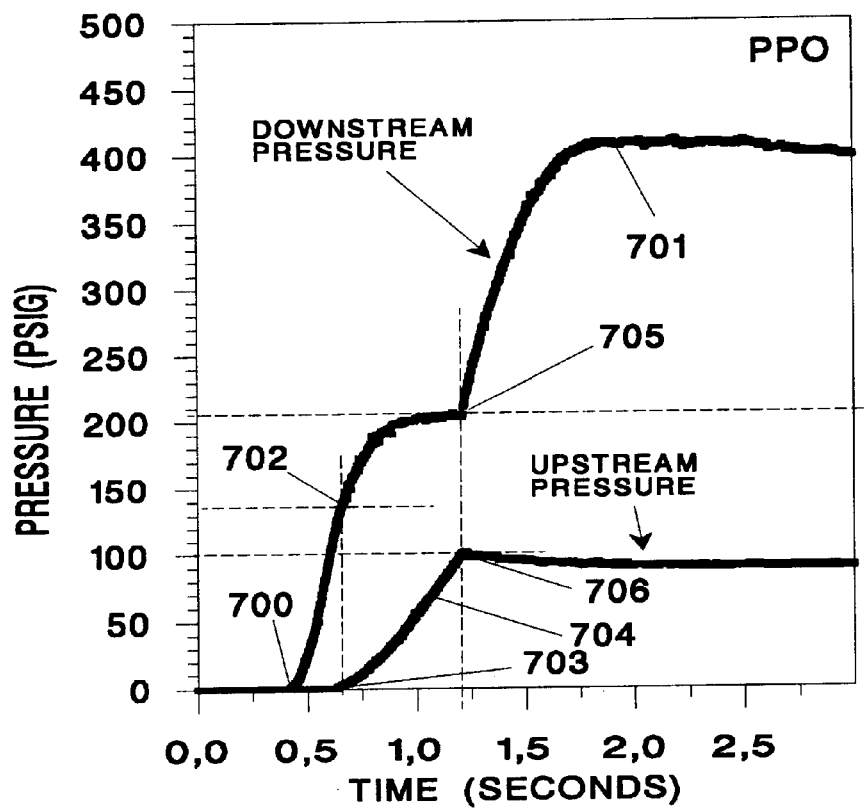
FIG. 14C shows a representative graph of data from a closed-to-the-atmosphere test of a PPO-GLV, with zero initial conditions, in which the PPO-GLV is opened by downstream pressure, with a sufficiently increasing change in flow rate to activate the internal check valve of the PPO-GLV.

FIG. 14C shows an opening pressure test of the PPO-GLV of FIGS. 14A and B, in which the PPO-GLV internal check valve is activated by a high rate of increase of downstream pressure. Key test criteria are: (a) PPO-GLV; (b) closed-to-the-atmosphere test; (c) maximum volume 0.011328 cubic meters (0.4 cubic feet); (d) upstream reservoir pressure not applicable and downstream reservoir pressure 7,341 kPa (1050 psig); (e) upstream and downstream PPO-GLV pressure 101.3 kPa (0.0 psig); (f) initial fluid flow rate 0.0 cubic meters per second (0.0 cubic feet per second); (g) upstream and downstream pipes closed-to-the-atmosphere; (h) slowly increasing ramp function of downstream energy; (i) ramp function delay 0.48 seconds from start of test; (j) downstream set valve at 30 percent open, (k) test duration 3.0 seconds; (l) no data events; (m) time-dependent data presentation; and, (n) no computed data traces.

FIG. 14C shows a PPO-GLV opening pressure of 1032 kPa (135 psig). At start time of downstream pressure increase 700, downstream pressure begins to increases on path 701. The PPO-GLV opens at a downstream pressure 702 of 1032 kPa (135 psig) that corresponds to a start time of upstream pressure increase 703. After the PPO-GLV opens, upstream pressure follows path 704. The rate of increase of downstream pressure on path 701 is sufficient to activate the PPO-GLV internal check valve. Downstream pressure 705 corresponds to upstream pressure 706 when the PPO-GLV internal check valve closes and fluid flow through the valve stops.

Comparing FIG. 14B and FIG. 14C reveals that the PPO-GLV is sensitive to the rate of increase of downstream pressure. This sensitivity can be evaluated from either upstream or downstream rates of change of pressure. In FIG. 14B, the initial rate of increase of upstream pressure is 1,191 kPa/sec. (159 psig/sec.). In FIG. 14C, the initial rate of increase of upstream pressure is 1,349 kPa/sec. (181 psig/sec.). In FIG. 14B, the rate of increase of downstream pressure is 3,687 kPa/sec. (520 psig/sec.). In FIG. 14C, the rate of increase of downstream pressure is 3,825 kPa/sec. (540 psig/sec.). These small differences in either upstream or downstream rates of change are sufficient to activate the PPO-GLV internal check valve.

Controlling the rate of change of downstream pressure helps to determine the opening pressure of a PPO-GLV. In conventional TRO pressure tests, control is achieved manually. TRO tests generate a single datum for opening PPO-GLV pressure and thus do not generate opening pressure data graphs. In FEPTS tests, control is achieved automatically by a control and set valve assembly. The FEPTS tests generate opening pressure data traces that are documented by data graphs. FEPTS tests permit evaluation of the dynamic closing properties of the internal reverse flow check valve of a PPO-GLV. FEPTS tests also show if the check valve leaks. In brief, FEPTS test data show both the opening pressure of the PPO-GLV and the leak-integrity of the PPO-GLV internal reverse check valve.

In FIG. 14C, the downstream PPO-GLV set valve is 30 percent open. In FIG. 14B, the set valve is 22 percent open. This eight-percent difference in the opening of the set valve alters the rate of change of downstream pressure required to open the PPO-GLV. A larger percent open produces a higher rate of change of pressure that activates the PPO-GLV internal check valve, as shown by the leveling of upstream pressure path 704 in FIG. 14C.

Figure 14D:
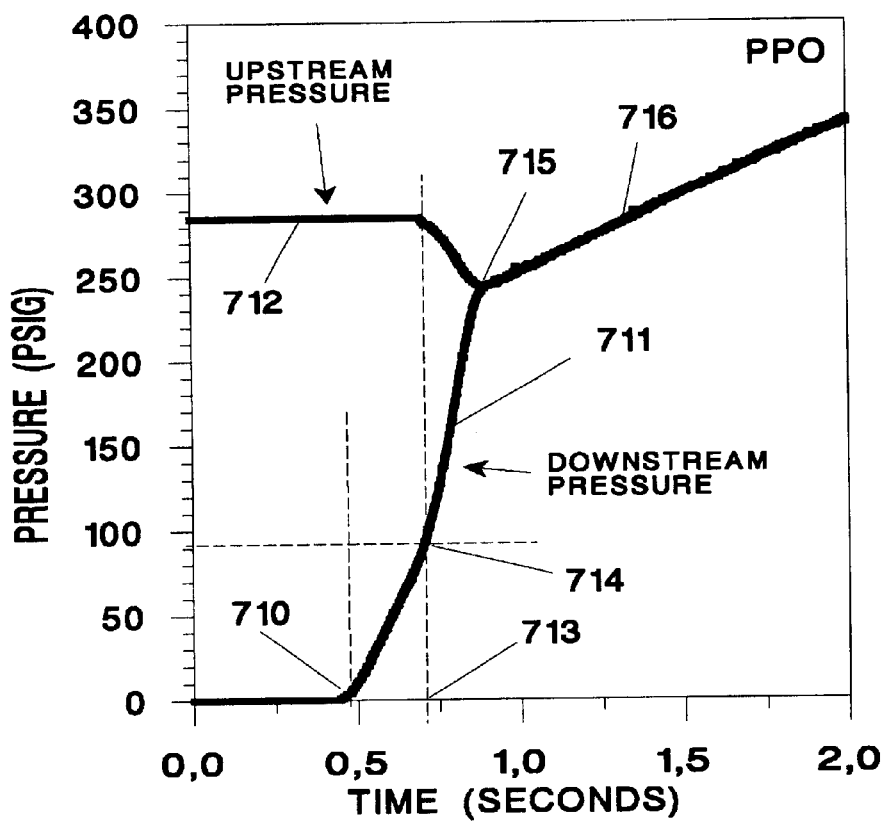
FIG. 14D shows a representative graph of data from a closed-to-the-atmosphere test of a PPO-GLV, in which existing upstream pressure causes the valve to open at a reduced downstream opening pressure.

FIG. 14D shows an opening pressure test of a PPO-GLV with initial upstream pressure is greater than 101.3 kPa (0.0 psig). Setting an initial upstream pressure and opening a PPO-GLV by downstream pressure are easily accomplished by the FEPTS, but difficult, if not impossible, to accomplish with a conventional TRO apparatus. Key test criteria are: (a) PPO-GLV; (b) closed-to-the-atmosphere test; (c) maximum volume 0.011328 cubic meters (0.4 cubic feet); (d) upstream reservoir pressure not applicable and downstream reservoir pressure 7,341 kPa (1050 psig); (e) upstream PPO-GLV pressure 2,066 kPa (285 psig) and downstream PPO-GLV pressure 101.3 kPa (0.0 psig); (f) initial fluid flow rate 0.0 cubic meters per second (0.0 cubic feet per second); (g) upstream and downstream pipes closed-to-the-atmosphere; (h) slowly increasing ramp function of downstream energy; (i) ramp function delay 0.48 seconds from start of test; (j) downstream set valve at 30 percent open; (k) test duration 2.0 seconds; (l) no data events; (m) time-dependent data presentation; and, (n) no computed data traces.

In FIG. 14D, downstream pressure on path 711 begins to increase slowly at start time of downstream pressure increase 710. Upstream pressure on path 712 remains constant until the PPO-GLV starts to open at start time 713. PPO-GLV opening start time 713 corresponds to a downstream opening pressure 714 of 1,024 kPa (91 psig) on path 711. After the PPO-GLV opens, downstream pressure on path 711 and upstream pressure on path 712 reach equilibrium at pressure 715. At equilibrium, paths 711 and 712 merge into pressure path 716.

In FIG. 14D, the FEPTS test data demonstrate that an initial upstream PPO-GLV pressure reduces the downstream pressure needed to open a typical PPO-GLV.

FIG. 15 shows test data for a representative high pressure safety valve. The safety valve is connected to a spacer and installed in test chamber 56, so that the valve is activated by downstream pressure. Key test criteria are: (a) safety valve; (b) initial upstream and downstream closed-to-the-atmosphere, followed by upstream and downstream open-to-the-atmosphere test; (c) maximum volume 0.011328 cubic meters (0.4 cubic feet); (d) upstream reservoir pressure not applicable and downstream reservoir pressure 8,375 kPa (1200 psig); (e) initial upstream and downstream safety valve pressure 101.3 kPa (0.0 psig); (f) initial fluid flow rate 0.0 cubic meters per second (0.0 cubic feet per second); (g) upstream and downstream pipes closed-to-the-atmosphere and upstream and downstream pipes from closed- to open-to-the-atmosphere; (h) increasing ramp function of downstream energy; (i) ramp function delay 0.48 seconds from start of test; (j) downstream set valve at 40 percent open; (k) test duration 5.0 seconds; (l) no data events; (m) time-dependent data presentation; and, (n) no computed data traces.

In FIG. 15, the test data show that, at the start time of increase of downstream pressure 720, downstream pressure begins to increase on downstream pressure path 721. When downstream pressure reaches safety valve opening pressure 722 of 5,617 kPa (800 psig), the safety valve opens at time 723. After the safety valve opens, upstream pressure follows an increasing pressure path 724. At the start time of fluid exhaust 725, upstream and downstream fluid are vented to the atmosphere. The safety valve remains open between time 723 and time 726 when downstream pressure drops below 5,617 kPa (800 psig) and the safety valve closes. At the start time of exhaust of fluids 725, upstream and downstream pressures decrease on pressure paths 724 and 721, respectively. Upstream pressure and downstream pressure are then reduced to zero psig.

FIG. 15 data illustrate that the rate of increase of opening of the tested safety valve is substantially slower than the rate of increase of applied downstream pressure. Comparing the initial slope of path 724 to the initial slope of path 721 illustrates that the safety valve operates at a pressure release rate of 1480 kPa/sec. (200 psig/sec.). Depending upon the operating system in which this safety valve is installed, this rate of pressure release may or may not be acceptable. If the safety valve is installed in a fluid system in which pressure may exceed the safety valve opening pressure and may also increase at a rate substantially greater than 1,480 kPa/sec. (200 psig/sec.), the safety valve may not function to protect the system.

It is well known that a safety valve test procedure must determine the opening pressure of a safety valve. FIG. 15 data show that FEPTS tests meet this requirement. Further, FEPTS tests also show the rate of pressure release of a tested safety valve, which is an equally important safety valve specification.

Figure 16:
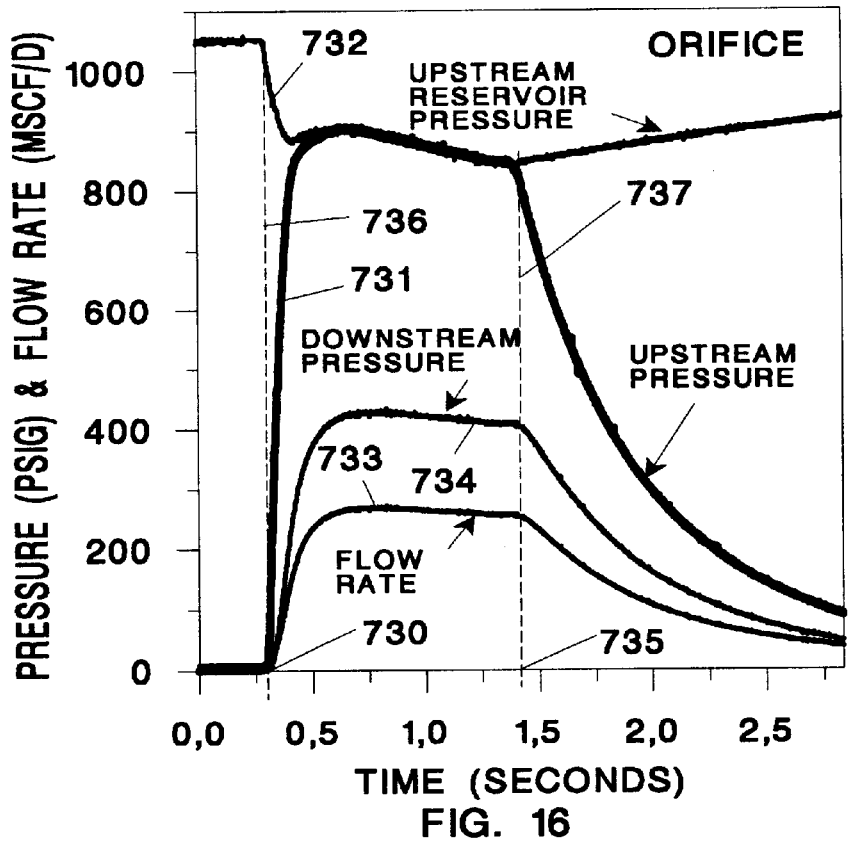
FIG. 16 shows a representative graph of pressure and fluid flow rate test data for an orifice valve with no moving parts.
Figure 17:
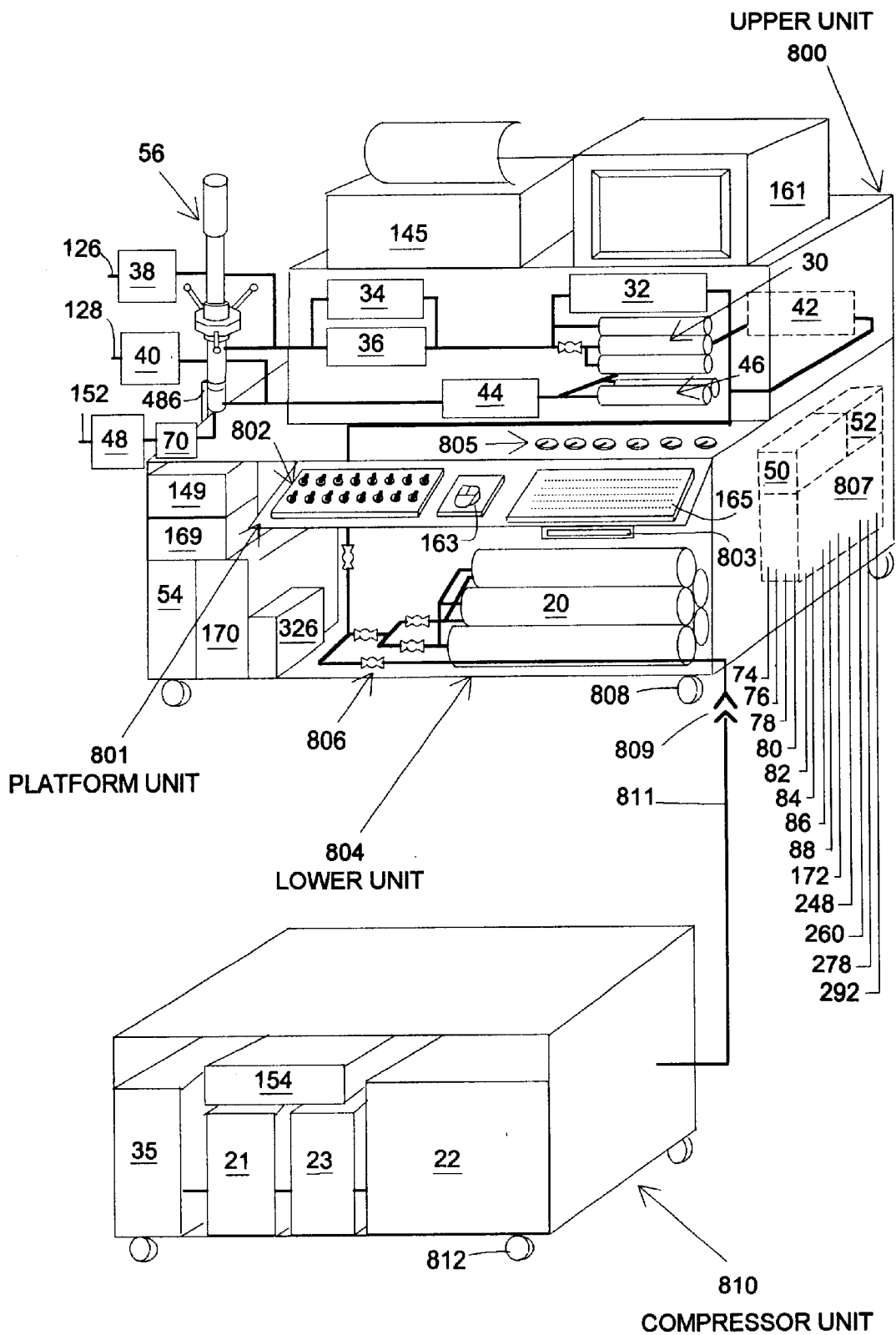
FIG. 17 shows a perspective view of the FEPTS apparatus used to test the dynamic performance characteristics of fluid control devices and systems.

FIG. 16 shows test data for a representative orifice valve. The orifice valve tested consists of a square-edge orifice of diameter 0.3175 centimeters (0.125 inches) that is used for continuous fluid flow; it has no moving parts. The tested orifice valve is a conventional TR-GLV orifice valve without an internal reverse flow check valve. Key test criteria are: (a) TR-GLV orifice valve; (b) upstream closed-to-the-atmosphere and downstream open-to-the-atmosphere test; (c) maximum volume 0.011328 cubic meters (0.4 cubic feet); (d) upstream reservoir pressure 7,341 kPa (1050 psig) and downstream reservoir pressure not applicable; (e) upstream and downstream orifice valve pressure 101.3 kPa (0.0 psig); (f) initial fluid flow rate 0.0 cubic meters per second (0.0 cubic feet per second); (g) upstream pipes closed-to-the-atmosphere and downstream pipes open-to-the-atmosphere; (h) single energy pulse input function; (i) pulse delay 0.48 seconds from start of test and pulse duration 1.1 seconds, (j) upstream set valve at 100 percent open; (k) test duration 3.0 seconds; (l) no data events; (m) time-dependent data presentation, and, (n) computed CFN flow rate.

In FIG. 16, at the start time 730 of an applied upstream energy pulse, upstream pressure increases on upstream pressure path 731. Simultaneously, upstream reservoir pressure on upstream reservoir pressure path 732 decreases. Fluid flow through the orifice valve starts immediately after the energy pulse is applied and then follows fluid flow rate path 733. Downstream pressure on downstream pressure path 734 is measured at a calibrated distance from the inlet to a downstream CFN. Downstream pressure on path 734 is used to compute the CFN flow rate. The upstream energy pulse is terminated at termination time 735. Start time-line for energy pulse 736 and end timeline for energy pulse 737 delineate the 1.1 second time duration of the applied energy pulse. A decreasing, nearly steady flow rate through the orifice, as shown by path 732, is achieved in less than 0.5 seconds after pulse initiation.

An orifice valve is used to establish accurate operating conditions for the FEPTS apparatus. The fluid flow rate is independent of internal valve mechanical movements found in fluid control devices such as IPO-GLVs and PPO-GLVs. Fluid flow through the orifice is calibrated with respect to a standard conventional flowmeter such as a CFN. Calibration with respect to standard orifice calibration charts may indicate a small difference in flow rate because standard orifice flow rate charts are calibrated with respect to specific upstream and downstream pressure tap placement. In the apparatus, in test chamber 56 the upstream pressure tap is 7.62 centimeters (3.0 inches) from the orifice, and the downstream pressure tap is 20.32 centimeters (8.0 inches) from the orifice. The CFNs used in the apparatus have traceable calibration to the National Institute of Standards and Technology. Comparing the results of calibrated flow rate data by these CFNs to standard orifice charts for a 0.3175 centimeter (0.125 inch) orifice shows less than a five percent difference. This difference is reasonable because the orifice pressure tap spacing for standard charts is different from the pressure tap spacing in the FEPTS apparatus.

In FIG. 16, upstream pressure 731 is in equilibrium with upstream reservoir pressure 732 during near steady orifice fluid flow. This condition demonstrates that the upstream pipe configuration and the pipe diameters are adequate for testing the orifice valve. To ensure accurate flow measurements, the downstream CFN used to measure flow rate in the FEPTS apparatus has a throat diameter that is larger than the aperture of the orifice valve.

FIG. 17 shows a perspective view of the FEPTS apparatus and associated equipment, including upper unit 800; platform unit 801, attached to lower unit 804; and compressor unit 810, connected to lower unit 804 at high pressure coupling 809.

Upper unit 800 includes upstream reservoir tanks 30; electro-pneumatic fill valve assemblies 32 and 42; downstream reservoir tanks 46; electro-magnetic control and set valve assemblies 36 and 48; electro-pneumatic control and set valve assemblies 34, 38, 40, and 44; test chamber or other fluid control system 56; exhaust pipes 126, 128, and 152; and flow rate transducer 70 (see FIG. 1). FEPTS transducers not shown in FIG. 17 include pressure transducers 60, 62, 68, and 72; differential pressure transducer 64; and temperature transducers 58 and 66 (see FIG. 1). Computer monitor 161 and printer 145 sit on top of upper unit 800.

Platform unit 801 includes override switches 802 for manual control of FEPTS fill, control, and set valve assemblies; shift bar-switch 803 to shift between data graph computer 54 and valve control computer 170; and computer mouse 163 and computer keyboard 165.

Lower unit 804 includes visual high pressure safety gauges 805 connected to FEPTS high pressure pipes (connections not shown) for operator safety. Lower unit 804 includes ball valve assembly 806 (including ball valves 24, 26, and 28 in FIG. 1) for main reservoir tanks 20. Lower unit 804 includes power supply housing 807 for power supplies 74, 76, 78, 80, 82, 84, 86, 88, 172, 248, 260, 278, and 292 (in FIGS. 1, 2A, 3A, and 4A). The power supplies are connected to a 120-volt AC electrical power source (not shown) that is turned on or off by remote control receiver unit #2 326 (in FIG. 5B), when a signal from a remote control transmitter (not shown) is received. Lower unit 804 includes data graph computer 54; valve control computer 170; computer switching unit 169; signal conditioner unit 50; analog to digital converter unit 52; and printer switching unit 149. Lower unit 804 moves on rollers 808.

Mounting bracket 486 that secures a FEPTS test chamber 56 is attached to lower unit 804 (see FIGS. 6A and 6G).

Compressor unit 810 includes compressor 22, pre-compressor 35, pneumatic filter 21, pneumatic dryer 23, and high pressure fill line 811. Compressor 22 and pre-compressor 35 are connected to 120-volt AC and to 240-volt AC electrical power sources (not shown) that are turned on or off by remote control receiver unit #1 154 (in FIG. 5A), when a signal from a remote control transmitter (not shown) is received. Compressor unit 810 moves on rollers 812.

My FEPTS apparatus and methods are described with reference to a preferred embodiment. Others skilled in the technology of fluid pressure and fluid flow rate measurement will be able to make various modifications of the described embodiment without departing from the spirit and scope of my FEPTS. It is intended that all elements and steps that perform substantially the same function in substantially the same way to achieve substantially the same results are within the scope of my FEPTS.

I claim:

1. A fluid pressure, fluid flow rate apparatus of predetermined size with means to test the dynamic performance of fluid control devices and fluid systems, including gas-lift valves, said apparatus having means to generate fluid pressure, fluid flow rate energy pulses with precise, reproducible physical characteristics, said apparatus having means to acquire opening and closing pressures of pressure-sensitive fluid control devices, such as gas-lift valves, and to acquire device upstream, downstream, and differential pressure, fluid temperature, and fluid flow rate data, said apparatus having means to generate, by computer, diagnostic presentations of said data suitable for evaluating performance characteristics, said apparatus to be placeable at manufacturing, rebuilding, and/or field locations such as off-shore oil platforms, to test the dynamic performance of individual fluid control devices, including gas-lift valves, after manufacture, before installation, after removal, before rebuilding, and/or after rebuilding, whereby said fluid control devices are used in industries, such as the petroleum industry, to produce hydrocarbons from underground reservoirs, and whereby said apparatus provides economic value to said industries by said testing and placement, said apparatus comprising:

(a) a high-pressure, high-fluid-flow-rate or low-pressure-low-fluid-flow rate source of energy;

(b) means to generate high-pressure, high-fluid-flow-rate or low-pressure, low-fluid flow rate energy pulses of predetermined number, predetermined strength, predetermined time delay, and predetermined duration;

(c) means to enclose a fluid control device in a pressure test chamber so that each said device, including a gas-lift valve, can be quickly installed, within thirty seconds, tested, and quickly removed from said chamber;

(d) means to seal and secure a fluid control device within a pressure test chamber, so that a first pressure-tight seal is created upstream or downstream and a second pressure-tight seal is created downstream or upstream by one or more spacers, a forcing member, and O-ring seals, whereby diverse fluid control devices can be installed in said test chamber with internal high pressure-tight fluid seals;

(e) means to connect a fluid system, comprising multiple fluid control devices and fluid sub-systems, in place of a fluid device test chamber, to high pressure upstream and downstream pipes;

(f) means to acquire data from pressure, differential pressure, temperature, and fluid flow rate transducers which measure dynamic performance characteristics of tested fluid control devices or fluid systems; and, (g) means to present acquired data in a format suitable for evaluating the dynamic performance of said fluid control devices and fluid systems, including gas-lift valves, under test.

2. The apparatus of claim 1 operated by a single individual.

3. The apparatus of claim 1 further comprising:

(a) a plurality of fluid reservoir tanks, including main fluid storage reservoir tanks, upstream fluid storage reservoir tanks, and downstream fluid storage reservoir tanks, wherein each multiple tank fluid storage reservoir is further segregated into a smaller plurality of fluid storage reservoir tanks connected by pipes and segregated by valves;

(b) means to fill fluid storage reservoir tanks with a fluid to a required pressure;

(c) means to transfer fluid from main storage reservoir tanks to upstream storage reservoir tanks at a first desired pressure and to transfer fluid to downstream storage reservoir tanks at a second desired pressure;

(d) a fluid device test chamber for a fluid control device or a fluid system connected by means between upstream fluid reservoir tanks and downstream fluid reservoir tanks;

(e) a plurality of electro-pneumatic control valves, electro-magnetic control valves, and motor controlled valve position set valves providing means to deliver fluid precisely from an upstream or downstream fluid reservoir to a fluid control device placed into a test chamber, or to a fluid system under test, or to exhaust fluid precisely from said test chamber or fluid system to an upstream or downstream fluid reservoir, which may be the atmosphere;

(f) means to regulate low pressure fluid power to operate electro-pneumatic control valves;

(g) means to connect electro-pneumatic and electro-magnetic fluid control valves and motor-controlled, valve positioning set valves to fluid reservoirs, and to a fluid control device test chamber or a fluid system;

(h) a plurality of pressure transducers, temperature transducers, differential pressure transducers, and flow rate transducers for producing a plurality of analog signals in response to pressure, temperature, differential pressure, and flow rate variations;

(i) a plurality of signal conditioning means to calibrate the plurality of analog signals;

(j) an analog to digital conversion means to receive analog signals from signal conditioning means and to convert analog signals into digital signals;

(k) a digital computer means to specify test criteria, including data file name, sampling rate, test duration, and input and exhaust energy functions; and which computer means also to receive digital data signals, store said data signals, and prepare graphical representations of said data signals;

(l) a digital computer means to establish and initiate a test sequence to test a fluid control device or fluid system by providing control signal means to deliver fluid energy pulses from, or to receive fluid energy pulses into, a fluid reservoir precisely, and, further, by providing means to control precisely the opening and closing operations of electro-pneumatic control valves and electro-magnetic control valves, and, yet further, by providing means to position motor-controlled, valve positioning set valves precisely;

(m) means to shift control among computer programs, either automatically within a single computer, or by an electrical signal automatically sent from one digital computer to another, or by a an electrical signal manually sent from one computer to another, in order to enter test parameters, to receive digital data generated by transducers, and to initiate data acquisition;

(n) means to generate analog power signals from a low-power-output digital computer signal to said control valves and set valves, wherein said digital computer generates a low-power electrical signal which is converted into a high-power electrical signal to activate said control valves and set valves; and, (o) means to override digital computer controls of control valves and set valves with manually switched electrical signals for operating said control valves and set valves.

4. The apparatus of claim 3 wherein a pressure transducer is in fluid communication with main fluid storage reservoir, a pressure transducer is in fluid communication with upstream fluid storage reservoir, a pressure transducer is in fluid communication with downstream fluid storage reservoir, a pressure transducer is in fluid communication with upstream test chamber or fluid system, a pressure transducer is in fluid communication with downstream test chamber or fluid system, a differential pressure transducer is in fluid communication and connected across said test chamber or fluid system, a temperature transducer is in fluid communication upstream and a temperature transducer is in fluid communication downstream of said test chamber or fluid system, and a fluid flow rate transducer is in fluid communication upstream or downstream of said test chamber or fluid system.

5. The apparatus of claim 3 wherein a first control valve and set valve assembly is in fluid communication with an upstream reservoir and a downstream test chamber or fluid system, a second control valve and set valve assembly is in bypass fluid communication with said upstream reservoir and said downstream test chamber or fluid system, a third control valve and set valve assembly is in fluid communication with the upstream test chamber or fluid system and a downstream receiving reservoir, and a fourth control valve and set valve assembly is in bypass fluid communication with said upstream test chamber or fluid system and said downstream receiving reservoir.

6. The apparatus of claim 3 wherein a first control valve and set valve assembly is in fluid communication with upstream, of said assembly, and downstream, of said assembly, apparatus components and a second control valve and set valve assembly is in bypass fluid communication with said upstream and said downstream apparatus components, said first control and set valve assembly may generate slow flow velocity to create slow fluid velocity dynamic performance characteristics, while the said second control and set valve assembly may generate explosive or fast flow velocity to create fast velocity dynamic performance characteristics for a fluid control device within a test chamber or a fluid system, whereby said slow and fast velocities in air can be between zero and at least 243.84 meters per second (800 feet per second).

7. The apparatus of claim 3 wherein testing a fluid control device inside a test chamber or a fluid system is carried out by a predetermined procedure conducted manually, by digital computer automatic control, or by a combination of manual and digital computer automatic control such that the test period may be of predetermined length subject to stored capacity of fluid energy in apparatus reservoirs and whereby said testing is accompanied, and/or followed, by the generation of data that describe dynamic performance characteristics of fluid pressure, fluid differential pressure, fluid temperature, and fluid flow rate of a fluid control device within said test chamber or the dynamic performance characteristics of a fluid system.

8. The apparatus of claim 3 wherein a remote control means initiates a test and stops a test by controlling the apparatus start-up sequence of electrical power, selecting a testing sequence, and shutting down electrical power to the apparatus whereby said remote control provides safety to an operator of the apparatus when inherently dangerous predetermined high fluid pressures and high fluid flow rates are present.

9. The apparatus of claim 3 wherein control of fluid energy delivered to or exhausted from a fluid control device in a test chamber, or a fluid system, is accomplished precisely by a motor connected to a set valve stem which positions said set valve to a percentage openness in the range of zero percent to one hundred percent, in predetermined one-tenth of one-percent increments, and by a bang-bang action on the same set valve or another control valve to permit fluid flow, and whereby said precise control is needed in order to activate the dynamic modes of performance of said fluid control device or fluid system under test, and whereby said dynamic modes of performance may be dependent upon the design of a particular fluid control device or fluid system, and which dynamic performance characteristics may occur only for said particular fluid control device or fluid system, and only over a small range of a few percentage numbers of the position of a set valve.

10. The apparatus of claim 3 wherein a means to measure the position of a plurality of set valves in one-tenth of one-percent increments of openness of said set valves for fluid energy delivery upstream or downstream, and fluid energy exhaust upstream or downstream, of a fluid control device in a test chamber, or a fluid system, and which means to measure provides feedback of set valve positions to a test operator and to a second digital computer, whereby said operator or said computer can determine if an adequate response has been generated by the position of said set valves.

11. The apparatus of claim 3 wherein a test chamber in fluid communication with upstream fluid and downstream fluid, comprising an upper chamber body, an adjustable top screw cap with high pressure "O" ring seal, a lower chamber body, a bottom insert with a plurality of high pressure "O" ring seals, and a union between said upper chamber and said lower chamber with radial arms and high pressure "O" ring seal and which union is opened to accommodate a fluid control device and closed to secure a high pressure seal for said fluid control device by predetermined means with a plurality of "O" rings, and whereby said fluid control device can be installed and removed from said test chamber quickly and without disturbing other fluid connections, thereby providing the benefit of testing many high-pressure, high-fluid-flow-rate or low-pressure, low-fluid-flow-rate fluid control devices or fluid systems quickly and economically.

12. A method of testing and evaluating the dynamic performance of fluid control devices or fluid systems rapidly, the method comprising steps:

(a) selecting a device or system to be tested;

(b) selecting a pipe configuration to define an open-, partially-open-, or closed-to-the-atmosphere test condition to correspond to a predetermined test plan;

(c) connecting a fluid control device test chamber between upstream and downstream storage reservoirs or to the atmosphere, opening said chamber, inserting a fluid control device into said chamber, and closing said chamber, or connecting a fluid system between upstream and downstream storage reservoirs or to the atmosphere;

(d) setting test initial conditions, including upstream reservoir pressure, downstream reservoir pressure, upstream test chamber pressure, downstream test chamber pressure, and initial fluid flow rate;

(e) using a digital computer or processor to select data file name, test duration, digital sampling rate, and automatic or manual control;

(f) using a digital computer or processor to create a testing sequence for control valves and for positioning set valves, or to select a predetermined test sequence from a library of computer-stored test sequences, which include fluid energy pulse initiation, pulse delay, pulse duration, number of pulses, and pulse period, with pulse strength determined by reservoir pressure;

(g) selecting reservoir volumes to supply or receive fluid during testing, with said volumes determining how energy in the upstream and/or downstream reservoirs will increase, decrease, or remain constant, and/or how pressures in the upstream or downstream reservoirs will increase, decrease, or remain constant;

(h) connecting pipes to configure fluid pathways for the open-, partly- open-, or closed-to-the-atmosphere test conditions; and, (i) starting a test; observing the dynamic responses of pressure, differential pressure, temperature, and flow rate; and generating graphical presentations of these data.

13. The method of claim 12, including selecting a test duration for a predetermined time for a single energy pulse or for multiple energy pulses, said pulse(s) lasting from milliseconds to minutes depending upon upstream reservoir capacity, and said pulse strength precisely controlled and propagated within an apparatus with explosive force and fast- flow velocity in milliseconds, or said pulses precisely controlled and propagated within an apparatus with minute force in milliseconds or minutes, in fluid slow motion, to generate and evaluate tested fluid control device or fluid control system slow velocity or fast velocity dynamic performance characteristics, whereby said slow and fast velocities in air can be between zero and at least 243.84 meters per second (800 feet per second).

14. The method of claim 12, including specifying the delivery of fluid energy to a fluid control device within a fluid test chamber or to a fluid system, which delivery is characterized as an impulse function of energy, a step function of energy, a ramp function of energy, or a frequency function of energy depending upon how an input fluid flow delivery scheme is designed.

15. The method of claim 12, including retesting a fluid control device within a test chamber, or a fluid system, using precisely the same initial conditions, test set-up configuration, and means to acquire dynamic performance test data.

16. The method of claim 12, including using a digital computer to store records of prior tests conducted on similarly manufactured fluid control devices and systems and for comparing test data, conducted by precisely the same testing method, on the dynamic characteristics of said devices and systems to determine if said devices and systems are performing as expected by the user.

17. The method of claim 12, including using digital data acquired by a digital computer in real time to identify in real time test events, such as peak pressure events, substantial increase or decrease in pressure events from a set pressure initiation of differential pressure events, reduction to 101.3 kPa (0.0 psig) of differential pressure events, initiation of fluid flow events, and cessation of fluid flow events; and to obtain raw tabular data and graphical data of such test events without requiring a complete set of test data to be generated.

18. The method of claim 12, including digital computer computation of power and energy supplied to a fluid control device or fluid system over a test period, and power and energy subsequently delivered by said device or system over a test period, whereby said power and energy data demonstrate performance efficiency of said device or system, when subjected to different input energy pulse functions that are based upon fluid flow rate and fluid pressure.

19. The method of claim 12, including digital computer-generated graphical presentations of fluid pressure, fluid temperature, and fluid flow rate data for a fluid control device tested in a test chamber, or a tested fluid system, which graphs include presentations with time abscissa of open-, partly-open-, or closed-to-the-atmosphere pressure and flow rate, and parametric presentations, in which time is implicit, of pressures and of flow rate.

20. The method of claim 12, including acquiring high-pressure, high-fluid-flow-rate or low-pressure, low-fluid-flow-rate data by energy pulses using a small compressor or bottles of fluid, without requiring a large high pressure compressor or a large fluid storage reservoir for determining the dynamic performance of fluid control devices or fluid systems, and which method is portable from one apparatus to another, comprising the further steps of:

(a) performing multiple tests on a single fluid control device or fluid system;

(b) completing tests of a single fluid control device or fluid system within seconds as compared to the use of large compressors, large storage reservoirs, and complicated, time-consuming test procedures that require large facilities and large economic investment, and which, because of economic factors, prohibit the testing of many high-pressure, high-fluid-flow-rate or low-pressure, low-fluid-flow-rate fluid control devicesor fluid systems;

(c) evaluating test results derived from an open-to-the-atmosphere test system, a partly-open-to-the-atmosphere test system, or a closed-to-the-atmosphere test system, as applicable for a particular test; and, (d) determining, by comparing dynamic performance test data, if a tested fluid control device or fluid system is performing according to manufacturer's specifications, is failing due to deterioration of said device or system components, or is performing satisfactorily by the standards of a given user of said device or system, whereby performance characteristics of tested fluid control devices or fluid systems will be known and said devices or systems can be accepted or rejected with confidence.

* * * * *